United States Patent
Lee et al.

(10) Patent No.: US 10,142,084 B2
(45) Date of Patent: Nov. 27, 2018

(54) FULL-DUPLEX SELF-INTERFERENCE CANCELLATION

(71) Applicant: Intel Corporation, Santa Clara, CA (US)

(72) Inventors: Namyoon Lee, San Jose, CA (US); Yang-Seok Choi, Portland, OR (US)

(73) Assignee: Intel Corporation, Santa Clara, CA (US)

(*) Notice: Subject to any disclaimer, the term of this patent is extended or adjusted under 35 U.S.C. 154(b) by 80 days.

(21) Appl. No.: 15/201,036

(22) Filed: Jul. 1, 2016

(65) Prior Publication Data
US 2018/0006794 A1    Jan. 4, 2018

(51) Int. Cl.
| H04L 12/56 | (2006.01) |
| H04L 5/14 | (2006.01) |
| H04B 15/00 | (2006.01) |

(52) U.S. Cl.
CPC ............ *H04L 5/14* (2013.01); *H04B 15/00* (2013.01)

(58) Field of Classification Search
CPC ...... H04B 1/525; H04B 7/0413; H04L 5/1461
See application file for complete search history.

(56) References Cited

U.S. PATENT DOCUMENTS

| 2011/0143655 A1* | 6/2011 | Ahn ................... H04B 7/15542 455/9 |
| 2016/0226653 A1* | 8/2016 | Bharadia ................ H04B 1/525 |

* cited by examiner

Primary Examiner — Kevin C. Harper
(74) Attorney, Agent, or Firm — Eversheds Sutherland (US) LLP

(57) ABSTRACT

This disclosure describes methods and devices related to self-interference cancellation. A device is disclosed comprising: at least one memory storing computer-executable instructions; and at least one processor configured to access the at least one memory, wherein the at least one processor may be configured to execute the computer-executable instructions to cause to send at least one first symbol sequence at least twice on a first transmit chain and at least one second symbol sequence twice on a second transmit chain. The processor may be configured to execute the computer-executable instructions to determine at least one third symbol sequence at least twice on a first receive chain and at least one fourth symbol sequence at least twice on a second receive chain. The processor may be configured to execute the computer-executable instructions to determine a first impulse response of a first power amplifier on the first transmit chain and a second impulse response of a second power amplifier on the second transmit chain. The processor may be configured to execute the computer-executable instructions to determine a first aggregate impulse response associated with one or more first devices on the first transmit chain and the first receive chain. The processor may be configured to execute the computer-executable instructions to determine a second aggregate impulse response associated with one or more second devices on the second transmit chain and the second receive chain. The processor may be configured to execute the computer-executable instructions to determine a third impulse response based at least in part on the first and second impulse response, and the first and second aggregate impulse response. The processor may be configured to execute the computer-executable instructions to determine an estimate of the third impulse response based at least in part on the at least one first symbol sequence or the at least one second symbol sequence.

27 Claims, 11 Drawing Sheets

FULL-DUPLEX SELF-INTERFERENCE CANCELLATION

TECHNICAL FIELD

This disclosure generally relates to systems and methods for interference cancellation and more particularly, to self-interference cancellation of wireless signals transmitted by wireless devices.

BACKGROUND

Some wireless devices may comprise two or more antennas and a plurality of circuit elements that produce signals. These signals may interfere with the transmission of a wireless signal from one of the two or more antennas. Additional circuit elements may be used with the wireless devices to reduce interference, but the additional circuit elements are oftentimes required for each antenna thereby increasing the amount of space needed to accommodate the additional circuit elements. In addition, the computational time required to identify and reduce the interference increases with the number of antennas.

Figure 1:
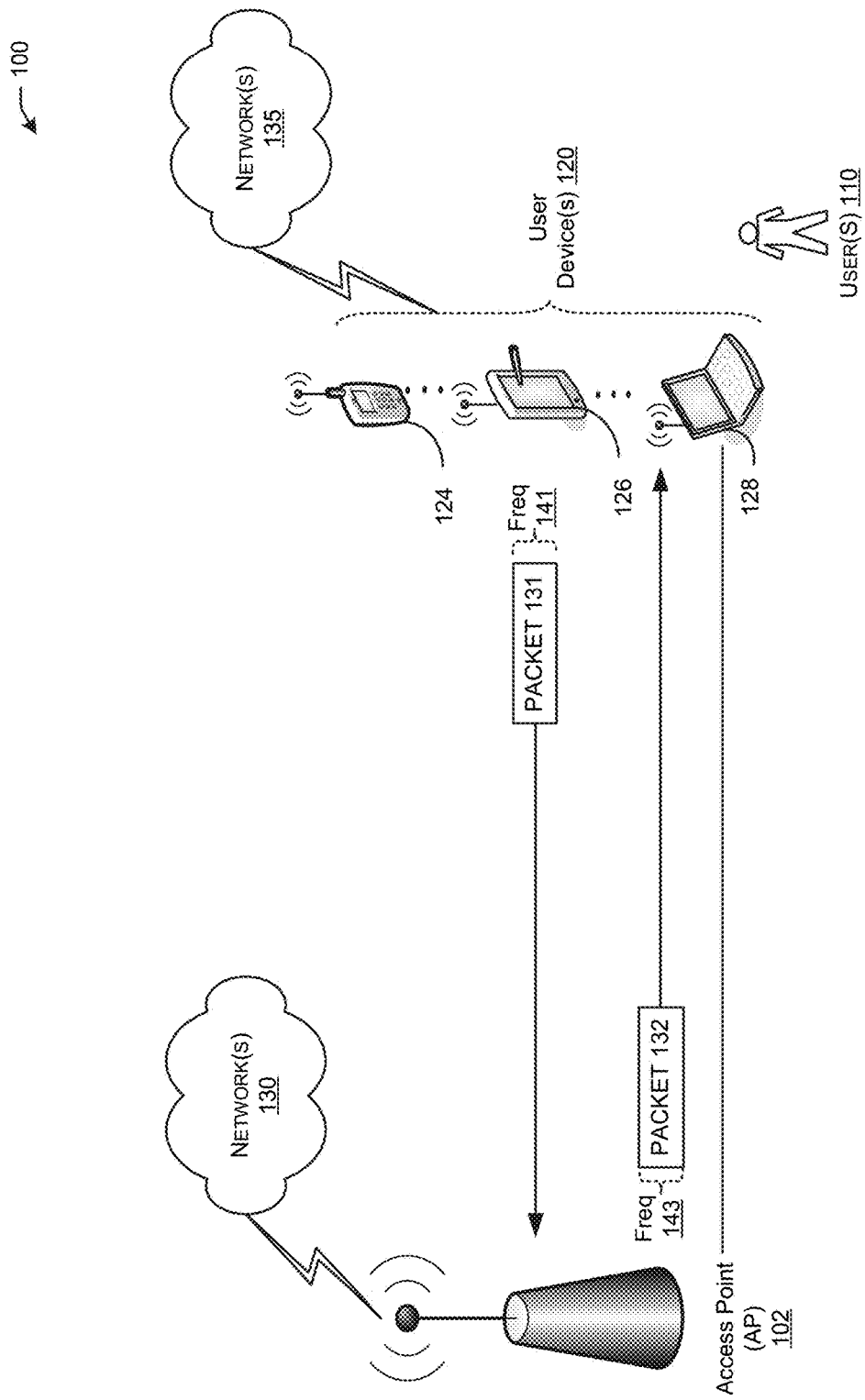
FIG. 1 depicts an example network environment of an illustrative wireless network, according to one or more example embodiments of the disclosure.

The detailed description is set forth with reference to the accompanying drawings, which are not necessarily drawn to scale. The use of the same reference numbers in different figures indicates similar or identical items. Illustrative embodiments will now be described more fully hereinafter with reference to the accompanying drawings, in which some, but not all embodiments of the disclosure are shown. The disclosure may be embodied in many different forms and should not be construed as limited to the embodiments set forth herein; rather, these embodiments are provided so that this disclosure will satisfy applicable legal requirements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Wireless communication systems may experience strong self-interference when they transmit and receive on the same frequency band. To avoid such self-interference, some wireless communication systems use time-division duplex (TDD) or frequency-division duplex (FDD) for uplink and downlink communication at the expense of time or frequency resources by transmitting signals that are orthogonal to one another.

Example embodiments of the present disclosure relate to systems, methods, and devices for improving spectral efficiency by transmitting and receiving signals on the same frequency band (e.g., full-duplex) by self-cancelling interferences caused by one or more antennas. Full-duplex may also be commonly referred to as in-band. Full-duplex transmission may enable a wireless communication system to simultaneously transmit and receive signals using the same frequency band. One or embodiments of wireless communication systems disclosed herein comprising full-duplex radios significantly improve the performance of the wireless communication systems in both physical-layer (PHY) spectral efficiencies and medium access control (MAC) protocols. For example, the wireless communication systems comprising the full-duplex radios disclosed herein increase spectral efficiencies by at least double that of half-duplex radios (e.g., TDD wireless communication systems and/or FDD wireless communication systems). Because full-duplex radios enable the wireless communication systems disclosed to transmit and receive signals on the same frequency band, the wireless communication systems disclosed herein may not need to utilize a channel sensing medium access protocol (e.g., carrier sense multiple access (CSMA), or any variants of CSMA). This is because full-duplex radios can share the same frequency band to transmit and/or receive signals, and therefore do not need to sense the medium before transmitting and/or receiving signals.

One of the challenges in implementing full-duplex radios is the cancellation of strong self-interfering signals received by a second transceiver (e.g., analog circuitry associated with receiving signals) in the wireless communication system transmitted by a first transceiver (e.g., analog circuitry associated with transmitting signals) in the wireless communication system. Self-interference may occur when the first transceiver in a first wireless communication system transmits a first signal and the second transceiver in the first wireless communication system receives the first signal while the second transceiver is receiving a second signal from a second wireless communication system. As a result, the second transceiver may receive a third signal that may be a constructive and/or deconstructive combination of the first signal and the second signals. The first transceiver may comprise circuitry associated with transmitting and/or receiving signals and the second transceiver may comprise circuitry associated with transmitting and/or receiving signals. For instance, wireless communication systems comprising full-duplex Wireless Fidelity (Wi-Fi) radios that are designed to operate in accordance with one or more Institute of Electrical and Electronics Engineers (IEEE) 802.11 standards comprise circuitry that cancels self-interfering signals below a noise floor level in order to decode a signal received from another radio. For example, if the noise floor and average transmit signal power are −90 decibel meter (dBm) and 20 dBm respectively, and the first transceiver transmits a signal using the average transmit signal power the second transceiver may need to reduce the self-interference power by up to 110 dBm.

One way to reduce the self-interference experienced by the second transceiver is to include one or more first analog self-interference cancellation (SIC) filters in the analog circuitry, in the second transceiver, associated with receiving signals. The one or more first analog SIC filters may comprise one or more passive analog circuits that may turn the first signal into an analog cancellation signal, which may be used to remove, at least a portion of the first signal from the third signal, thereby enabling the second transceiver to determine the second signal. In order for the second transceiver to remove the portion of the first signal from the third signal, the second transceiver may also transmit the first signal as well. However, because an analog SIC filter generates a linear impulse response to signals input to the analog SIC filter (e.g., the analog SIC filter outputs a signal that is a linearly distorted version of the input signal) the analog cancellation signal may not be the precise signal required to remove a self-interfering signal from a received signal. Analog SIC filters are sensitive to and require precise programmable time delays with time delay resolutions no less than 10 picoseconds in order to match the delay experienced by the self-interfering signal. Such stringent requirements increase the complexity and costs of the analog SIC filter. Because the first transceiver comprises other radio frequency (RF) components in addition to the first one or more analog SIC filters, the other RF components may generate non-linear and/or linear responses, in response to signals input to the RF components resulting in multiple distortions of the signal. Some of the other RF components that may introduce distortion may include, but are not limited to, an amplifier (e.g., a power amplifier (PA) and a low noise amplifier (LNA)) and a circulator. Thus the total distortion introduced by the RF components may correspond to, three RF components that generate a linear impulse response (e.g., analog SIF filters, LNA filter, and circulator), and one RF component that generates a non-linear impulse response (e.g., PA). Consequently the benefit of an analog SIC filter may be offset by the additional distortion that it introduces to the distortion added by the other RF components.

Another way to cancel self-interference is to add a digital self-interference cancellation circuit to existing full-duplex radios to reduce the distortion introduced by the RF components. Although a digital self-interference cancellation circuit may reduce the distortion introduced by the RF components and reduce the remaining self-interference in a digitized received signal (e.g., a digitization of the third signal), the digital self-interference cancellation circuit may increase the computational complexity of a processor in a modem needed in order to cancel any remaining self-interfering signals. In particular, the computational complexity may increase as a function of the square of the number of antennas and impulse responses corresponding to echo channel paths between the antennas. In general, as the number of antennas increase the number of echo channel paths may also increase. And because most full-duplex radios require at least two antennas, the computational complexity of the processor required to perform the digital self-interference cancellation may be greater than the computational complexity of a non-full-duplex radio (e.g., half-duplex radio). As a result, by adding an additional digital self-interference cancellation circuit, the processor may require more power to perform the computations needed to cancel the self-interfering signals in the digital domain.

In one embodiment, a processor may determine an estimate of the impulse response of the full-duplex radio (e.g., the impulse responses of the RF components and impulse response(s) corresponding to the echo paths between at least one antenna in a full-duplex radio) based at least in part on at least one transmitted periodic signal on at least one of the antennas, and the at least one transmitted periodic signal received (received periodic signal(s)) on the at least one antennas. The approach does not require the precise timing of an analog SIC filter or a computationally complex digital self-interference cancellation circuit. The impulse response of the full-duplex radio may also be referred to as the total impulse response of the full-duplex radio. More specifically, the processor may determine a difference between a received signal comprising, a signal received from a first radio and the received periodic signal(s), and an estimate of the received periodic signal(s), wherein the estimate of the received periodic signal(s) may be a product of the estimate of the impulse response of the full-duplex radio and the received periodic signal(s), and determine if the difference is less than or equal to a predetermined value. After determining that the difference between the received signal and the estimate of the received periodic signal(s) is less than the predetermined value, the processor may determine a signal corresponding to the difference in the signal received from the first radio. In some embodiments, the at least one transmitted periodic signal may be transmitted before permitting a signal received from the first radio to be processed. That is, the processor in the full-duplex radio may simply disregard any signals received from the first radio, while determining the estimate of the received periodic signal(s). The received periodic signal(s) may be used to determine an estimate of self-interfering signals that may be produced when the processor in the full-duplex radio transmits signals and receives signals simultaneously to and from the first radio. In this way, when the processor transmits a signal on a first set of the at least one antennas, and receives signals (e.g., self-interfering signals and signals received from the first radio) on a second set of the at least one antennas, the processor may determine the signals received from the first radio by taking a difference between the received signals and an estimate of the self-interfering signals. Thus, the full-duplex radio may remove, or filter out, any self-interfering signals and determine what the first radio transmitted to the processor without the self-interfering signals.

The systems disclosed herein reduce the self-interference without adding an additional digital cancellation circuit, and the methods disclosed herein reduce the self-interference and do not require the same computational complexity as a method performed by a digital cancellation circuit.

FIG. 1 depicts an example network environment of an illustrative wireless network, according to one or more example embodiments of the disclosure. Wireless network 100 may include one or more user devices 120 and one or more access point(s) (APs) 102, which may communicate in accordance with IEEE 802.11 communication standards and/or Long Term Evolution (LTE) communication standards, and/or other wireless standards. The user device(s) 120 may be mobile devices that are non-stationary (e.g., not having fixed locations) and/or may be stationary devices. In some embodiments, the user device(s) 120 and AP 102 can include one or more computer systems similar to that of the functional diagram of FIG. 8 and/or the example machine/system of FIG. 9.

One or more illustrative user device(s) 120 may be operable by one or more user(s) 110. The user device(s) 120 (e.g., 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth. Any of the user devices 120 (e.g., 124, 126, or 128) may be configured to communicate with each other and any other component of the wireless network 100 via one or more communications networks 130 and 135 wirelessly or wired.

Referring to FIG. 1, there is shown a network diagram illustrating an example wireless network 100 for a packet based system, according to some example embodiments of the present disclosure. In this environment, user devices 120, may communicate with each other and transmit data on an operating channel. These user devices may randomly access the operating channel to transmit their data. However, there may be situations where the user devices may access the operating channel using assigned (or scheduled) time slots. In some embodiments the user devices may be able to communicate with one another or the access point in the same time slot or in different time slots.

The AP 102 and the user device(s) 120 may comprise full-duplex radios thereby enabling the AP 102 and the user device(s) 120 to send and receive packets (e.g., the packet 131 and 132) to one another on a same frequency band. In some embodiments, the user device(s) 120 may be a non-full-duplex radio (e.g., a half-duplex radio) comprising one antenna, or may be a full-duplex radio comprising a single antenna. There may be a set of frequencies that the AP 102 and/or the user device(s) 120 may use to transmit and receive packets on simultaneously. For instance, the AP 102 and/or the user device(s) 120 may comprise at least two transceivers, wherein each of the at least two transceivers may comprise a transmit chain and a receive chain coupled to an antenna. The AP 102 may simultaneously transmit signals on a first set of the at least two transceivers and receive signals on a second set of the at least two transceivers on at least one frequency to and from the user device(s) 120 respectively, and the user device(s) 120 may simultaneously transmit signals on a third set of the at least two transceivers and receive signals on a fourth set of the at least two transceivers on at least one frequency to and from the AP 102. For instance in some embodiments the AP 102 and the user device(s) 120 may use a wideband single (i.e., a signal that is transmitted with a bandwidth of 20 MHz or more). As an example, the AP 102 and the user device(s) 120 may simultaneously transmit packets 132 and 131 on frequency Freq 143 and Freq 141 respectively. The set of frequencies allocated to the AP 102 and/or the user device(s) 120 (allocated frequencies) may correspond to frequencies that may be used by the AP 102 and the user device(s) 120 to communicate in accordance with one or more wireless personal area network (WPAN) standards (e.g., IEEE 802.11), cellular standards (e.g., LTE) that use a single-carrier frequency division multiple access (SC-FDMA) access scheme.

Before the AP 102 and the user device(s) 120 are able to transmit and receive packets on the same frequency, the processors in the AP 102 and the user device(s) 120 may transmit periodic signals, to determine an estimate of self-interfering signals that may be produced when the processors transmit and receive packets simultaneously. As explained above, the processors in the AP 102 and the user device(s) 120 may transmit periodic signals, and may disregard the signals that they may receive from the other device (e.g., the processor in the AP 102 may transmit periodic signals and user device(s) 120 may disregard the periodic signals and vice versa) in order to determine the estimate of the self-interfering signals. After the estimate of the self-interfering signals is determined the AP 102 and the user device(s) 120 may transmit and receive packets on the same frequency simultaneously and filter out, any self-interfering signals.

As an example, the processor in the AP 102 may determine an estimate of self-interfering signals by transmitting periodic signals on the first set of at least one transceivers, and determining the self-interference experienced by the second set of at least one transceivers as the transmitted periodic signals are received. In particular, the processor in the AP 102 may determine a difference between a received signal comprising, the received transmitted periodic signals (e.g., self-interfering signals), and an estimate of the received transmitted periodic signals, wherein the estimate of the received transmitted periodic signals may be a product of the estimate of the impulse response of the full-duplex radio and the received transmitted periodic signals, and determine that the difference is less than or equal to a predetermined value. After determining that the difference between the received signal and the estimate of the received transmitted periodic signals is less than the predetermined value, the processor may determine that the estimate of the received transmitted periodic signals may be used to filter out any self-interfering signals as the processor transmits and receives signals simultaneously on the same frequency band to the user device(s) 120.

Any of the communications networks 130 and 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. Communications antenna may be any suitable type of antenna corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, and/or cellular antennas capable of transmitting and/or receiving cellular LTE signals. The communications antenna may be communicatively coupled to a radio component to transmit and/or receive signals, such as communications signals to and/or from the user devices 120.

Any of the user devices 120 (e.g., 124, 126, or 128) and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Figure 2:
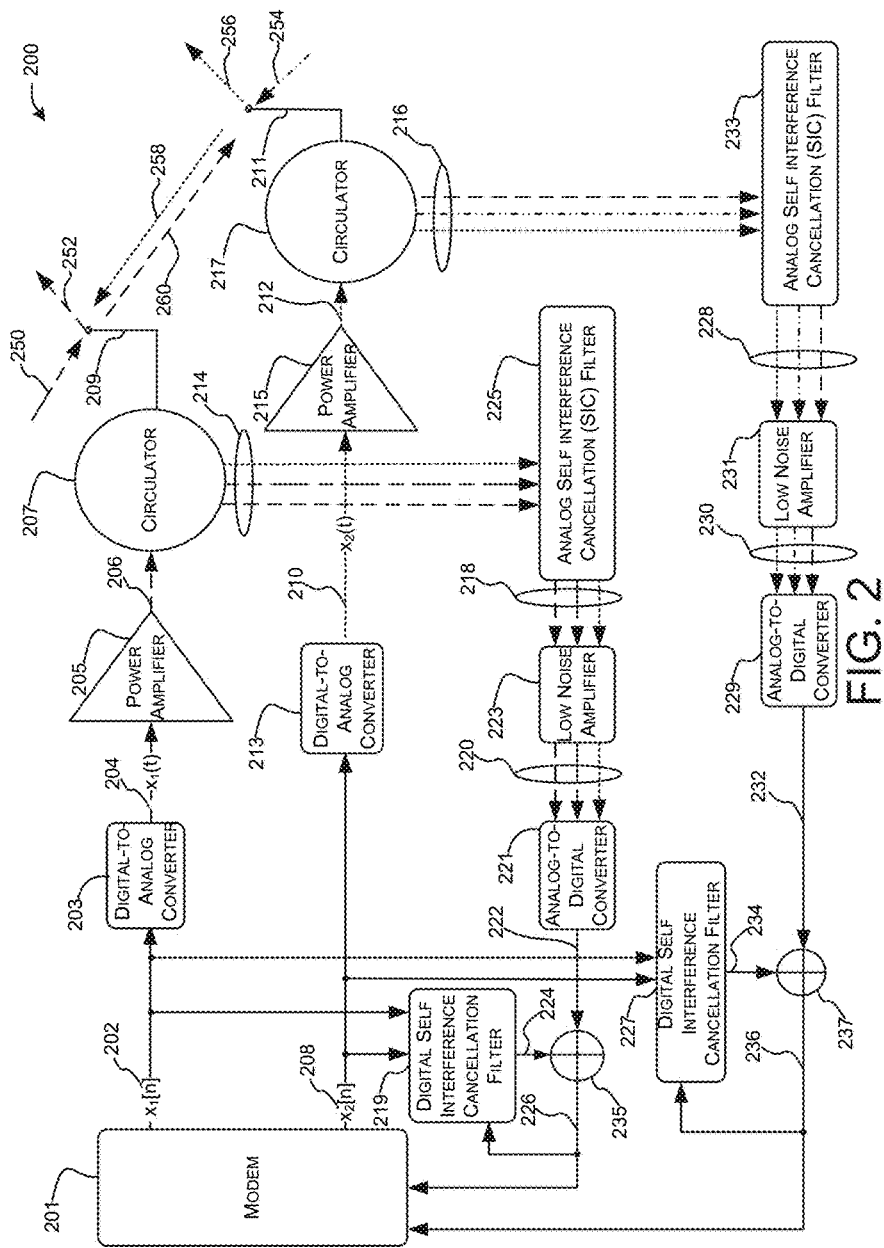
FIG. 2 depicts exemplary circuit components, according to one or more example embodiments of the disclosure.

FIG. 2 depicts an exemplary circuit 200 of an illustrative device (e.g., the AP 102 and/or the user device(s) 120), according to one or more example embodiments of the disclosure. The exemplary circuit 200 may comprise a processor and/or one or more self-interference cancellation circuits (e.g., the digital self-interference cancellation filter 219 and the digital cancellation circuit 235) that may receive at least one digital symbol (e.g., the symbol $y_2[n]$ 232) that may correspond to at least one transmitted digital symbols (e.g., the symbols $x_1[n]$ 202 and the symbols $x_2[n]$ 208) and may determine an estimate of the received at least one digital symbols based at least in part on the transmitted digital symbols. The processor and/or one or more self-interference cancellation circuits may determine an estimate of a total impulse response of the exemplary circuit 200 based at least in part on the transmitted digital symbols and the received at least one digital symbols, and determine an estimate of the received at least one digital symbols based at least in part on the determined estimate of the total impulse response to determine if the estimate of the received at least one digital symbols may be used to filter out any self-interference generated by the transmit chains in the exemplary circuit 200.

The exemplary circuit 200 may be an exemplary multiple input multiple output (MIMO) frequency division (FD) circuit 200 comprising a modem (e.g., the modem 201) that may modulate and demodulate at least one signal using according to a modulation/demodulation scheme including but not limited to phase shift keying (PSK) (e.g., bi-phase shift keying (BPSK)), amplitude modulation (e.g., quadrature amplitude modulation (QAM)), frequency shift keying, orthogonal frequency division multiplexing (OFDM), frequency division multiplexing (e.g., single carrier frequency division multiple access (SC-FDMA) etc. The modulation/demodulation scheme may correspond to any digital modulation scheme in which a processor (not shown) executes computer-executable instructions that may cause the processor to send a sequence of bits to a network layer (NWK) circuit (not shown) that may encapsulate the bits in a packet. The NWK circuit may then transmit the packet to a medium access control layer (MAC) circuit that may encapsulate the packet in a frame. The MAC circuit may then transmit the frame to a physical layer (PHY) circuit that may map a predetermined number of bits of the frame to an analog signal corresponding to a digital modulation scheme. In some embodiments, the PHY circuit may comprise a circuit to modulate the bits in the frame. The PHY circuit may receive and buffer each frame and divide the frame into blocks of bits. Each block of bits may be referred to as a symbol. Each symbol may correspond to a real or complex number. A complex number may comprise a real and imaginary number. For example the complex symbol may comprise a real and imaginary number corresponding to a bit string. For example, a q-QAM modulation symbol may comprise $2^q$ unique symbols wherein each unique symbol may have a corresponding in-phase (e.g., real) and quadrature (e.g., imaginary) analog signal that may be modulated to transmit the unique symbol.

The way the frame is divided into bits may be determined by a modulation scheme selected by the modem 201. As an example, a q-QAM modulation scheme, wherein q represents a constellation size of the QAM modulation scheme may result in the frame comprising $$\frac{B}{q}$$

bits, wherein B represents the number of bits in the frame. In general a frame may comprise a plurality of symbols and the number of symbols in the frame may be determined by the modulation scheme, and may be represented by $x[n]$ wherein n=1, 2, . . . , N. Thus the frame may comprise N symbols each of which may comprise a block of bits represented by $x[n]$. The symbols $x[n]$ may be outputted by the modem 201 as symbols $x_1[n]$ 202 and $x_2[n]$ 208. In some embodiments, the processor may execute computer-executable instructions that cause the modem 201 to output every other symbol as symbols $x_1[n]$ 202 and the remaining symbols as symbols $x_2[n]$ 208.

In other embodiments, there may be a circuit in the modem 201 configured to transmit the symbols as $x_1[n]$ 202 and $x_2[n]$ 208 based at least in part on determining an estimate of self-interfering signals between at least two transceivers, wherein each of the at least two transceivers may comprise a transmit chain and a receive chain coupled to an antenna. As explained above, the symbols may be symbols transmitted in a frame, and the frame may comprise a total of N symbols. The symbols $x_1[n]$ 202 and $x_2[n]$ 208, for n=1, 2, . . . , N, may be symbols in a first and second frame, and the symbols $x_1[n]$ 202 and $x_2[n]$ 208 may be periodic over the N different symbols as explained below. The modem 201, or more specifically a processor in the modem, may determine an estimate of the self-interfering signals by determining an impulse response of a first transmit chain (e.g., power amplifier 205 and circulator 207), a first receive chain (e.g., circulator 207, analog signal interference cancellation (SIC) filter 225, and Low Noise Amplifier 223), and an impulse response corresponding to an echo channel path (not shown) between a first antenna (e.g., antenna 209), associated with the first transmit chain and the first receive chain, and a second antenna (e.g., antenna 211), associated with a second transmit chain (e.g., power amplifier 215 and circulator 217) and a second receive chain (e.g., circulator 217, analog signal interference cancellation (SIC) 233, and low noise amplifier 231). For instance, the first L symbols in the first frame comprising the symbols $x_1[n]$ 202, may also be the same as the second L symbols in the first frame, the third L symbols in the first frame, etc. In general there may be $$\frac{N}{L}$$

groups of symbols wherein, the first through the $$\left(\frac{N}{L}\right)^{th}$$

symbol of each group of symbols from the $$\frac{N}{L}$$

groups of symbols may be the same. Similarly the first L symbols in the second frame comprising the symbols $x_2[n]$ 208, may also be the same as the second L symbols in the second frame, the third L symbols in the second frame, etc. In general there may be $$\frac{N}{L}$$

groups of symbols wherein, the first through the $$\left(\frac{N}{L}\right)^{th}$$

symbol of each group of symbols from the $$\frac{N}{L}$$

groups or symbols may be the same. The processor in the modem 201 may transmit the symbols $x_1[n]$ 202 and $x_2[n]$ 208 for all n=1, 2, ..., N, to antenna 209 and antenna 211 respectively, at least two times and may receive two first estimates of self-interfering symbols $\widehat{y_1[n]}$ 226 and two second estimates of self-interfering symbols $\widehat{y_2[n]}$ 236, from antenna 209 and antenna 211 respectively, corresponding to the impulse responses of the first and second transmit and receive chains and the impulse response of the echo channel path from the antenna 209 to the antenna 211 and vice versa. The digital self-interference cancellation filters 219 and 227 and digital cancellation circuits 235 and 237 may then use the two first estimates of self-interfering symbols $\widehat{y_1[n]}$ 226 and two second estimates of self-interfering symbols $\widehat{y_2[n]}$ 236, for all n=1, 2, ..., N, and two first self-interfering symbols $y_1[n]$ and two second self-interfering symbols $y_2[n]$ for all n=1, 2, ..., N, to determine that a difference between the two first estimates of the self-interfering symbols $\widehat{y_1[n]}$ 226 and two second estimates of self-interfering symbols $\widehat{y_2[n]}$ 236 and the two first self-interfering symbols $y_1[n]$ and two second self-interfering symbols $y_2[n]$ for all n=1, 2, ..., N is less than or equal to a predetermined value. After determining that the difference is less than the predetermined value the processor in the modem 201 or the digital self-interference cancellation filters 219 and 227 and digital cancellation circuits 235 and 237 may use the two first estimates of the self-interfering symbols $\widehat{y_1[n]}$ 226 and the two second estimates of self-interfering symbols $\widehat{y_2[n]}$ 236 to remove, or filter out, any self-interfering symbols in order to determine received symbols from other radios (e.g., the user device(s) 120) without the self-interfering symbols (e.g., without subsequent self-interfering symbols $y_1[n]$ and $y_2[n]$).

In some embodiments, symbol (e.g., $_rx_1[i]$ and/or $_rx_2[i]$) of repeated symbols (e.g., $_rx_1[n]$ and $_rx_2[n]$) may be the same as symbols (e.g., $x_1[i]$ and/or $x_2[i]$) of first transmitted symbols (e.g., $x_1[n]$ and $x_2[n]$). That is the modem 201 may transmit $_rx_1[i]=x_1[i]$ and $_rx_2[i]=x_2[i]$ for all i=1, ..., n and r=2, ..., where "r" represents the number of times the symbols $_rx_1[i]$ and $_rx_2[i]$ may be transmitted. Returning to the example above, if the modem 201 transmits the symbols $x_1[n]$ 202 and $x_2[n]$ 208 more than two times (e.g., five times), then $_1x_1[i]=_2x_1[i]=_3x_1[i]=_4x_1[i]=_5x_1[i]$ and $_1x_2[i]=_2x_2[i]=_2x_2[i]=_3x_2[i]=_4x_2[i]=_5x_2[i]$ for all i=1, ..., N. That is, the $i^{th}$ symbol in each of the five repeated symbols may be equal for all i=1, ..., N.

The symbols $x_1[n]$ 202 and $x_2[n]$ 208 may be referenced by a discrete time and/or length index "n". In some embodiments, the symbols $x_1[n]$ 202 and $x_2[n]$ 208 may be encoded symbols of a source coded data block corresponding to an application (e.g., a Voice over Internet Protocol (VoIP) phone call, Virtual Private Network (VPN) connection). In other embodiments, the symbols may correspond to pilot signals that may be sent from the AP 102 to the user device(s) 120 so that the user device(s) 120 may train a receiver within the user device(s) 120 to identify a signal from a transmitting device, adjust an automatic gain control (AGC), determine and/or adjust diversity selection, determine and/or adjust coarse frequency offset estimation and timing synchronization, determine and/or adjust channel and fine frequency offset estimation. In this way the AP 102 may transmit repeated symbols so that the user device(s) 120 may tune a superheterodyne circuit corresponding to at least one frequency that the AP 102 may want to use to transmit packets to the user device(s) 120 and receive packets from the user device(s) 120, while determining an estimate of self-interfering symbols.

In order for the processor in the modem 201 to transmit the symbols $x_1[n]$ 202 and $x_2[n]$ 208, the symbols $x_1[n]$ 202 and $x_2[n]$ 208 may need to be converted to analog signals and transmitted on the first transmit chain (e.g., power amplifier 205 and circulator 207), and the second transmit chain (e.g., power amplifier 215 and circulator 217) respectively. In order for the processor in the modem 201 to receive estimates of the self-interfering symbols $\overline{y_1[n]}$ 226 and self-interfering symbols $\overline{y_2[n]}$ 236 the self-interfering analog signals 260 and 258 may need to be converted to symbols by being received on the first receive chain (e.g., circulator 207, analog signal interference cancellation (SIC) filter 225, and Low Noise Amplifier 223) and the second receive chain (e.g., circulator 217, analog signal interference cancellation (SIC) 233, and low noise amplifier 231) respectively.

The modem 201 may transmit symbols $x_1[n]$ 202 to a digital-to-analog converter (e.g., the digital-to-analog converter 203) and a signal interference cancellation filter (e.g., the digital signal interference cancellation filter 219) and/or another signal interference cancellation filter (e.g., the digital signal interference cancellation filter 227). The digital-to-analog converter 203 may convert the symbols $x_1[n]$ 202 to analog signals corresponding to the symbols $x_1[n]$ 202. The digital-to-analog converter 203 may convert the symbols $x_1[n]$ 202 into a sequence of impulses. In some embodiments, the digital-to-analog converter 203 may convert the symbols into a piecewise constant function comprising a sequence of rectangular functions corresponding to a zero-order hold associated with analog signal. In other embodiments, a delta-sigma modulation scheme may be used to convert the symbols $x_1[n]$ 202 to analog signals that may produce a pulse-density modulated signal that can then be filtered to produce a smooth time varying analog signal. The modem 201 may transmit symbols $x_2[n]$ 208 to a digital-to-analog converter (e.g., the digital-to-analog converter 213) and a signal interference cancellation filter (e.g., the digital signal interference cancellation filter 219) and/or another signal interference cancellation filter (e.g., the digital signal interference cancellation filter 227). The digital-to-analog converter 213 may convert the symbols $x_2[n]$ 208 to analog signals corresponding to the symbols $x_2[n]$ 208. The digital-to-analog converter 213 may convert the symbols $x_2[n]$ 208 into a sequence of impulses. In some embodiments, the digital-to-analog converter 213 may convert the symbols into a piecewise constant function comprising a sequence of rectangular functions corresponding to a zero-order hold associated with analog signal. In other embodiments, a delta-sigma modulation scheme may be used to convert the symbols $x_2[n]$ 208 to analog signals that may produce a pulse-density modulated signal that can then be filtered to produce a smooth time varying analog signal.

Analog symbol $x_1(t)$ 204 may correspond to symbol $x_1[n]$ 202. Analog symbol $x_1(t)$ 204 may be amplified by a power amplifier (e.g., the power amplifier 205). Power amplifier 205 may comprise one or more solid-state devices comprising bipolar junction transistors (BJTs) and/or metal oxide silicon field effect transistors (MOSFETs) to convert $x_1(t)$ 204 from a radio frequency (RF) signal with a first power to a RF signal with a second power. In some embodiments, the first power may be less than the second power. In other embodiments, the first power may be greater than the second power. A plurality of parameters including, but not limited to, a signal gain, power output, bandwidth, power efficiency, linearity (i.e., low signal compression at rated output), input and output impedance matching, and heat dissipation may be controlled by the power amplifier 205. More specifically, a processor in the modem 201 may execute computer-executable instructions to cause the power amplifier 205 to adjust the plurality of parameters. The power amplifier 205 may also be used to drive (e.g., supply power to) antenna 209 when transmitting an amplified analog signal (e.g., amplified analog signal $_a x_1(t)$ 206) by exciting a microwave cavity resonator in antenna 209. Because the power amplifier 205 comprises analog circuits (e.g., BJTs and/or MOSEFTs) that exhibit non-linear characteristics in response to an applied signal, the power amplifier 205 may have a non-linear impulse response as explained above. Accordingly, the processor in the modem 201 may determine a first analytical impulse response (e.g., $f_m^{PA}(x_m[n])$) corresponding to the non-linear impulse response of the power amplifier 205 for m=1. The processor in the modem 201 may determine that the first analytical impulse response may be approximately equal to K Kernel basis functions (e.g., $\varphi_1(x_1[n]), \ldots, \varphi_K(x_1[n])$). In some embodiments the K kernel basis functions may be determined using a Taylor series approximation. Thus, $f_1^{PA}(x_1[n]) \cong \Sigma_{k=1}^{K} a_k \varphi_k(x_1[n]) = \Sigma_{k=1}^{K} a_k x_{1,k}[n]$. The processor in the modem 201 may approximate the $k^{th}$ Kernel basis function of the K Kernel basis functions by determining a product of the symbol $x_1[n]$ 202 and the absolute value of the symbol $x_1[n]$ 202 raised to the $(k-1)^{th}$ power. That is, the basis functions $\varphi_k(x_1[n])$ may equal $x_1[n]|x_1[n]|^{k-1} \forall k \in 1, 2, \ldots, K$ (e.g., $\varphi_k(x_1[n]) = x_1[n]|x_1[n]|^{k-1} \forall k \in 1, 2, \ldots, K$). In some embodiments K may be equal to 1 thus the processor may determine that the basis functions may be $\varphi_k(x_1[n]) = x_1[n]|x_1[n]|^{1-1} = x_1[n]|x_1[n]|^0 = x_1[n] \times 1 = x_1[n]$. The first analytical impulse response may be determined to be $f_1^{PA}(x_1[n]) \cong \Sigma_{k=1}^{K} a_k \varphi_k(x_1[n]) = \Sigma_{k=1}^{K} a_k x_1[n]|x_1[n]|^{k-1} = \Sigma_{k=1}^{K} a_k x_{1,k}[n]$. The basis function $\varphi_k(x_1[n])$ may be equal to $x_{1,k}[n]$, and the equivalence of $\varphi_k(x_1[n])$ to $x_{1,k}[n]$ is illustrated here to simplify the nomenclature used in the first analytical impulse response. It should also be noted that any reference to the symbol $x_1[n]$ in the equations herein is the same as the symbol $x_1[n]$ 202. The identifier "202" has been withheld from use in the equations for readability. The first analytical impulse response may also be referred to as an estimate of the impulse response of the power amplifier 205. In some embodiments, the constant $a_k$ may be a real or complex valued number that may be used to determine the non-linearity of the estimate of the impulse response of the power amplifier 205 after the total impulse response of the full-duplex radio is determined as explained below in FIGS. 5-7.

Analog symbol $x_2(t)$ 210 may correspond to symbol $x_2[n]$ 208. Analog symbol $x_2(t)$ 210 may be amplified by a power amplifier (e.g., the power amplifier 215). Power amplifier 215 may comprise one or more solid-state devices comprising bipolar junction transistors (BJTs) and/or metal oxide silicon field effect transistors (MOSFETs) to convert $x_2(t)$ 210 from a radio frequency (RF) signal with a first power to a RF signal with a second power. In some embodiments, the first power may be less than the second power. In other embodiments, the first power may be greater than the power. A plurality of parameters including, but not limited to, a signal gain, power output, bandwidth, power efficiency, linearity (i.e., low signal compression at rated output), input and output impedance matching, and heat dissipation may be controlled by the power amplifier 215. More specifically, a processor in the modem 201 may execute computer-executable instructions to cause the power amplifier 215 to adjust the plurality of parameters. The power amplifier 215 may also be used to drive (i.e., supply power to) antenna 211 when transmitting an amplified analog signal (e.g., amplified analog signal $_a x_2(t)$ 212) by exciting a microwave cavity resonator in antenna 211. Because the power amplifier 215 comprises analog circuits (e.g., BJTs and/or MOSEFTs) that exhibit non-linear characteristics in response to an applied signal, the power amplifier 215 may have a non-linear impulse response as explained above. Accordingly, the processor in the modem 201 may determine a first analytical impulse response (e.g., $f_m^{PA}(x_m[n])$) corresponding to the non-linear impulse response of the power amplifier 215 for m=2. The processor in the modem 201 may determine that the first analytical impulse response may be approximately equal to a K Kernel basis functions (e.g., $\varphi_1(x_2[n]), \ldots, \varphi_K(x_2[n])$). Thus, $f_2^{PA}(x_2[n]) \cong \Sigma_{k=1}^{K} a_k \varphi_k(x_2[n]) = \Sigma_{k=1}^{K} a_k x_{2,k}[n]$. The processor in the modem 201 may approximate the $k^{th}$ Kernel basis function of the K Kernel basis functions by determining a product of the symbol $x_2[n]$ 208 and the absolute value of the symbol $x_2[n]$ 208 raised to the $(k-1)^{th}$ power. That is, the basis functions $\varphi_k(x_2[n])$ may equal $x_2[n]|x_2[n]|^{k-1} \forall k \in 1, 2, \ldots, K$ (e.g., $\varphi_k(x_2[n]) = x_2[n]|x_2[n]|^{k-1} \forall k \in 1, 2, \ldots, K$). In some embodiments K may be equal to 1 thus the processor may determine that the basis functions may be $\varphi_k(x_2[n]) = x_2[n]|x_2[n]|^{1-1} = x_2[n]|x_2[n]|^0 = x_2[n] \times 1 = x_2[n]$. The first analytical impulse response may be determined to be $f_2^{PA}(x_2[n]) \cong \Sigma_{k=1}^{K} a_k \varphi_k(x_2[n]) = \Sigma_{k=1}^{K} a_k x_2[n]|x_2[n]|^{k-1} = \Sigma_{k=1}^{K} a_k x_{2,k}[n]$. The basis function $\varphi_k(x_2[n])$ may be equal to $x_{2,k}[n]$, and the equivalence of $\varphi_k(x_2[n])$ to $x_{2,k}[n]$ is illustrated here to simplify the nomenclature used in the first analytical impulse response. It should also be noted that any reference to the symbol $x_2[n]$ in the equations herein is the same as the symbol $x_2[n]$ 208. The identifier "208" has been withheld from use in the equations for readability. The first analytical impulse response may also be referred to as an estimate of the impulse response of the power amplifier 215. In some embodiments, the constant $a_k$ may be a real or complex valued number that may be used to determine the non-linearity of the estimate of the impulse response of the power amplifier 215 after the total impulse response of the full-duplex radio is determined as explained below in FIGS. 4-7.

It should be noted that the index m may represent a positive natural number for example, any number greater than or equal to 1, corresponding to a transceiver. For example, m=1 may correspond to a first transceiver comprising the first transmit chain and first receive chain, and m=1 may correspond to a second transceiver comprising the second transmit chain and second receive chain. In general, m could be greater than m=2, and it should be noted that exemplary circuit 200 is just exemplary. It should also be noted that the K is a positive natural number and that the number of basis functions (i.e., the number K) may be different for m=1 and m=2 in some embodiments. For example, if the power amplifier 205 is not the same as the power amplifier 215, then the number of basis functions may be different. For instance, if the power amplifier 205 exhibits a non-linear impulse response comprising a higher degree of non-linearity (e.g., $x^5+x^4+x$) than the power amplifier 215 (e.g., $x^2$) then the number of basis functions used to estimate the impulse response of the power amplifier 205 may be greater than the number of basis functions used to estimate the impulse response of the power amplifier 215. That is the impulse response of the power amplifier 205 may be a polynomial with an order equal to any negative or positive natural number (e.g., the order of the polynomial $x^5+x^4+x$ may be 5 because the greatest number exponent is 5).

The amplified analog signal $_ax_1(t)$ 206 may be combined with a received signal (e.g., the $r_1(t)$ 250) and a self-interference signal (e.g., the $sis_1(t)$ 258) in a circulator (e.g., the circulator 207). In some embodiments the circulator 207 may be a ferrite circulator, and/or in other embodiments it may be a non-ferrite circulator. The circulator 207 may be a three port "Y-junction" circulator. The amplified analog signal $_ax_1(t)$ 206 may be received in the circulator 207 and may be transmitted to the analog signal cancellation filter (SIC) filter 225 and the antenna 209 by the circulator 207. The circulator 207 may also receive a received signal (e.g., the received signal $r_1(t)$ 250) and a self-interference signal (e.g., the self-interference signal $sis_1(t)$ 258) via antenna 209. The circulator 207 may transmit the amplified analog signal $_ax_1(t)$ 206, the received signal $r_1(t)$ 250, and the self-interference signal $sis_1(t)$ 258 out of one of the three "Y" ports to an analog self-interference cancellation filter (analog SIC filter) (e.g., the analog SIC filter 225). These three signals may collectively be referred to as the first set of analog signals $s_1(t)$ 214. The analog SIC filter 225 may comprise at least one analog circuit comprising one or more transistors that may minimize the analog self-interference signal $sis_1(t)$ 258. The analog SIC filter 225 may transmit a second set of analog signals (e.g., $s_{1'}(t)$ 218) comprising the amplified analog signal $_ax_1(t)$ 206, the received signal $r_1(t)$ 250, and a minimized analog self-interference signal (e.g., $sis_{1'}(t)$ 270) corresponding to the minimized analog self-interference signal $sis_1(t)$ 258 to a low noise amplifier (e.g., low noise amplifier 223). The low noise amplifier 223 may comprise one or more transistors that may maximize the signal to noise ratio (SNR) of the received signal $r_1(t)$ 250 thereby creating a third set of analog signals (e.g., $s_{1''}(t)$ 220) comprising the amplified analog signal $_ax_1(t)$ 206, a (SNR) maximized received signal (e.g., $r_{1'}(t)$ 272) corresponding to the received signal $r_1(t)$ 250 with a maximized SNR, and the minimized analog self-interference signal $sis_{1'}(t)$ 270. The low noise amplifier 223 may increase the signal to noise ratio by minimizing the noise floor of the received signal $r_1(t)$ 250, or by increasing the signal of the received signal $r_1(t)$ 250 relative to the noise also resulting in an increased signal to noise ratio. The low noise amplifier 223 may then transmit $s_3(t)$ 220 to an analog to digital converter (e.g., the analog to digital converter 221) which may perform the opposite operation of the digital to analog converter 203. The output of the analog to digital converter 221 may be symbols (e.g., symbols $y_1[n]$ 222) corresponding to the symbols $x_1[n]$ 202 transmitted by the modem 201. The symbols $y_1[n]$ 222 may be transmitted from analog-to-digital converter 221 to a digital cancellation circuit 235 that may determine an estimate (e.g., the symbols $\widehat{y_1[n]}$ 226) of the symbols $y_1[n]$ 222 by determining an estimate of an impulse response of the first transceiver (e.g., impulse response of the power amplifier 205, the circulator 207, the analog SIC filter 225, and the low noise amplifier 223) and determining a product of the estimate of the impulse response of the first transceiver and the symbols $y_1[n]$ 222 as explained below in FIG. 4. The estimate of the impulse response of the first transceiver and the symbols $y_1[n]$ 222 may be based at least in part on the number of basis functions (e.g., the number K) that may be used to determine an estimate of the impulse response, of not only the power amplifier 205, but an estimate of an impulse response of other components of the first transmit (e.g., the circulator 207) and the first receive chain (e.g., the analog SIC filter 225, and the low noise amplifier 223) of the first transceiver. The digital cancellation circuit 235 may transmit the symbols $\widehat{y_1[n]}$ 226 to digital self-interference cancellation filter 219 and digital self-interference cancellation filter 219 may determine that the number of basis functions should be changed (e.g., the digital self-interference cancellation filter 219 may determine that K may be increased or decreased). After determining the number of basis functions the digital self-interference cancellation filter 219 may determine $\varphi_k(x_1[n]) = x_1[n]|x_1[n]|^{k-1} \forall k \in 1, 2, \ldots, K$, wherein K is a different number than the number used to determine the estimate of the impulse response of the first transceiver. That is, the number of times the absolute value of the symbols $x_1[n]$ 202 may be multiplied together in order to determine an estimate of the impulse response of the first transceiver may be determined by the digital self-interference cancellation filter 219 based on the symbols $\widehat{y_1[n]}$ 226 and the symbols $x_1[n]$ 202 and the symbols $x_2[n]$ 208.

The amplified analog signal $_ax_2(t)$ 212 may be combined with a received signal (e.g., the $r_2(t)$ 254) and a self-interference signal (e.g., the $s_2(t)$ 260) in a circulator (e.g., the circulator 217). In some embodiments the circulator 217 may be a ferrite circulator, and/or in other embodiments it may be a non-ferrite circulator. The circulator 217 may be a three port "Y-junction" circulator. The amplified analog signal $_ax_2(t)$ 212 may be received in the circulator 217 and may be transmitted to the analog signal cancellation filter (SIC) 233 and the antenna 211 by the circulator 217. The circulator 217 may also receive a received signal (e.g., the received signal $r_2(t)$ 254) and a self-interference signal (e.g., the self-interference signal $sis_2(t)$ 260) via antenna 211. The circulator 217 may transmit the amplified analog signal $_ax_2(t)$ 212, the received signal $r_2(t)$ 254, and the self-interference signal $sis_2(t)$ 260 out of one of the three "Y" ports to an analog self-interference cancellation (analog SIC) (e.g., the analog SIC 233). These three signals may collectively be referred to as the first set of analog signals $s_2(t)$ 216. The analog SIC 233 may comprise at least one analog circuit comprising one or more transistors that may minimize the analog self-interference signal $sis_2(t)$ 260. The analog SIC 233 may transmit a second set of analog signals (e.g., $s_{2'}(t)$ 228) comprising the amplified analog signal $_ax_2(t)$ 212, the received signal $r_2(t)$ 254, and a minimized analog self-interference signal (e.g., $sis_{2'}(t)$ 272) corresponding to the minimized analog self-interference signal $sis_2(t)$ 260 to a low noise amplifier (e.g., low noise amplifier 231). The low noise amplifier 231 may comprise one or more transistors that may maximize the signal to noise ratio (SNR) of the received signal $r_2(t)$ 254 thereby creating a third set of analog signals (e.g., $s_{2''}(t)$ 230) comprising the amplified analog signal $_ax_2(t)$ 212, a (SNR) maximized received signal (e.g., $r_{2'}(t)$ 274) corresponding to the received signal $r_2(t)$ 254 with a maximized SNR, and the minimized analog self-interference signal $sis_{2'}(t)$ 272. The low noise amplifier 231 may increase the signal to noise ratio by minimizing the noise floor of the received signal $r_2(t)$ 254, or by increasing the signal of the received signal $r_2(t)$ 254 relative to the noise also resulting in an increased signal to noise ratio. The low noise amplifier 231 may then transmit $s_{2''}(t)$ 230 to an analog to digital converter (e.g., the analog to digital converter 229) which may perform the opposite operation of the digital to analog converter 221. The output of the analog to digital converter 221 may be symbols (e.g., symbols $y_2[n]$ 232) corresponding to the symbols $x_2[n]$ 208 transmitted by the modem 201. The symbols $y_2[n]$ 232 may be transmitted from analog-to-digital converter 229 to a digital cancellation circuit 237 that may determine an estimate (e.g., the symbols $\widehat{y_2[n]}$ 236) of the symbols $y_2[n]$ 232 by determining an estimate of an impulse response of the first transceiver (e.g., impulse response of the power amplifier 215, the circulator 217, the analog SIC 233, and the low noise amplifier 231) and determining a product of the estimate of the impulse response of the first transceiver and the symbols $y_2[n]$ 232 as explained below in FIGS. 4-7. The estimate of the impulse response of the first transceiver and the symbols $y_2[n]$ 232 may be based at least in part on the number of basis functions (e.g., the number K) that may be used to determine an estimate of the impulse response, of not only the power amplifier 215, but an estimate of an impulse response of other components of the first transmit (e.g., the circulator 217) and the first receive chain (e.g., the analog SIC 233, and the low noise amplifier 231) of the first transceiver. The cancellation circuit 237 may transmit the symbols $\widehat{y_2[n]}$ 236 to digital self-interference cancellation filter 227 and digital self-interference cancellation filter 227 may determine that the number of basis functions should be changed (e.g., the digital self-interference cancellation filter 227 may determine that K may be increased or decreased). After determining the number of basis functions the digital self-interference cancellation filter 227 may determine $\varphi_k(x_2[n])=x_2[n]|x_2[n]|^{k-1} \forall k \in 1, 2, \ldots, K$, wherein K is a different number than the number used to determine the estimate of the impulse response of the first transceiver. That is, the number of times the absolute value of the symbols $x_2[n]$ 208 may be multiplied together in order to determine an estimate of the impulse response of the first transceiver may be determined by the digital self-interference cancellation filter 227 based on the symbols $\widehat{y_2[n]}$ 236 and the symbols $x_1[n]$ 202 and the symbols $x_2[n]$ 208.

Figure 3A:
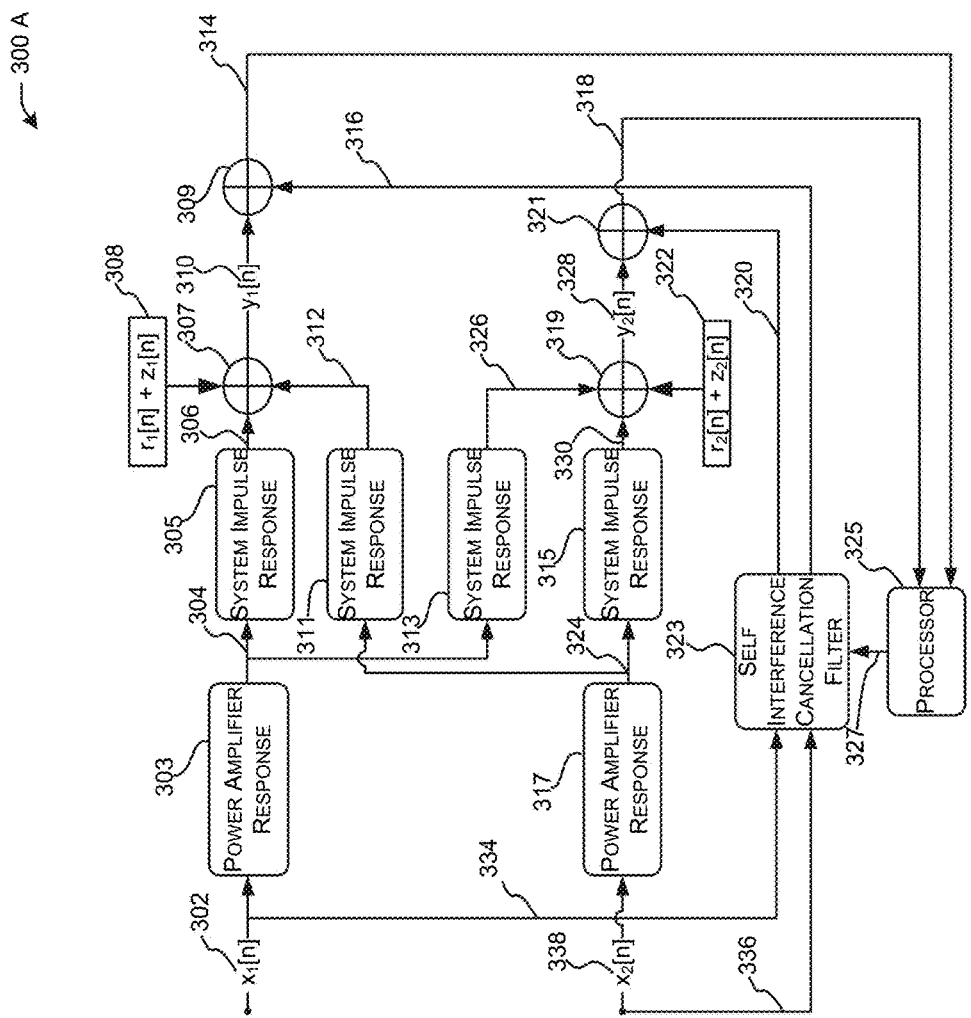
FIG. 3A depicts exemplary circuit components, according to one or more example embodiments of the disclosure.

FIG. 3A depicts an exemplary circuit 300A, according to one or more example embodiments of the disclosure. The exemplary circuit 300A may be associated with a full-duplex radio comprising one or more logic circuits. In particular, an exemplary circuit 300A may be an application-specific integrated circuit (ASIC), or it may be a logic circuit implemented in a processor in the full-duplex radio. In some embodiments, the exemplary circuit 300A may comprise one or more logical circuits that may determine a first power amplifier response (e.g., power amplifier response 303) and a second power amplifier response (e.g., power amplifier response 317). The power amplifier responses 303 and 317 may correspond to an impulse response of the power amplifiers 205 and 215 respectively in FIG. 2.

In some embodiments, the exemplary circuit 300A may comprise one or more circuits that may determine a system impulse response 305 that may correspond to an impulse response of a first circulator (e.g., the circulator 207 in FIG. 2), an impulse response of a first analog SIC filter (e.g., the analog SIC filter 225 in FIG. 2), and/or an impulse response of a first LNA (e.g., the low noise amplifier 223 in FIG. 2). In other embodiments, the exemplary circuit 300A may further comprise a system impulse response 311 that may determine an echo channel path impulse response from a first antenna (e.g., the antenna 209 in FIG. 2) to a second antenna (e.g., the antenna 211 in FIG. 2) coupled to the full-duplex radio. The echo channel path impulse may be any small or large scale variations experienced by a signal transmitted from the antenna 209 to the antenna 211. For example, the signal may be comprised of electromagnetic energy that that may vary in time. For instance, the electromagnetic energy of the signal may be greater at some time $t_1$ than at some other time $t_2$ based at least in part on data (e.g., binary data) encoded in the electromagnetic energy. As the signal propagates from the first antenna to the second antenna the signal may be reflected off of a housing and/or enclosure enclosing the exemplary circuit 300A. Therefore the second antenna may receive multiple (e.g., duplicate) versions of the transmitted signal with different electromagnetic energies. Therefore the second antenna may receive one or more signals corresponding to the transmitted signal, wherein the electromagnetic energies may be different (e.g., amplitude variation) of the one or more signals, the time of arrival (ToA) may be different (e.g., time delay) of the one or more signals, and a phase (e.g., difference in angle between the one or more signals) of the one or more signals may be different. Accordingly the system impulse response 311 may determine amplitude variation, ToA, and phase differences of the one or more signals. The reflected signal may be attenuated as it is. In some embodiments, the echo channel path impulse response maybe a wideband channel.

In some embodiments, the exemplary circuit 300A may comprise one or more circuits that may determine a system impulse response 313 that may correspond to an impulse response of a first circulator (e.g., the circulator 217 in FIG. 2), an impulse response of a first analog SIC filter (e.g., the analog SIC filter 233 in FIG. 2), and/or an impulse response of a first LNA (e.g., the low noise amplifier 231 in FIG. 2). In other embodiments, the exemplary circuit 300A may further comprise a system impulse response 313 that may determine an echo channel path impulse response from the second antenna (e.g., the antenna 211 in FIG. 2) to the first antenna (e.g., the antenna 209 in FIG. 2) coupled to the full-duplex radio. The echo channel path impulse may be any small or large scale variations experienced by a signal transmitted from the antenna 211 to the antenna 209. For example, the signal may be comprised of electromagnetic energy that that may vary in time. For instance, the electromagnetic energy of the signal may be greater at some time $t_3$ than at some other time $t_4$ based at least in part on data (e.g., binary data) encoded in the electromagnetic energy. As the signal propagates from the first antenna to the second antenna the signal may be reflected off of a housing and/or enclosure enclosing the exemplary circuit 300A. Therefore the second antenna may receive multiple (e.g., duplicate) versions of the transmitted signal with different electromagnetic energies. Therefore the second antenna may receive one or more signals corresponding to the transmitted signal, wherein the electromagnetic energies may be different (e.g., amplitude variation) of the one or more signals, the time of arrival (ToA) may be different (e.g., time delay) of the one or more signals, and a phase (e.g., difference in angle between the one or more signals) of the one or more signals may be different. Accordingly the system impulse response 313 may determine amplitude variation, ToA, and phase differences of the one or more signals. The reflected signal may be attenuated as it is. In some embodiments, the echo channel path impulse response maybe a wideband channel.

The exemplary circuit 300A may generate a pair of symbols (e.g., the symbols $x_1[n]$ 302 and $x_2[n]$ 338). A first symbol (e.g., the symbol $x_1[n]$ 302) may be input to a first power amplifier response (e.g., the power amplifier response 303) and a first power amplifier response symbol may be output (e.g., the amplified symbol $ax_1[n]$ 304) from the power amplifier response 303. The amplified symbol $ax_1[n]$ 304 may be input to a first system impulse response (e.g., the system impulse response $_1h_1[n]$ 305) and a first system impulse response symbol (e.g., the symbol $_1h_1x_1[n]$ 306) may be output from the system impulse response $_1h_1[n]$ 305. The symbol $_1h_1x_1[n]$ 306 may correspond to a convolution of the symbol $ax_1[n]$ 304 and the system impulse response $_1h_1[n]$ 305. The symbol $_1h_1x_1[n]$ 306 may be combined with a received symbol and a noise symbol (e.g., the symbol $r_1[n]+z_1[n]$ 308) and a second system impulse response symbol (e.g., the symbol $_2h_1x_2[n]$ 312) output from a second system impulse response (e.g., the system impulse response $_2h_1[n]$ 311) by an adding circuit (e.g., the adding circuit 307). The symbol $_2h_1x_2[n]$ 312 may correspond to a second symbol (e.g., the symbol $x_2[n]$ 338) being input to a second power amplifier response (e.g., the power amplifier response 317), a second power amplifier response symbol (e.g., the amplified symbol $ax_2[n]$ 324) being output from power amplifier response 317, and the amplified symbol $ax_2[n]$ 324 being input to the system impulse response $_2h_1[n]$ 311. The symbol $r_1[n]+z_1[n]$ 308 may correspond to a first received symbol and first noise symbol received on the first antenna. The symbol $_2h_1x_2[n]$ 312 may correspond to a convolution of the symbol $ax_2[n]$ 324 and the system impulse response $_2h_1x_2[n]$ 312. The output of the adding circuit 307 may be a first output symbol (e.g., the symbol $y_1[n]$ 310). The symbol $y_1[n]$ 310 may correspond to an addition of the symbol $_1h_1x_1[n]$ 306 and the symbol $_2h_1x_2[n]$ 312, and the symbol $r_1[n]+z_1[n]$ 308. The symbol $y_1[n]$ 310 may be combined by adding circuit 309 with an updated self-interference cancellation filter value (e.g., $sic_1[n]$ 316) corresponding to the symbol $x_1[n]$ 302 and/or the symbol $x_2[n]$ 338. The updated self-interference cancellation filter value $sic_1[n]$ 316 may be determined by a self-interference cancellation filter 323. The adding circuit 309 may output a first estimated output symbol (e.g., the symbol $ay_1[n]$ 314) which may be input to a processor (e.g., the processor 325).

The amplified symbol $ax_1[n]$ 304 may be input to a third system impulse response (e.g., the system impulse response $_1h_2[n]$ 313) and a third system impulse response symbol (e.g., the symbol $_1h_2x_1[n]$ 326) may be output from the system impulse response $_1h_2[n]$ 313. The symbol $_1h_2x_1[n]$ 326 may correspond to a convolution of the symbol $ax_1[n]$ 304 and the system impulse response $_1h_2[n]$ 313. The symbol $_1h_2x_1[n]$ 326 may be combined with a received symbol and a noise symbol (e.g., the symbol $r_2[n]+z_2[n]$ 322) and a fourth system impulse response symbol (e.g., the symbol $_1h_2x_2[n]$ 330) output from a fourth system impulse response (e.g., the system impulse response $_2h_2[n]$ 315) by a second adding circuit (e.g., the adding circuit 319). The symbol $_1h_2x_2[n]$ 330 may correspond to a second symbol (e.g., the symbol $x_2[n]$ 338) being input to a second power amplifier response (e.g., the power amplifier response 317), a second power amplifier response symbol (e.g., the amplified symbol $ax_2[n]$ 324) being output from power amplifier response 317, and the amplified symbol $ax_2[n]$ 324 being input to the system impulse response $_2h_2[n]$ 315. The symbol $_1h_2x_2[n]$ 330 may correspond to a convolution of the symbol $ax_2[n]$ 324 and the system impulse response $_2h_2[n]$ 315. The symbol $r_2[n]+z_2[n]$ 322 may correspond to a first received symbol and first noise symbol received on the first antenna. The symbol $_1h_2x_1[n]$ 326 may correspond to a convolution of the symbol $ax_2[n]$ 304 and the system impulse response $_1h_2[n]$ 313. The output of the adding circuit 319 may be a second output symbol (e.g., the symbol $y_2[n]$ 328). The symbol $y_2[n]$ 328 may correspond to an addition of the symbol $_1h_2x_1[n]$ 326, the symbol $_1h_2x_2[n]$ 330, and the symbol $r_1[n]+z_1[n]$ 322. The symbol $y_2[n]$ 328 may be combined by adding circuit 321 with an updated self-interference cancellation filter value (e.g., $sic_2[n]$ 320) corresponding to the symbol $x_1[n]$ 302 and the symbol $x_2[n]$ 338. The updated self-interference cancellation filter value $sic_2[n]$ 320 may be determined by a self-interference cancellation filter 323. The adding circuit 321 may output a second estimated output symbol (e.g., the symbol $ay_2[n]$ 318) which may be input to a processor (e.g., the processor 325). The processor 325 may receive the symbols $y_2[n]$ 328 and $ay_2[n]$ 318 and the symbols $y_1[n]$ 310 and $ay_1[n]$ 314 and may determine that a difference between the symbols $y_2[n]$ 328 and $ay_2[n]$ 318 and the symbols $y_1[n]$ 310 and $ay_1[n]$ 314 is less than or equal to a predetermined real and/or complex number. In particular, the processor 325 may determine a P-norm difference between the symbols $y_2[n]$ 328 and $ay_2[n]$ 318 and a Q-norm difference between the symbols $y_1[n]$ 310 and $ay_1[n]$ 314.

The processor 325 may determine the P norm difference by determining a difference between the symbols $y_2[n]$ 328 and $ay_2[n]$ 318, determining an absolute value of the difference, raising the absolute value of the difference to the Pth power, determining a sum of the absolute value of the difference to the Pth power over all the symbols (e.g., N symbols) for the symbols $y_2[n]$ 328 and $ay_2[n]$ 318. The processor 325 may then determine the Pth root of the sum, of the absolute value of the difference raised to the Pth power, over the N symbols for the symbols $y_2[n]$ 328 and $ay_2[n]$ 318. The processor 325 may then determine that the Pth root of the sum is not less than or equal to a predetermined first real number. The processor 325 may then determine a number of basis functions based at least in part on the Pth root of the sum not being less than or equal to the predetermined real number. The processor 325 may determine a greater number of basis functions. That is, the processor 325 may determine a number of basis functions $K_2 > K_1$, wherein $K_2$ is the greater number of basis functions and $K_1$ is a number of basis functions previously determined by the processor 325. The processor 325 may communicate the number of basis functions (e.g., the number of basis functions 327) to the self-interference cancellation filter 323 and the self-interference cancellation filter 323 may determine an estimate (e.g., the self-interference cancellation filter value $sic_2[n]$ 320) of the power amplifier response 317, the system impulse response 315, the power amplifier response 303, and the system impulse response 313 combined based at least in part on $K_2$ and the symbols $x_1[n]$ 302 and the symbols $x_2[n]$ 338 as detailed below in FIGS. 4-7. The processor 325 may determine that the Pth root of the sum is less than or equal to the predetermined first real number in which case the processor 325 may not send the number of basis functions 327 to the self-interference cancellation filter 323. The processor 325 may determine that the estimated output symbol $ay_2[n]$ 318 is approximately equal to the symbol $y_2[n]$ 328. After the processor 325 determines that the estimated output symbol $ay_2[n]$ 318 is approximately equal to the symbol $y_2[n]$ 328, the processor 325 may decode the estimated output symbols $ay_2[n]$ 318 into source coded symbols that may be decoded into a MAC layer frame.

The processor 325 may determine the Q norm difference by determining a difference between the symbols $y_1[n]$ 310 and $ay_1[n]$ 314, determining an absolute value of the difference, raising the absolute value of the difference to the Qth power, determining a sum of the absolute value of the difference to the Pth power over all the symbols (e.g., N symbols) for the symbols $y_1[n]$ 310 and $ay_1[n]$ 314. The processor 325 may then determine the Qth root of the sum, of the absolute value of the difference raised to the Qth power, over the N symbols for the symbols $y_1[n]$ 310 and $ay_1[n]$ 314. The processor 325 may then determine that the Qth root of the sum is not less than or equal to a predetermined first real number. The processor 325 may then determine a number of basis functions based at least in part on the Qth root of the sum not being less than or equal to the predetermined real number. The processor 325 may determine a greater number of basis functions. That is, the processor 325 may determine a number of basis functions $K_4 > K_3$, wherein $K_4$ is the greater number of basis functions and $K_3$ is a number of basis functions previously determined by the processor 325. The processor 325 may communicate the number of basis functions (e.g., the number of basis functions 327) to the self-interference cancellation filter 323 and the self-interference cancellation filter 323 may determine an estimate (e.g., the self-interference cancellation filter value $sic_1[n]$ 316) of the power amplifier response 303, the system impulse response 305, the power amplifier response 317, and the system impulse response 311 combined based at least in part on $K_4$ and the symbols $x_1[n]$ 302 and the symbols $x_2[n]$ 338 as detailed below in FIGS. 4-7. The processor 325 may determine that the Qth root of the sum is less than or equal to the predetermined first real number in which case the processor 325 may not send the number of basis functions 327 to the self-interference cancellation filter 323. The processor 325 may determine that the estimated output symbol $ay_1[n]$ 314 is approximately equal to the symbol $y_1[n]$ 310. After the processor 325 determines that the estimated output symbol $ay_1[n]$ 314 is approximately equal to the symbol $y_1[n]$ 310, the processor 325 may decode the estimated output symbols $ay_1[n]$ 314 into source coded symbols that may be decoded into a MAC layer frame.

Figure 3B:
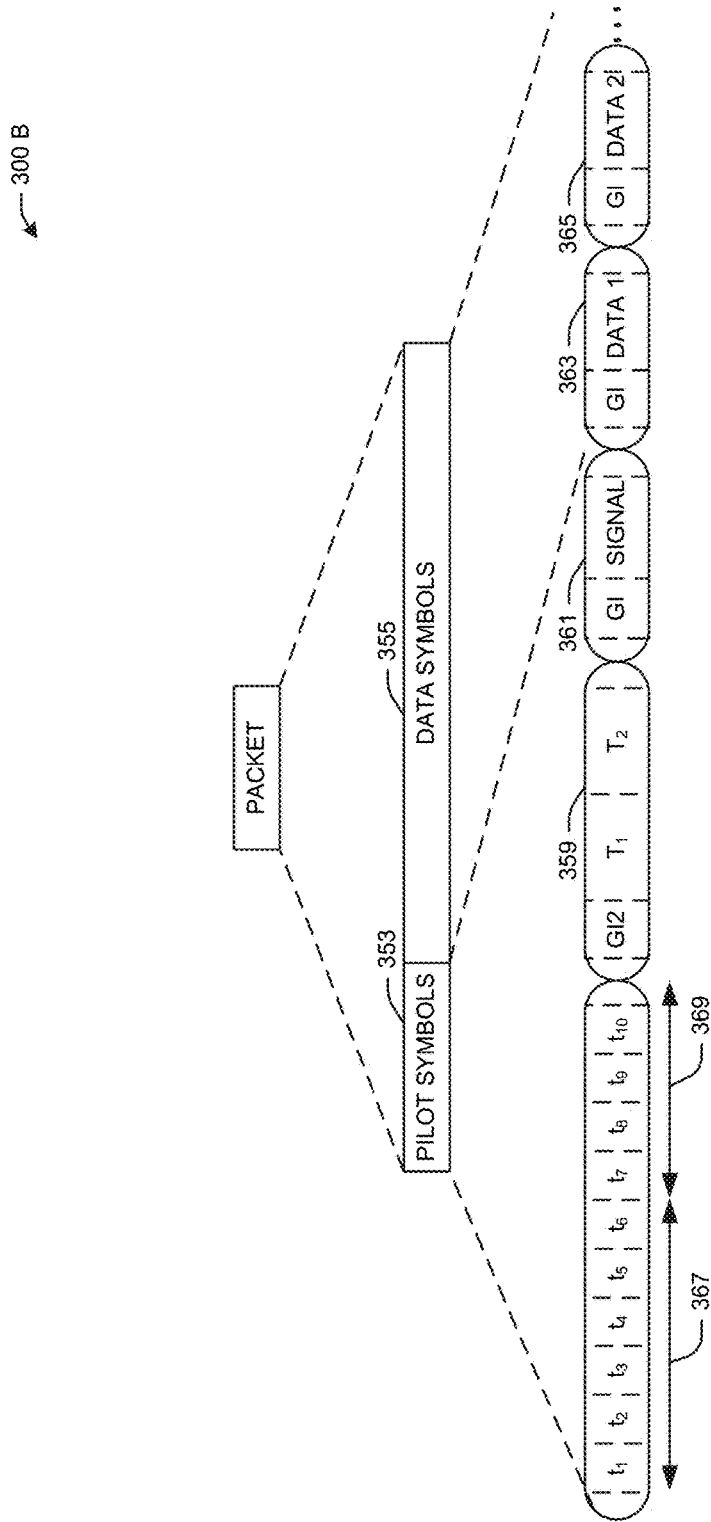
FIG. 3B depicts an exemplary packet, according to one or more example embodiments of the disclosure.

FIG. 3B depicts an exemplary packet, according to one or more example embodiments of the disclosure. A packet (e.g., the packet 300 B) may correspond to an IEEE 802.11 packet (e.g., the packet 132 of FIG. 1) that may be sent from an AP (e.g., the AP 102 of FIG. 1) to at least one user device(s) (e.g., the user device(s) 120 of FIG. 1). It may also correspond to the packet 131 of FIG. 1. The packet may comprise a plurality of symbols (e.g., the pilot symbols 353 and the data symbols 355). The pilot symbols 353 may comprise signal detection, automatic gain control (AGC), or diversity selection symbols (e.g., the symbols 367). The symbols 367 may comprise at least seven symbols (e.g., $t_1$-$t_7$). The symbols 367 may be sent by a first wireless device (e.g., the AP 102) to a second wireless device (e.g., the user device(s) 120) so that the user device(s) 120 may train a receiver, in the user device(s) 120, to detect data symbols (e.g., data symbols 355), adjust the AGC, or to determine which receiver(s), if the user device(s) 120 have more than one receiver, have better reception. The pilot symbols 353 may also comprise coarse frequency offset estimation and timing synchronization symbols (e.g., the symbols 369). The symbols 369 may comprise at least three symbols (e.g., $t_8$-$t_{10}$). The coarse frequency offset estimation symbols may be sent by the AP 102 to the user device(s) 120 so that the user device(s) 120 may adjust a first oscillator, in the receiver, to oscillate at a frequency commensurate with a frequency at which a second oscillator, in the transmitter of the AP 102, is oscillating. The timing synchronization symbols may be sent by the AP 102 to the user device(s) 120 so that the user device(s) 120 may determine the time between the different symbols in the symbols 373, 375, 377, and any remaining symbols. For example, the timing synchronization symbols may be used by the user device(s) 120 to determine when symbol GI2 begins and ends, and when symbol $T_1$ begins and ends. In this example the time when a guard interval symbol (e.g., GI2) ends corresponds to the time when symbol $T_1$ begins. Each of the symbols 367 and 369 may take about eight microseconds for the AP 102 to transmit, and about eight microseconds each for the user device(s) 120 to receive the symbols 367 and 369.

The pilot symbols 353 may also comprise channel and fine frequency offset estimation symbols (e.g., the symbols 359). The symbols 359 may be used by the user device(s) 120 to estimate a channel impulse response between the AP 102 and the user device(s) 120 and fine frequency offset estimation. The symbols 359 may comprise guard interval symbols (e.g., the GI2) that may be used by the AP 102 to separate the symbols in the symbols 369 and the symbols in the symbols 359. Thus, the channel and fine frequency offset estimation symbols may correspond to $T_1$ and $T_2$.

The pilot symbols 353 may also comprise rate length symbols (e.g., the rate length symbols 361). The rate length symbols 361 may comprise guard interval symbols (e.g., the GI) and signal symbols (e.g., the SIGNAL). The signal symbols may be used to indicate the transfer rate and length of the data symbols 355. The signal symbols may comprise one OFDM symbol assigned to a plurality of OFDM sub-carriers. The signal symbols may be modulated using BPSK at 6 Mbps and encoded at a ½ rate. The signal symbols may be interleaved and mapped, and may have pilots symbols inserted in a subset of the subcarriers (e.g., subcarriers −21, −7, 7 and 21 if 52 subcarriers are used). The signal symbols may or may not be scrambled.

The data symbols 355 may comprise the symbols 363, 365, . . . . The symbols 363, 365, . . . , may comprise guard interval symbols (e.g., the GI) and data symbols (e.g., the DATA 1, the DATA 2, . . . ) corresponding to the symbols 363, 365, etc.

In one embodiment, a subset of the symbols 367 and 369 may be repetitive and thus the AP 102 may transmit a subset of the symbols 367 and 369 more than one time. For example, the symbol $t_1$ may be a repeat of $t_6$ and may be equal to $t_6$, the symbol $t_2$ may be a repeat of $t_7$ and may be equal to $t_7$, the symbol $t_3$ may be a repeat of $t_8$ and may be equal to $t_8$, $t_4$ may be a repeat of $t_9$ and may be equal to $t_9$, and $t_5$ may be a repeat of $t_{10}$ and may be equal to $t_{10}$. Thus the symbols $t_1$-$t_5$ may be transmitted, in this example, a total of $N_r$=2 times. As explained below in FIGS. 4-7, this repetitive structure of the symbols 367 and 369 can be used to determine a system parameter corresponding to a basis function and an impulse response of the at least one transmit chain (e.g., power amplifier 205 and circulator 207 and (e.g., power amplifier 215 and circulator 217)) associated with the AP 102. It should be noted that the user device(s) 120 may also comprise a similar transmit chain and therefore the system parameter may also be determined by the user device(s) 120. The subset of the symbols 367 and 369 may be used to determine an estimate of an impulse response of a full-duplex radio as described below in FIGS. 5-7. A processor in the AP 102 may determine that a full-duplex radio in the AP 102 may be experiencing a maximum delay spread of a certain length of time. In particular, if the full-duplex radio comprises a first transmit and receive chain and a second transmit and receive chain in the full duplex radio, the first transmit and second receive chain may experience a first maximum delay spread and the second transmit and the first receive chain may experience a second maximum delay spread. This may be generalized to a maximum delay spread between a first transmit chain and R receive chains, wherein R may be any positive natural number.

In general, the maximum delay spread may be equal to a maximum delay (e.g., maximum length of time) between when a receive chain receives a first symbol, of at least one symbol sequence, and a last symbol of the at least one symbol sequence from a transmit chain. For example, the maximum delay spread between the first transmit chain and the second receive chain may be equal to the length of time between when the second receive chain receives a first symbol, in at least one first symbol sequence, from a first transmit chain and the second receive chain receives a second symbol, in the at least one first symbol sequence, from the first transmit chain. The second symbol may not be the last symbol in the at least one first symbol sequence, it may be an intermediate symbol in the at least one first symbol sequence corresponding to an echo channel path impulse response between the first transmit chain and the second receive chain. For example, the echo channel path may include at least one obstruction between a first antenna affixed to the first transmit chain and a second antenna affixed to the second receive chain that may prevent all symbols in the at least one first symbol sequence from being received on the second receive chain. Therefore in some embodiments, only a subset of symbols of the at least one first symbol sequence may be successfully received on the second receive chain. Thus the time between when the first symbol of the at least one first symbol sequence is successfully received and the time when the second symbol of the at least one first symbol sequence is successfully received may be equal to the maximum delay spread. Successfully received may be defined as a symbol that may be correctly decoded (e.g., the received symbol is the same as the symbol transmitted). The maximum delay spread between the second transmit chain and the first receive chain may be equal to the length of time between when the first receive chain receives a first symbol, in at least one second symbol sequence, from a second transmit chain and the first receive chain receives a second symbol, in the at least one second symbol sequence, from the second transmit chain.

Because the maximum delay spread between a transmit chain and receive chain may only allow a subset of symbols to be successfully received and decoded, a processor may send a symbol sequence comprising a plurality of symbols, wherein some of the symbols in the symbol sequence are equal to the same value. In some embodiments, the processor may do this because the processor may need to successfully receive a certain number of symbols on a receive chain in order to determine an estimate of an impulse response of the receive chain receiving the symbols and the transmit chain on which the symbols were transmitted. For example, a processor may determine that the maximum delay spread between the first transmit chain and the second receive chain may be equal to 2.4 microseconds, and thus the processor may determine that symbols $t_1$, $t_2$, and $t_3$ may be unique symbols that may not be equal, but may be equal to $t_4$, $t_5$, and $t_6$ respectively. Accordingly, the processor may use the symbols $t_1$, $t_2$, and $t_3$ in an at least one first symbol sequence and the symbols $t_4$, $t_5$, and $t_6$ in an at least one second symbol sequence transmitted from the first transmit chain to the second receive chain to determine an estimate of the impulse response of the second receive chain and the first transmit chain. The processor may determine that the maximum delay spread between the second transmit chain and the first receive chain may be equal to 1.6 microseconds, and thus the processor may determine that symbols $t_7$ and $t_8$, may be unique symbols that may not be equal, but may be equal to $t_9$ and $t_{10}$ respectively. Accordingly, the processor may use the symbols $t_7$ and $t_8$ in an at least one first symbol sequence and the symbols $t_9$ and $t_{10}$ in an at least one second symbol sequence transmitted from the second transmit chain to the first receive chain to determine an estimate of the impulse response of the first receive chain and the second transmit chain.

Figure 3C:
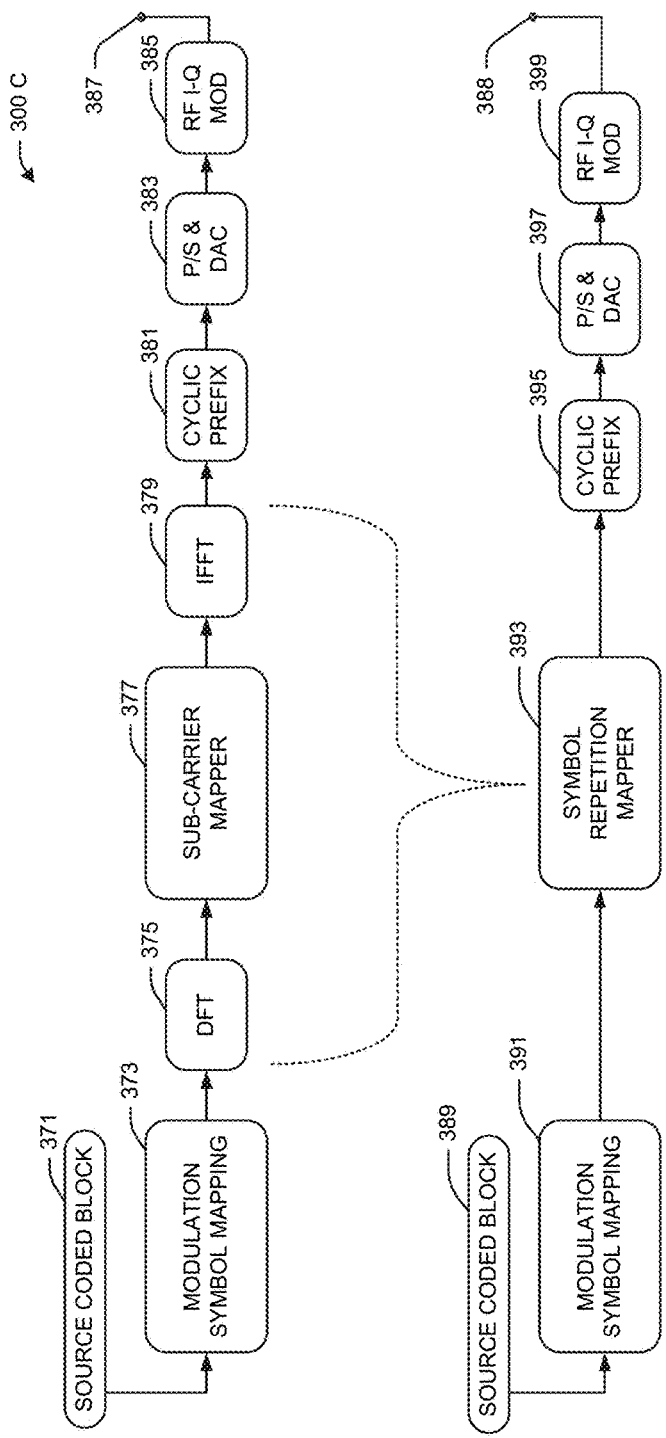
FIG. 3C depicts an exemplary wireless transmit chain, according to one or more example embodiments of the disclosure.

FIG. 3C depicts an exemplary wireless transmit chain 300 C, according to one or more example embodiments of the disclosure. The wireless transmit chain 300 C may comprise digital circuits (e.g., the modulation symbol mapping 373, the DFT (Discrete Fourier Transform) 375, the sub-carrier mapper 377, the IFFT (Inverse Fast Fourier Transform) 379, the cyclic prefix 381, P/S (Parallel/Serial) & DAC (Digital to Analog Converter) 383) and analog circuits (e.g., RF I-Q MOD (Radio Frequency In phase and Quadrature Modulation) 385 and antenna 387) corresponding to a SC-FDMA radio. A source coded block (e.g., the source coded block 371) may be modulated by the modulation symbol mapping 373, using a digital modulation scheme (e.g., QAM), and may output a modulation symbol block (not shown). The DFT 375 may receive the modulation symbol block from the modulation symbol mapping 373 and may perform a Discrete Fourier Transformation on the modulation symbol block thereby creating a DFT modulation symbol block. The sub-carrier mapper 377 may receive the DFT modulation symbol block and may map each symbol in the DFT modulation symbol block to a subcarrier (e.g., a frequency band), thereby creating a block of subcarriers comprising symbols of the DFT modulation symbol block. The symbols in the block of subcarriers may then be received by the IFFT 379 which may perform an IFFT on the block of subcarriers thereby creating an IFFT symbol block wherein the symbols in the IFFT symbol block correspond to a time domain representation of the each symbol in the DFT block that was mapped a subcarrier. The cyclic prefix 381 may receive the IFFT symbol block and concatenate a cyclic prefix to the IFFT symbol block thereby creating a digital baseband time domain symbol block. The digital baseband time domain symbol block may be received by the P/S & DAC 383 and the P/S & DAC 383 may perform a parallel to serial mapping operation wherein each symbol in the digital baseband time domain symbol block is mapped from one of a plurality of parallel streams, corresponding to the output of the IFFT 379, to a serial stream. After the symbols in the digital baseband time domain symbol block have been mapped from the parallel streams to the serial streams the P/S & DAC 383 may perform a digital to analog conversion thereby creating analog baseband time domain signals each of which corresponds to a symbol in the digital baseband time domain symbol block. The RF I-Q MOD 385 may receive the analog baseband time domain signals and may modulate the analog baseband time domain signals to an in-phase or quadrature signal thereby creating modulated analog baseband time domain signals. The RF I-Q MOD 385 may then transmit the modulated analog baseband time domain signals on antenna 387.

In some embodiments, the operations performed by DFT 375, the sub-carrier mapper 377, and the IFFT 379 may be combined and performed by a symbol repetition mapper (e.g., the symbol repetition mapper 393). The source coded block 389 may be the same as source coded block 371, modulation symbol mapping 391 may be the same as modulation symbol mapping 373, cyclic prefix 395 may be the same as cyclic prefix 381, P/S & DAC 397 may be the same as P/S & DAC 383, RF I-Q MOD 399 may be the same as RF I-Q MOD 385, and antenna 388 may be the same as antenna 387. The symbol repetition mapper 393 may generate repetitive symbols that may be used to determine an estimate of an impulse response of a full-duplex radio as described below in FIG. 4.

A processor, and/or ASIC, may perform the operations of the DFT 375, the sub-carrier mapper 377, and the IFFT 379 as follows, to generate repetitive symbols that may be used to generate an estimate of an impulse response of a full-duplex radio. As an example a processor, and/or an ASIC in the modem 201 in the AP 102, may determine 4 QAM modulation symbols in the modulation symbol mapping 391 (e.g., the symbols $x_2[n]$ 208 for $n=0, 1, 2, 3$). That is the modulation symbol mapping 391 may determine the symbols $x_2[0]$, $x_2[1]$, $x_2[2]$, $x_2[3]$. The processor and/or an ASIC may determine a Discrete Fourier Transform in the DFT 375. In particular the DFT 375 may determine a 4 point Discrete Fourier Transform because the modulation symbol mapping 391 determines 4 QAM symbols. The 4 point Discrete Fourier Transform may be a matrix comprising 4 rows and columns with entries equal to $$DFT_{x,y} = \frac{1}{\sqrt{N}} e^{-j2\pi xy/N}$$

for x, y∈{1,2,3,4} and N=4. A row of the 4 point Discrete Fourier Transform may be equal to $$DFT_x = \left\{ \frac{1}{\sqrt{4}} e^{-j2\pi x(0)/4} \frac{1}{\sqrt{4}} e^{-j2\pi x(1)/4} \frac{1}{\sqrt{4}} e^{-j2\pi x(2)/4} \frac{1}{\sqrt{4}} e^{-j2\pi x(3)/4} \right\},$$

where x represents a row of the Discrete Fourier Transform matrix. Thus the 4 point Discrete Fourier Transform may comprise the rows $$DFT_0 = \left\{ \frac{1}{\sqrt{4}} e^{-j2\pi(0)(0)/4} \frac{1}{\sqrt{4}} e^{-j2\pi(0)(1)/4} \frac{1}{\sqrt{4}} e^{-j2\pi(0)(2)/4} \frac{1}{\sqrt{4}} e^{-j2\pi(0)(3)/4} \right\},$$

$$DFT_1 = \left\{ \frac{1}{\sqrt{4}} e^{-j2\pi(1)(0)/4} \frac{1}{\sqrt{4}} e^{-j2\pi(1)(1)/4} \frac{1}{\sqrt{4}} e^{-j2\pi(1)(2)/4} \frac{1}{\sqrt{4}} e^{-j2\pi(1)(3)/4} \right\},$$

$$DFT_2 = \left\{ \frac{1}{\sqrt{4}} e^{-j2\pi(2)(0)/4} \frac{1}{\sqrt{4}} e^{-j2\pi(2)(1)/4} \frac{1}{\sqrt{4}} e^{-j2\pi(2)(2)/4} \frac{1}{\sqrt{4}} e^{-j2\pi(2)(3)/4} \right\},$$

and $$DFT_3 = \left\{ \frac{1}{\sqrt{4}} e^{-j2\pi(3)(0)/4} \frac{1}{\sqrt{4}} e^{-j2\pi(3)(1)/4} \frac{1}{\sqrt{4}} e^{-j2\pi(3)(2)/4} \frac{1}{\sqrt{4}} e^{-j2\pi(3)(3)/4} \right\}.$$

The processor, and/or an ASIC, may determine a product of the 4 point Discrete Fourier Transform and the symbols $x_2[0]$, $x_2[1]$, $x_2[2]$, and $x_2[3]$. The rows of the 4 point DFT may be multiplied by the 4 symbols as follows $DFT_0 \times [x_2[0]\ x_2[1]\ x_2[2]\ x_2[3]]^T$, $DFT_1 \times [x_2[0]\ x_2[1]\ x_2[2]\ x_2[3]]^T$, $DFT_2 \times [x_2[0]\ x_2[1]\ x_2[2]\ x_2[3]]^T$, and $DFT_3 \times [x_2[0]\ x_2[1]\ x_2[2]\ x_2[3]]^T$. The result of the matrix product may be equal to a frequency domain representation of the symbols $x_2[0]$, $x_2[1]$, $x_2[2]$, and $x_2[3]$. The frequency domain representation of the symbols $x_2[0]$, $x_2[1]$, $x_2[2]$, $x_2[3]$ with respect to $DFT_x$ may be represented by $f_x = DFT_x \times [x_2[0]\ x_2[1]\ x_2[2]\ x_2[3]]^T$ and thus the frequency domain representation of the symbols $x_2[0]$, $x_2[1]$, $x_2[2]$, and $x_2[3]$ with respect to the rows of the 4 point Discrete Fourier Transform may be $$f_0 = DFT_0 \times [x_2[0]\ x_2[1]\ x_2[2]\ x_2[3]]^T =$$
$$\frac{x_2[0]}{\sqrt{4}} e^{-j2\pi(0)(0)/4} \frac{x_2[1]}{\sqrt{4}} e^{-j2\pi(0)(1)/4} \frac{x_2[2]}{\sqrt{4}} e^{-j2\pi(0)(2)/4} \frac{x_2[3]}{\sqrt{4}} e^{-j2\pi(0)(3)/4} =$$
$$x_2[0] + x_2[1] + x_2[2] + x_2[3],$$

$$f_1 = DFT_1 \times [x_2[0]\ x_2[1]\ x_2[2]\ x_2[3]]^T =$$
$$\frac{x_2[0]}{\sqrt{4}} e^{-j2\pi(1)(0)/4} \frac{x_2[1]}{\sqrt{4}} e^{-j2\pi(1)(1)/4} \frac{x_2[2]}{\sqrt{4}} e^{-j2\pi(1)(2)/4} \frac{x_2[3]}{\sqrt{4}} e^{-j2\pi(1)(3)/4} =$$
$$x_2[0] - jx_2[1] - x_2[2] + jx_2[3],$$

$$f_2 = DFT_2 = \frac{1}{\sqrt{4}} e^{-j2\pi(2)(0)/4} \frac{1}{\sqrt{4}} e^{-j2\pi(2)(1)/4} \frac{1}{\sqrt{4}}$$
$$e^{-j2\pi(2)(2)/4} \frac{1}{\sqrt{4}} e^{-j2\pi(2)(3)/4} = x_2[0] - x_2[1] + x_2[2] - x_2[3],$$

-continued $$f_3 = DFT_3 = \frac{1}{\sqrt{4}}e^{-j2\pi(3)(0)/4}\frac{1}{\sqrt{4}}e^{-j2\pi(3)(1)/4}\frac{1}{\sqrt{4}}e^{-j2\pi(3)(2)/4}$$

$$\frac{1}{\sqrt{4}}e^{-j2\pi(3)(3)/4} = x_2[0] + jx_2[1] - x_2[2] - jx_2[3].$$

The processor, and/or an ASIC, may map the frequency domain representation of the symbols $x_2[0]$, $x_2[1]$, $x_2[2]$, $x_2[3]$ to a subcarrier using the sub-carrier mapper 377. The sub-carrier mapper 377 may assign the frequency domain representations of the symbols $x_2[0]$, $x_2[1]$, $x_2[2]$, $x_2[3]$ (i.e., $f_0$, $f_1$, $f_2$, and $f_3$) to complex values bijectively as the amplitudes of the subcarriers. The sub-carrier mapper 377 may map the symbols $f_0$, $f_1$, $f_2$, and $f_3$ to M subcarriers, and the symbols $f_0$, $f_1$, $f_2$, and $f_3$ may be included in a DFT vector (e.g., the DFT=$[f_0\ f_1\ f_2\ f_3]^T$). The DFT may be a column vector. The number of subcarriers, M, may be determined based at least in part on the number of points that may be used in the IFFT 379 to transform the frequency domain representation of the symbols $x_2[0]$, $x_2[1]$, $x_2[2]$, $x_2[3]$ into time domain symbols. In some embodiments the sub-carrier mapper 377 may perform a localized mapping, and in other embodiments distributed mapping. In localized mapping the processor and/or an ASIC may map the frequency domain representation of the symbols $x_2[0]$, $x_2[1]$, $x_2[2]$, $x_2[3]$ to a subset of consecutive subcarriers, thereby confining the symbols to only a portion of the available bandwidth. In distributed mapping, the processor and/or an ASIC may map the frequency domain representation of the symbols $x_2[0]$, $x_2[1]$, $x_2[2]$, $x_2[3]$ to subcarriers evenly spaced over the available bandwidth in a non-continuous manner, resulting in zero amplitudes for the remaining subcarriers. The processor, and/or, the ASIC may map the frequency domain representation of the symbols $x_2[0]$, $x_2[1]$, $x_2[2]$, $x_2[3]$ by determining a product of an assignment/mapping matrix K and the frequency domain representation of the symbols $x_2[0]$, $x_2[1]$, $x_2[2]$, $x_2[3]$. The assignment/mapping matrix may comprise M>N=4 rows and 4 columns. The number of rows may correspond to the number of points used by the processor, and/or an ASIC in the IFFT 379 to transform the frequency domain representation of the symbols $x_2[0]$, $x_2[1]$, $x_2[2]$, $x_2[3]$ into a time domain representation of the frequency domain representation of the symbols $x_2[0]$, $x_2[1]$, $x_2[2]$, $x_2[3]$. As an example, M may be equal to 12. The assignment/mapping matrix may comprise 4 submatrices, $K_1$, $K_2$, $K_3$, and $K_4$. Each submatrix may comprise 3 rows and 4 columns.

The first row of the submatrix $K_1$, may comprise a 1 in the first row and first column entry, and may comprise a 0 in the first row and second through third column entries. That is, the first row may be $K_{11}=[1\ 0\ 0\ 0]$. The second and third rows of the submatrix $K_1$ may comprise a 0 in each column entry. That is, the second row may be $K_{12}=[0\ 0\ 0\ 0]$ and the third row may be $K_{13}=[0\ 0\ 0\ 0]$. Thus the submatrix $K_1$ may comprise the rows $K_{11}=[1\ 0\ 0\ 0]$, $K_{12}=[0\ 0\ 0\ 0]$, and $K_{13}=[0\ 0\ 0\ 0]$.

The first row of the submatrix $K_2$, may comprise a 0 in the first row and second column entry and may comprise a 0 in the remaining column entries. That is, the first row may be $K_{21}=[0\ 1\ 0\ 0]$. The second and third rows of the submatrix $K_2$ may comprise a 0 in each column entry. That is, the second row may be $K_{22}=[0\ 0\ 0\ 0]$ and the third row may be $K_{13}=[0\ 0\ 0\ 0]$. Thus the submatrix $K_2$ may comprise the rows $K_{21}=[0\ 1\ 0\ 0]$, $K_{12}=[0\ 0\ 0\ 0]$, and $K_{13}=[0\ 0\ 0\ 0]$.

The first row of the submatrix $K_3$, may comprise a 1 in the first row and third column entry, and a 0 in the remaining column entries of the first row. That is, the first row may be $K_{31}=[0\ 0\ 1\ 0]$. The second and third rows of the submatrix $K_3$ may comprise a 0 in each column entry. That is, the second row may be $K_{32}=[0\ 0\ 0\ 0]$ and the third row may be $K_{33}=[0\ 0\ 0\ 0]$. Thus the submatrix $K_3$ may comprise the rows $K_{31}=[0\ 0\ 1\ 0]$, $K_{32}=[0\ 0\ 0\ 0]$, and $K_{33}=[0\ 0\ 0\ 0]$.

The first row of the submatrix $K_4$, may comprise a 1 in the first row and fourth column entry, and a 0 in the remaining column entries of the first row. That, is the first row may be $K_{41}=[0\ 0\ 0\ 1]$. The second and third rows of the submatrix $K_4$ may comprise a 0 in each column entry. That is, the second row may be $K_{42}=[0\ 0\ 0\ 0]$ and the third row may be $K_{43}=[0\ 0\ 0\ 0]$. Thus the submatrix $K_4$ may comprise the rows $K_{41}=[0\ 0\ 1\ 0]$, $K_{42}=[0\ 0\ 0\ 0]$, and $K_{43}=[0\ 0\ 0\ 0]$.

In this exemplary embodiment, the assignment/mapping matrix comprises 4 submatrices wherein the number 1 is shifted to the right by one column entry from a first column entry in the submatrix $K_1$ to a second, third, and fourth column entry in the submatrices $K_2$, $K_3$, and $K_4$ respectively. As explained above, the processor, and/or an ASIC, may map the symbols $f_0$, $f_1$, $f_2$, and $f_3$ to the M=12 subcarriers using distributed mapping, so that the symbols $f_0$, $f_1$, $f_2$, and $f_3$ are not adjacent (e.g., the symbols $f_0$, $f_1$, $f_2$, and $f_3$ are evenly spaced over the available bandwidth in a non-continuous manner) to one another. This may be done so that the symbols $f_0$, $f_1$, $f_2$, and $f_3$ are transmitted over non-contiguous frequencies to prevent all of the symbols Ali, $f_2$, and $f_3$ from being corrupted if the full-duplex radio experiences interference from another radio, any of the impulse responses of the total impulse response of the full-duplex radio, or the total impulse response of the full-duplex radio. By mapping the symbols $f_0$, $f_1$, $f_2$, and $f_3$ to non-contiguous subcarriers, the symbols JO, $f_1$, $f_2$, and $f_3$ may not be corrupted. Accordingly the processor, and/or an ASIC, may determine a product of the assignment/mapping matrix and the frequency domain representations of the symbols $f_0$, $f_1$, $f_2$, and $f_3$ by multiplying each row of K by the symbols $f_0$, $f_1$, and $f_3$. As will be shown below, the processor, and/or the ASIC, may determine that the product of the rows of K, which correspond to the rows of the submatrices $K_1$, $K_2$, $K_3$, and $K_4$, and the symbols $f_0$, $f_1$, $f_2$, and $f_3$. The product of the rows of K and the symbols $f_0$, $f_1$, $f_2$, and $f_3$ maps each of the symbols $f_0$, $f_1$, $f_2$, and $f_3$ to a subcarrier.

The processor, and/or ASIC, may determine the product of the rows of K and the symbols and $f_3$ as follows. The assignment/mapping matrix K may comprise 12 rows, corresponding to the number of points that may be used by the processor, and/or the ASIC, in the IFFT 379, and the assignment/mapping matrix K may comprise 4 columns corresponding to the number of points that may be used by the processor, and/or the ASIC, in the DFT 375. Therefore, the symbols $f_0$, $f_1$, $f_2$, and $f_3$ are mapped from a 4 dimensional space to a 12 dimensional space. As explained above, the DFT=$[f_0\ f_1\ f_2\ f_3]^T$, so the product of the assignment/mapping matrix K, and the DFT may be equal to a 12 row column vector, $a_k$, comprising the entries $[f_0\ 0\ 0\ f_1\ 0\ 0\ f_2\ 0\ 0\ f_3\ 0\ 0]=[x_2[0]+x_2[1]+x_2[2]+x_2[3]\ 0\ 0\ x_2[0]-jx_2[1]-x_2[2]-jx_2[3]\ 0\ 0\ x_2[0]-x_2[1]+x_2[2]+x_2[3]\ 0\ 0\ x_2[0]+jx_2[1]-x_2[2]-jx_2[3]\ 0\ 0]^T$. The first through twelfth rows of $a_k$ may be denoted by $a_{k0}, \ldots, a_{k11}$. Only the first, fourth, seventh, and tenth rows of $a_k$ may be equal to non-zero complex or real numbers. In particular, the first row $a_{k0}$ may be equal to $x_2[0]+x_2[1]+x_2[2]+x_2[3]$, the fourth row $a_{k3}$ may be equal to $x_2[0]-jx_2[1]-x_2[2]-jx_2[3]$, the seventh row $a_{k6}$ may be equal to $x_2[0]-x_2[1]+x_2[2]+x_2[3]$, and the tenth row $a_{k9}$ may be equal to $x_2[0]+jx_2[1]-x_2[2]-jx_2[3]$. After the processor, and/or the ASIC, determines the vector $a_k$, the processor, and/or an ASIC, may determine a 12 point Inverse Fast Fourier Transform (IFFT). In particular the processor, and/or an ASIC, may determine a 12 point Inverse Fast Fourier Transform using the IFFT 379. The processor, and/or an ASIC, may determine the 12 point Inverse Fast Fourier Transform by determining an Inverse Fast Fourier Transform (IFFT) matrix W comprising 12 rows and 12 columns, wherein each entry in the matrix W may be equal to $$IFFT_{r,s} = \frac{1}{\sqrt{M}} e^{-j2\pi rs/M}$$

for r, s∈{1, 2, 3, 4, 5, 6, 7, 8, 9, 10, 11, 12} and M=12. As an example, the columns of the first row of W may be equal to $$W_0 = \frac{1}{\sqrt{12}} e^{-j2\pi(0)(0)/12}, \frac{1}{\sqrt{12}} e^{-j2\pi(0)(1)/12}, \frac{1}{\sqrt{12}} e^{-j2\pi(0)(2)/12},$$

$$\frac{1}{\sqrt{12}} e^{-j2\pi(0)(3)/12}, \frac{1}{\sqrt{12}} e^{-j2\pi(0)(4)/12}, \frac{1}{\sqrt{12}} e^{-j2\pi(0)(5)/12},$$

$$\frac{1}{\sqrt{12}} e^{-j2\pi(0)(6)/12}, \frac{1}{\sqrt{12}} e^{-j2\pi(0)(7)/12}, \frac{1}{\sqrt{12}} e^{-j2\pi(0)(8)/12},$$

$$\frac{1}{\sqrt{12}} e^{-j2\pi(0)(9)/12}, \frac{1}{\sqrt{12}} e^{-j2\pi(0)(10)/12}, \text{ and } \frac{1}{\sqrt{12}} e^{-j2\pi(0)(11)/12}.$$

Because, the processor, and/or an ASIC, may determine the product of W with $a_k$ using IFFT 379, and because $a_k$ only comprises non-zero entries in the first, fourth, seventh, and tenth entries in $a_k$ when the processor, and/or an ASIC, determines the product of W with $a_k$ the entries in $W_0$ multiplied by the zero entries in $a_k$ will be equal to zero. Thus the processor, and/or the ASIC, may not multiply the entries in $W_0$ by the entries in $a_k$ that are equal to zero. Accordingly, the processor, and/or the ASIC, may only multiply the entries in $W_0$ by the entries in $a_k$ that are not equal to zero, thereby reducing the number of computations the processor, and/or the ASIC, may need to perform to determine the IFFT. The entries in $W_0$ may be denoted by $W_{00}, W_{01}, \ldots, W_{011}$ which may represent the first through the twelfth entries in $W_0$. The processor, and/or an ASIC, may determine the products of $W_{00}$ and $a_{k0}$, $W_{03}$ and $a_{k3}$, $W_{06}$ and $a_{k6}$, and $W_{09}$ and $a_{k9}$, and then sum the products of $W_{00}$ and $a_{k0}$, $W_{03}$ and $a_{k3}$, $W_{06}$ and $a_{k6}$, and $W_{09}$ and $a_{k9}$. The product of $W_{00}$ and $a_{k0}$ may be equal to $$\frac{1}{\sqrt{12}} e^{-j2\pi(0)(0)/12} \times (x_2[0] + x_2[1] + x_2[2] + x_2[3]) =$$

$$\frac{1}{\sqrt{12}} (x_2[0] + x_2[1] + x_2[2] + x_2[3]),$$

the product of $W_{03}$ and $a_{k3}$ may be equal to $$\frac{1}{\sqrt{12}} e^{-j2\pi(0)(3)/12} \times (x_2[0] - jx_2[1] - x_2[2] + jx_2[3]) =$$

$$\frac{1}{\sqrt{12}} (x_2[0] - jx_2[1] - x_2[2] + jx_2[3]),$$

the product of $W_{06}$ and $a_{k6}$ may be equal to $$\frac{1}{\sqrt{12}} e^{-j2\pi(0)(6)/12} \times (x_2[0] - x_2[1] + x_2[2] - x_2[3]) =$$

$$\frac{1}{\sqrt{12}} (x_2[0] - x_2[1] + x_2[2] - x_2[3]),$$

and the product of $W_{09}$ and $a_{k9}$ may be equal to $$\frac{1}{\sqrt{12}} e^{-j2\pi(0)(9)/12} \times (x_2[0] + jx_2[1] - x_2[2] - jx_2[3]) =$$

$$\frac{1}{\sqrt{12}} (x_2[0] + jx_2[1] - x_2[2] - jx_2[3]).$$

The processor, and/or the ASIC, may determine that $e^{-j2\pi(0)(0)/12} = e^{-j2\pi(0)(3)/12} = e^{-j2\pi(0)(6)/12} = e^{-j2\pi(0)(9)/12} = 1$, and that the sum of the products of $W_{00}$ and $a_{k0}$, $W_{03}$ and $a_{k3}$, $W_{06}$ and $a_{k6}$, and $W_{09}$ and $a_{k9}$ may be $$\frac{1}{\sqrt{12}}((x_2[0] + x_2[1] + x_2[2] + x_2[3]) + (x_2[0] - jx_2[1] - x_2[2] + jx_2[3]) +$$

$$(x_2[0] - x_2[1] + x_2[2] - x_2[3]) + (x_2[0] + jx_2[1] - x_2[2] - jx_2[3])) =$$

$$\frac{1}{\sqrt{12}}((x_2[0] + x_2[0] + x_2[0] + x_2[0]) + (x_2[1] - x_2[1] - jx_2[1] + jx_2[1]) +$$

$$(x_2[2] - x_2[2] + x_2[2] - x_2[2]) +$$

$$(x_2[3] + jx_2[3] - x_2[3] - jx_2[3])) = \frac{1}{2\sqrt{3}} \times 4 \times x_2[0] = \frac{2}{\sqrt{3}} x_2[0].$$

In general, the entries in a row of W (e.g., entries in $W_k$, for k=0, 1, . . . , 11) multiplied by the zero entries in $a_k$ will be equal to zero, as a result the processor, and/or ASIC, may only multiply the entries in $W_k$ by the entries in $a_k$ that are not equal to zero. The entries in $W_k$ may be denoted by $W_{k0}, W_{k1}, \ldots, W_{k11}$ and may represent the first through the twelfth entries in $W_k$. Thus, the processor, and/or an ASIC, may determine the products of $W_{k0}$ and $a_{k0}$, $W_{k3}$ and $a_{k3}$, $W_{k6}$ and $a_{k6}$, and $W_{k9}$ and $a_{k9}$, and then sum the products of $W_{k0}$ and $a_{k0}$, $W_{k3}$ and $a_{k3}$, $W_{k6}$ and $a_{k6}$, and $W_{k9}$ and $a_{k9}$.

The processor, and/or an ASIC, may determine the products of $W_{10}$ and $a_{k0}$, $W_{13}$ and $a_{k3}$, $W_{16}$ and $a_{k6}$, and $W_{19}$ and $a_{k9}$, and then sum the products of $W_{10}$ and $a_{k0}$, $W_{13}$ and $a_{k3}$, $W_{16}$ and $a_{k6}$, and $W_{19}$ and $a_{k9}$. The product of $W_{10}$ and $a_{k0}$ may be equal to $$\frac{1}{\sqrt{12}} e^{-j2\pi(1)(0)/12} \times (x_2[0] + x_2[1] + x_2[2] + x_2[3]) =$$

$$\frac{1}{\sqrt{12}} (x_2[0] + x_2[1] + x_2[2] + x_2[3]),$$

the product of $W_{13}$ and $a_{k3}$ may be equal to $$\frac{1}{\sqrt{12}} e^{-j2\pi(1)(3)/12} \times (x_2[0] - jx_2[1] - x_2[2] + jx_2[3]) =$$

$$\frac{-j}{\sqrt{12}} (x_2[0] - jx_2[1] - x_2[2] + jx_2[3]),$$

the product of $W_{16}$ and $a_{k6}$ may be equal to $$\frac{1}{\sqrt{12}} e^{-j2\pi(1)(6)/12} \times (x_2[0] - x_2[1] + x_2[2] - x_2[3]) =$$

$$\frac{-1}{\sqrt{12}} (x_2[0] - x_2[1] + x_2[2] - x_2[3]),$$

and the product of $W_{19}$ and $a_{k9}$ may be equal to $$\frac{1}{\sqrt{12}} e^{-j2\pi(1)(9)/12} \times (x_2[0] + jx_2[1] - x_2[2] - jx_2[3]) =$$

$$\frac{j}{\sqrt{12}} (x_2[0] + jx_2[1] - x_2[2] - jx_2[3]).$$

The processor, and/or the ASIC, may determine that $e^{-j2\pi(1)(0)/12}=1$, $e^{-j2\pi(1)(6)/12}=-1$, $e^{-j2\pi(1)(3)/12}=-j$, and $e^{-j2\pi(1)(9)/12}=j$. Thus the sum of the products of $W_{10}$ and $a_{k0}$, $W_{13}$ and $a_{k3}$, $W_{16}$ and $a_{k6}$, and $W_{19}$ and $a_{k9}$ may be equal to $$\frac{1}{\sqrt{12}} (1 \times (x_2[0] + x_2[1] + x_2[2] + x_2[3]) +$$

$$-j \times (x_2[0] - jx_2[1] - x_2[2] + jx_2[3]) +$$

$$-1 \times (x_2[0] - x_2[1] + x_2[2] - x_2[3]) +$$

$$j \times (x_2[0] + jx_2[1] - x_2[2] - jx_2[3])) =$$

$$\frac{1}{\sqrt{12}} ((x_2[0] - x_2[0] - j \times x_2[0] + j \times x_2[0]) + (x_2[1] - x_2[1] +$$

$$x_2[1] - x_2[1]) + (x_2[2] + j \times x_2[2] - x_2[2] - j \times x_2[2]) +$$

$$(x_2[3] + x_2[3] + x_2[3] + x_2[3])) = \frac{1}{2\sqrt{3}} \times 4 \times x_2[3] = \frac{2}{\sqrt{3}} x_2[3].$$

The processor, and/or an ASIC, may determine the products of $W_{20}$ and $a_{k0}$, $W_{23}$ and $a_{k3}$, $W_{26}$ and $a_{k6}$, and $W_{29}$ and $a_{k9}$, and then sum the products of $W_{20}$ and $a_{k0}$, $W_{23}$ and $a_{k3}$, $W_{26}$ and $a_{k6}$, and $W_{29}$ and $a_{k9}$. The product of $W_{20}$ and $a_{k0}$ may be equal to $$\frac{1}{\sqrt{12}} e^{-j2\pi(2)(0)/12} \times (x_2[0] + x_2[1] + x_2[2] + x_2[3]) =$$

$$\frac{1}{\sqrt{12}} (x_2[0] + x_2[1] + x_2[2] + x_2[3]),$$

the product of $W_{23}$ and $a_{k3}$ may be equal to $$\frac{1}{\sqrt{12}} e^{-j2\pi(2)(3)/12} \times (x_2[0] - jx_2[1] - x_2[2] + jx_2[3]) =$$

$$\frac{-1}{\sqrt{12}} (x_2[0] - jx_2[1] - x_2[2] + jx_2[3]),$$

the product of $W_{26}$ and $a_{k6}$ may be equal to $$\frac{1}{\sqrt{12}} e^{-j2\pi(2)(6)/12} \times (x_2[0] - x_2[1] + x_2[2] - x_2[3]) =$$

-continued $$\frac{1}{\sqrt{12}} (x_2[0] - x_2[1] + x_2[2] - x_2[3]),$$

and the product of $W_{29}$ and $a_{k9}$ may be equal to $$\frac{1}{\sqrt{12}} e^{-j2\pi(2)(9)/12} \times (x_2[0] + jx_2[1] - x_2[2] - jx_2[3]) =$$

$$\frac{-1}{\sqrt{12}} (x_2[0] + jx_2[1] - x_2[2] - jx_2[3]).$$

The processor, and/or the ASIC, may determine that $e^{-j2\pi(2)(0)/12}=1$, $e^{-j2\pi(2)(6)/12}=1$, $e^{-j2\pi(2)(3)/12}=1$, and $e^{-j2\pi(2)(9)/12}=1$. Thus the sum of the products of $W_{20}$ and $a_{k0}$, $W_{23}$ and $a_{k3}$, $W_{26}$ and $a_{k6}$, and $W_{29}$ and $a_{k9}$ may be equal to $$\frac{1}{\sqrt{12}} (1 \times (x_2[0] + x_2[1] + x_2[2] + x_2[3]) +$$

$$-1 \times (x_2[0] - jx_2[1] - x_2[2] + jx_2[3]) +$$

$$1 \times (x_2[0] - x_2[1] + x_2[2] - x_2[3]) +$$

$$-1 \times (x_2[0] + jx_2[1] - x_2[2] - jx_2[3])) =$$

$$\frac{1}{\sqrt{12}} ((x_2[0] - x_2[0] + x_2[0] - x_2[0]) + (x_2[1] + jx_2[1] - x_2[1] - jx_2[1]) +$$

$$(x_2[2] + x_2[2] + x_2[2] + x_2[2]) + (x_2[3] - jx_2[3] - x_2[3] + jx_2[3]) =$$

$$\frac{1}{2\sqrt{3}} \times 4 \times x_2[2] = \frac{2}{\sqrt{3}} x_2[2].$$

The processor, and/or an ASIC, may determine the products of $W_{30}$ and $a_{k0}$, $W_{33}$ and $a_{k3}$, $W_{36}$ and $a_{k6}$, and $W_{39}$ and $a_{k9}$, and then sum the products of $W_{30}$ and $a_{k0}$, $W_{33}$ and $a_{k3}$, $W_{36}$ and $a_{k6}$, and $W_{39}$ and $a_{k9}$. The product of $W_{30}$ and $a_{k0}$ may be equal to $$\frac{1}{\sqrt{12}} e^{-j2\pi(3)(0)/12} \times (x_2[0] + x_2[1] + x_2[2] + x_2[3]) =$$

$$\frac{1}{\sqrt{12}} (x_2[0] + x_2[1] + x_2[2] + x_2[3]),$$

the product of $W_{33}$ and $a_{k3}$ may be equal to $$\frac{1}{\sqrt{12}} e^{-j2\pi(3)(3)/12} \times (x_2[0] - jx_2[1] - x_2[2] + jx_2[3]) =$$

$$\frac{j}{\sqrt{12}} (x_2[0] - jx_2[1] - x_2[2] + jx_2[3]),$$

the product of $W_{36}$ and $a_{k6}$ may be equal to $$\frac{1}{\sqrt{12}} e^{-j2\pi(3)(6)/12} \times (x_2[0] - x_2[1] + x_2[2] - x_2[3]) =$$

$$\frac{-1}{\sqrt{12}} (x_2[0] - x_2[1] + x_2[2] - x_2[3]),$$

and the product of $W_{39}$ and $a_{k9}$ may be equal to $$\frac{1}{\sqrt{12}}e^{-j2\pi(3)(9)/12} \times (x_2[0] + jx_2[1] - x_2[2] - jx_2[3]) =$$

$$\frac{-j}{\sqrt{12}}(x_2[0] + jx_2[1] - x_2[2] - jx_2[3]).$$

The processor, and/or the ASIC, may determine that $e^{-j2\pi(3)(0)/12}=1$, $e^{-j2\pi(3)(6)/12}=1$, $e^{-j2\pi(3)(3)/12}=j$, and $e^{-j2\pi(3)(9)/12}=-j$. Thus the sum of the products of $W_{30}$ and $a_{k0}$, $W_{33}$ and $a_{k3}$, $W_{36}$ and $a_{k6}$, and $W_{39}$ and $a_{k9}$ may be equal to $$\frac{1}{\sqrt{12}}$$

$$(1 \times (x_2[0] + x_2[1] + x_2[2] + x_2[3]) + j \times (x_2[0] - jx_2[1] - x_2[2] + jx_2[3]) +$$

$$-1 \times (x_2[0] - x_2[1] + x_2[2] - x_2[3] +$$

$$-j \times (x_2[0] + jx_2[1] - x_2[2] - jx_2[3])) = \frac{1}{\sqrt{12}}$$

$$((x_2[0] + jx_2[0] - x_2[0] - jx_2[0]) + (x_2[1] + x_2[1] + x_2[1] + x_2[1]) +$$

$$(x_2[2] - jx_2[2] - x_2[2] + jx_2[2]) + (x_2[3] - 1 \times x_2[3] +$$

$$x_2[3] - x_2[3]) = \frac{1}{2\sqrt{3}} \times 4 \times x_2[1] = \frac{2}{\sqrt{3}}x_2[1].$$

The processor, and/or an ASIC, may determine that the product of the first four rows of W (i.e., $W_0$, $W_1$, $W_2$, $W_3$) and $a_k$ is equal to $$\frac{2}{\sqrt{3}}(x_2[0]x_2[3]x_2[2]x_2[1]).$$

The resulting product may be the first four rows of a vector $b_k$ that may be equal to the product of W and $a_k$. That is, $$b_{k0} = \frac{2}{\sqrt{3}}x_2[0], b_{k1} = \frac{2}{\sqrt{3}}x_2[3], b_{k2} = \frac{2}{\sqrt{3}}x_2[2], b_{k3} = \frac{2}{\sqrt{3}}x_2[1].$$

The processor may determine the product of the fifth through the eighth rows of W (i.e., $W_4$, $W_5$, $W_6$, $W_7$) and $a_k$. The processor, and/or an ASIC, may determine the products of $W_{40}$ and $a_{k0}$, $W_{43}$ and $a_{k3}$, $W_{46}$ and $a_{k6}$, and $W_{49}$ and $a_{k9}$, and then sum the products of $W_{40}$ and $a_{k0}$, $W_{43}$ and $a_{k3}$, $W_{46}$ and $a_{k6}$, and $W_{49}$ and $a_{k9}$. The product of $W_{40}$ and $a_{k0}$ may be equal to $$\frac{1}{\sqrt{12}}e^{-j2\pi(4)(0)/12} \times (x_2[0] + x_2[1] + x_2[2] + x_2[3]) =$$

$$\frac{1}{\sqrt{12}}(x_2[0] + x_2[1] + x_2[2] + x_2[3]),$$

the product of $W_{43}$ and $a_{k3}$ may be equal to $$\frac{1}{\sqrt{12}}e^{-j2\pi(4)(3)/12} \times (x_2[0] - jx_2[1] - x_2[2] + jx_2[3]) =$$

$$\frac{1}{\sqrt{12}}(x_2[0] - jx_2[1] - x_2[2] + jx_2[3]),$$

the product of $W_{46}$ and $a_{k6}$ may be equal to $$\frac{1}{\sqrt{12}}e^{-j2\pi(4)(6)/12} \times (x_2[0] - x_2[1] + x_2[2] - x_2[3]) =$$

$$\frac{1}{\sqrt{12}}(x_2[0] - x_2[1] + x_2[2] - x_2[3]),$$

and the product of $W_{49}$ and $a_{k9}$ may be equal to $$\frac{1}{\sqrt{12}}e^{-j2\pi(4)(9)/12} \times (x_2[0] + jx_2[1] - x_2[2] - jx_2[3]) =$$

$$\frac{1}{\sqrt{12}}(x_2[0] + jx_2[1] - x_2[2] - jx_2[3]).$$

The processor, and/or the ASIC, may determine that $e^{-j2\pi(4)(0)/12}=e^{-j2\pi(4)(3)/12}=e^{-j2\pi(4)(6)/12}e^{-j2\pi(4)(9)/12}=1$. Thus the sum of the products of $W_{40}$ and $a_{k0}$, $W_{43}$ and $a_{k3}$, $W_{46}$ and $a_{k6}$, and $W_{49}$ and $a_{k9}$ may be equal to $$\frac{1}{\sqrt{12}}((x_2[0] + x_2[1] + x_2[2] + x_2[3]) +$$

$$(x_2[0] - jx_2[1] - x_2[2] + jx_2[3]) + (x_2[0] - x_2[1] + x_2[2] -$$

$$x_2[3] + (x_2[0] + jx_2[1] - x_2[2] - jx_2[3])) = \frac{1}{\sqrt{12}}$$

$$((x_2[0] + x_2[0] + x_2[0] + x_2[0]) + (x_2[1] - x_2[1] - jx_2[1] + jx_2[1]) +$$

$$(x_2[2] - x_2[2] + x_2[2] - x_2[2]) + (x_2[3] + jx_2[3] - x_2[3] -$$

$$jx_2[3]) = \frac{1}{2\sqrt{3}} \times 4 \times x_2[0] = \frac{2}{\sqrt{3}}x_2[0].$$

The processor, and/or an ASIC, may determine the products of $W_{50}$ and $a_{k0}$, $W_{53}$ and $a_{k3}$, $W_{56}$ and $a_{k6}$, and $W_{59}$ and $a_{k9}$, and then sum the products of $W_{50}$ and $a_{k0}$, $W_{53}$ and $a_{k3}$, $W_{56}$ and $a_{k6}$, and $W_{59}$ and $a_{k9}$. The product of $W_{50}$ and $a_{k0}$ may be equal to $$\frac{1}{\sqrt{12}}e^{-j2\pi(5)(0)/12} \times (x_2[0] + x_2[1] + x_2[2] + x_2[3]) =$$

$$\frac{1}{\sqrt{12}}(x_2[0] + x_2[1] + x_2[2] + x_2[3]),$$

the product of $W_{53}$ and $a_{k3}$ may be equal to $$\frac{1}{\sqrt{12}}e^{-j2\pi(5)(3)/12} \times (x_2[0] - jx_2[1] - x_2[2] + jx_2[3]) =$$

$$\frac{-j}{\sqrt{12}}(x_2[0] - jx_2[1] - x_2[2] + jx_2[3]),$$

the product of $W_{56}$ and $a_{k6}$ may be equal to $$\frac{1}{\sqrt{12}}e^{-j2\pi(5)(6)/12} \times (x_2[1] + x_2[2] + x_2[2] - x_2[3]) =$$

$$\frac{-1}{\sqrt{12}}(x_2[0] - x_2[1] + x_2[2] + x_2[3]),$$

and the product of $W_{59}$ and $a_{k9}$ may be equal to $$\frac{1}{\sqrt{12}}e^{-j2\pi(5)(9)/12} \times (x_2[0] + jx_2[1] - x_2[2] - jx_2[3]) =$$

$$\frac{j}{\sqrt{12}}(x_2[0] + jx_2[1] - x_2[2] - jx_2[3]).$$

Thus the sum of the products of $W_{50}$ and $a_{k0}$, $W_{53}$ and $a_{k3}$, $W_{56}$ and $a_{k6}$, and $W_{59}$ and $a_{k9}$ may be equal to $$\frac{1}{\sqrt{12}}(1 \times (x_2[0] + x_2[1] + x_2[2] + x_2[3]) +$$

$$-j \times (x_2[0] - jx_2[1] + x_2[2] + jx_2[3]) +$$

$$-1 \times (x_2[0] - x_2[1] + x_2[2] - x_2[3]) +$$

$$j \times (x_2[0] + jx_2[1] - x_2[2] - jx_2[3])) =$$

$$\frac{1}{\sqrt{12}}((x_2[0] - x_2[0] - j \times x_2[0] + j \times x_2[0]) + (x_2[1] - x_2[1] +$$

$$x_2[1] - x_2[1]) + (x_2[2] + j \times x_2[2] - x_2[2] - j \times x_2[2]) +$$

$$(x_2[3] + x_2[3] + x_2[3] + x_2[3])) = \frac{1}{2\sqrt{3}} \times 4 \times x_2[3] = \frac{2}{\sqrt{3}}x_2[3].$$

The processor, and/or an ASIC, may determine the products of $W_{60}$ and $a_{k0}$, $W_{63}$ and $a_{k3}$, $W_{66}$ and $a_{k6}$, and $W_{69}$ and $a_{k9}$, and then sum the products of $W_{60}$ and $a_{k0}$, $W_{63}$ and $a_{k3}$, $W_{66}$ and $a_{k6}$, and $W_{69}$ and $a_{k9}$. The product of $W_{60}$ and $a_{k0}$ may be equal to $$\frac{1}{\sqrt{12}}e^{-j2\pi(6)(0)/12} \times (x_2[0] + x_2[1] + x_2[2] + x_2[3]) =$$

$$\frac{1}{\sqrt{12}}(x_2[0] + x_2[1] + x_2[2] + x_2[3]),$$

the product of $W_{63}$ and $a_{k3}$ may be equal to $$\frac{1}{\sqrt{12}}e^{-j2\pi(6)(3)/12} \times (x_2[0] - jx_2[1] - x_2[2] + jx_2[3]) =$$

$$\frac{-1}{\sqrt{12}}(x_2[0] - jx_2[1] + x_2[2] + jx_2[3]),$$

the product of $W_{66}$ and $a_{k6}$ may be equal to $$\frac{1}{\sqrt{12}}e^{-j2\pi(6)(6)/12} \times (x_2[0] - x_2[1] + x_2[2] - x_2[3]) =$$

$$\frac{1}{\sqrt{12}}(x_2[0] - x_2[1] + x_2[2] - x_2[3]),$$

and the product of $W_{69}$ and $a_{k9}$ may be equal to $$\frac{1}{\sqrt{12}}e^{-j2\pi(6)(9)/12} \times (x_2[0] + jx_2[1] - x_2[2] - jx_2[3]) =$$

$$\frac{-1}{\sqrt{12}}(x_2[0] + jx_2[1] - x_2[2] - jx_2[3]).$$

Thus the sum of the products of $W_{60}$ and $a_{k0}$, $W_{63}$ and $a_{k3}$, $W_{66}$ and $a_{k6}$, and $W_{69}$ and $a_{k9}$ may be equal to $$\frac{1}{\sqrt{12}}(1 \times (x_2[0] + x_2[1] + x_2[2] + x_2[3]) +$$

$$-j \times (x_2[0] + x_2[1] + x_2[2] + x_2[3]) +$$

$$-1 \times (x_2[0] + x_2[1] + x_2[2] + x_2[3]) +$$

$$j \times (x_2[0] + x_2[1] + x_2[2] + x_2[3])) =$$

$$\frac{1}{\sqrt{12}}((x_2[0] - x_2[0] - j \times x_2[0] + j \times x_2[0]) + (x_2[1] - x_2[1] +$$

$$x_2[1] - x_2[1]) + (x_2[2] + j \times x_2[0] - x_2[2] + j \times x_2[2]) +$$

$$(x_2[3] + x_2[3] + x_2[3] + x_2[3])) = \frac{1}{2\sqrt{3}} \times 4 \times x_2[3] = \frac{2}{\sqrt{3}}x_2[3].$$

The processor, and/or an ASIC, may determine the products of $W_{70}$ and $a_{k0}$, $W_{73}$ and $a_{k3}$, $W_{76}$ and $a_{k6}$, and $W_{79}$ and $a_{k9}$, and then sum the products of $W_{70}$ and $a_{k0}$, $W_{73}$ and $a_{k3}$, $W_{76}$ and $a_{k6}$, and $W_{79}$ and $a_{k9}$. The product of $W_{70}$ and $a_{k0}$ may be equal to $$\frac{1}{\sqrt{12}}e^{-j2\pi(7)(0)/12} \times (x_2[0] + x_2[1] + x_2[2] + x_2[3]) =$$

$$\frac{1}{\sqrt{12}}(x_2[0] + x_2[1] + x_2[2] + x_2[3]),$$

the product of $W_{73}$ and $a_{k3}$ may be equal to $$\frac{1}{\sqrt{12}}e^{-j2\pi(7)(3)/12} \times (x_2[0] - jx_2[1] - x_2[2] + jx_2[3]) =$$

$$\frac{j}{\sqrt{12}}(x_2[0] - jx_2[1] - x_2[2] + jx_2[3]),$$

the product of $W_{76}$ and $a_{k6}$ may be equal to $$\frac{1}{\sqrt{12}}e^{-j2\pi(7)(6)/12} \times (x_2[0] - x_2[1] + x_2[2] - x_2[3]) =$$

$$\frac{-1}{\sqrt{12}}(x_2[0] - x_2[1] + x_2[2] - x_2[3]),$$

and the product of $W_{79}$ and $a_{k9}$ may be equal to $$\frac{1}{\sqrt{12}}e^{-j2\pi(7)(9)/12} \times (x_2[0] + jx_2[1] - x_2[2] - jx_2[3]) =$$

$$\frac{-j}{\sqrt{12}}(x_2[0] + jx_2[1] - x_2[2] - jx_2[3]).$$

Thus the sum of the products of $W_{70}$ and $a_{k0}$, $W_{73}$ and $a_{k3}$, $W_{76}$ and $a_{k6}$, and $W_{79}$ and $a_{k9}$ may be equal to $$\frac{1}{\sqrt{12}}(1 \times (x_2[0] + x_2[1] + x_2[2] + x_2[3]) +$$
$$j \times (x_2[0] - jx_2[1] - x_2[2] + jx_2[3]) +$$
$$-1 \times (x_2[0] - x_2[1] + x_2[2] - x_2[3]) +$$
$$-j \times (x_2[0] + jx_2[1] - x_2[2] - jx_2[3])) =$$
$$\frac{1}{\sqrt{12}}((x_2[0] + jx_2[0] - x_2[0] - jx_2[0]) + (x_2[1] + x_2[1] + x_2[1] + x_2[1]) +$$
$$(x_2[2] - jx_2[2] - x_2[2] + jx_2[2]) +$$
$$(x_2[3] - 1 \times x_2[3] + x_2[3] - x_2[3])) = \frac{1}{2\sqrt{3}} \times 4 \times x_2[1] = \frac{2}{\sqrt{3}} x_2[1].$$

The processor, and/or an ASIC, may determine that the product of the fifth through the eighth rows of W (i.e., $W_4$, $W_5$, $W_6$, $W_7$) and $a_k$ is equal to $$\frac{2}{\sqrt{3}}(x_2[0]x_2[3]x_2[2]x_2[1]).$$

The resulting product may be the fifth through the eighth rows of a vector $b_k$, and may be equal to the product of W and $a_k$. That is, $$b_{k4} = \frac{2}{\sqrt{3}}x_2[0], \; b_{k5} = \frac{2}{\sqrt{3}}x_2[3], \; b_{k6} = \frac{2}{\sqrt{3}}x_2[2], \; b_{k7} = \frac{2}{\sqrt{3}}x_2[1].$$

The processor, and/or the ASIC, may determine that the remaining rows of $b_k$ $$\left(\text{i.e.,}\; b_{k8} = \frac{2}{\sqrt{3}}x_2[0], \; b_{k9} = \frac{2}{\sqrt{3}}x_2[3], \right.$$
$$\left. b_{k10} = \frac{2}{\sqrt{3}}x_2[2], \; b_{k11} = \frac{2}{\sqrt{3}}x_2[1]\right)$$

may be the same as $b_{k0}$, $b_{k1}$, $b_{k2}$, $b_{k3}$ and $b_{k4}$, $b_{k5}$, $b_{k6}$, $b_{k7}$ respectively. That is, $b_{k0}$ may be equal to $b_{k4}$ which may be equal to $b_{k8}$, $b_{k1}$ may be equal to $b_{k5}$ which may be equal to $b_{k9}$, $b_{k2}$ may be equal to $b_{k6}$ which may be equal to $b_{k10}$, and $b_{k3}$ may be equal to $b_{k7}$ which may be equal to $b_{k11}$. The processor, and/or the ASIC, may determine that an IFFT sample in $b_k$ may repeat every four samples. Accordingly, the processor, and/or the ASIC, may determine a set of IFFT samples (e.g., $b_k$) that may be used by the processor, and/or an ASIC, to determine an estimate of the total impulse response of a full-duplex radio (e.g., the AP 102) as explained below in FIGS. 5-7. It should be noted that the expressions $e^{-j2\pi xy/N}$ and $e^{-j2\pi rs/M}$ may be equal to $$\cos\frac{2\pi xy}{N} - j\sin\frac{2\pi xy}{N} \;\text{and}\; \cos\frac{2\pi rs}{M} - j\sin\frac{2\pi rs}{M}$$

respectively, and that the processor, and/or an ASIC, may evaluate these expressions for the values x, y∈{1, 2, 3, 4} and r, s∈{1, 2, 3, 4, 5, 6, 7, 8, 9, 10, 11, 12} for N and M wherein N and M may be any positive natural number.

Figure 4:
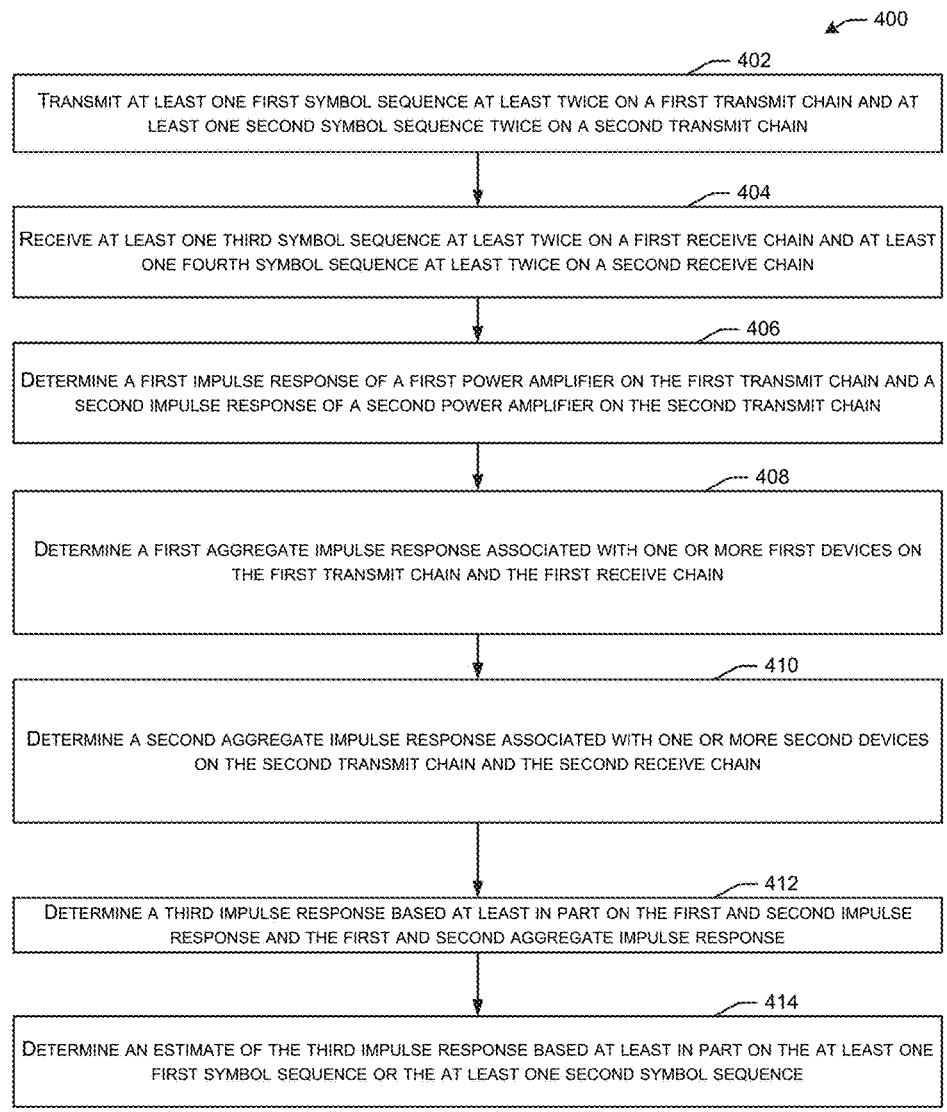
FIG. 4 depicts an exemplary flow diagram of an illustrative process for implementing self-interference cancellation, according to one or more example embodiments of the disclosure.

FIG. 4 depicts an exemplary flow diagram of an illustrative method for implementing self-interference cancellation, according to one or more example embodiments of the disclosure. In block 402, a processor in a wireless device (e.g., the AP 102) may transmit at least one first symbol sequence at least twice on a first transmit chain of a first transceiver and transmit at least one second symbol sequence at least twice on a second transmit chain of a second transceiver. The at least one first symbol sequence may be equal to the at least one second symbol sequence. For instance, the symbols $x_1[n]$ 202 and $x_2[n]$ 208 may have a repetitive structure $x_1[l]=x_1[l+L]$ and $x_2[l]=x_2[l+L]$ respectively. The discrete time index n may be replaced with l, and l may be a variable corresponding to a discrete time index associated with a total impulse response. That is, a total impulse response may last L discrete units of time, and the variable l may represent each discreet unit of time of the L discrete units of time. Furthermore, because the total impulse response is L discrete units of time (e.g., has a length L) the symbols $x_1[l]$ and $x_2[l]$ transmitted over the length L, are the symbols that may be used to determine the total impulse response over length L. The total impulse response may include the impulse response of a power amplifier, an impulse response of a circulator, an impulse response of an analog SIC filter, an impulse response of an LNA, and an impulse response of the echo channel path between a first antenna coupled to the first transceiver and a second antenna coupled to the second transceiver. The length L may be based at least in part on a maximum delay spread of the echo channel path impulse response between the first antenna and the second antenna and/or vice versa. The maximum delay spread may be equal to the delay between when a second receiver receives a first symbol corresponding to the at least one first symbol sequence and a second symbol corresponding to the at least one first symbol sequence. As explained above the second symbol may not be the last symbol in the at least one first symbol sequence. It may be an intermediate symbol between the first transmitted symbol in the at least one first symbol sequence and the last symbol in the at least one first symbol sequence. The variable l may assume the values l∈1, 2, . . . , L. The number of times the symbols $x_1[l]$ and $x_2[l]$ are repeated may be based at least in part on the length L and the number of data streams being transmitted. The number of data streams being transmitted may correspond to the number of transmit chains available to transmit data streams. That is, the number of data streams may be less than or equal to the number of transmit chains. The length L will be set to 4 in order to simplify the mathematics for illustrative purposes, but is in no way limited to the number four. Thus as an example, the at least twice transmitted at least one first and second symbol sequences of $x_1[l]$ and $x_2[l]$ for length L=4 may be $x_1[1]$, $x_1[5]$, $x_1[2]$, $x_1[6]$, $x_1[3]$, $x_1[7]$, $x_1[4]$, $x_1[8]$ and $x_2[1]$, $x_2[5]$, $x_2[2]$, $x_2[6]$, $x_2[3]$, $x_2[7]$, $x_2[4]$, $x_2[8]$ respectively. And $x_1[1]=x_1[5]$, $x_1[2]=x_1[6]$, $x_1[3]=x_1[7]$, $x_1[4]=x_1[8]$ and $x_2[1]=x_2[5]$, $x_2[2]=x_2[6]$, $x_2[3]=x_2[7]$, $x_2[4]=x_2[8]$. A generalization to any length is described below in FIGS. 5-7.

At block 404, the processor may receive at least one third symbol sequence corresponding to the at least one first symbol sequence at least twice on a first receive chain of the second transceiver and receive at least one fourth symbol sequence corresponding to the at least one second symbol sequence at least twice on the second receive chain of the first transceiver. The at least one third symbol sequence and at least one fourth symbol sequence may correspond to the symbols $y_1[n]$ 222 and $y_2[n]$ 232 respectively. The third and fourth symbol sequences may have a length of L, and the discrete time index n of the symbols $y_1[n]$ 222 and $y_2[n]$ 232 may be replaced by l+4. That is, symbols $y_1[n]$ and $y_2[n]$, corresponding to the symbols $y_1[n]$ 222 and $y_2[n]$ 232 at discrete time index n=1, may be $y_1[l+4]$ and $y_2[l+4]$. The at least one third and fourth symbol sequences may be represented by $y_1[l+4]$ and $y_2[l+4]$ for the values l∈1, 2, ..., L. The discrete time index n may be replaced by l+4 because there may be a delay between when the at least one first and second symbol sequences (e.g., $x_1[l]$ and $x_2[l]$) are transmitted, by the processor, and when the at least one third and fourth symbol sequences $y_1[l+4]$ and $y_2[l+4]$ for l∈1, 2, ..., L are received by the processor. As an example, a first symbol in the at least one first and second symbol sequences (e.g., $x_1[1]$ and $x_2[1]$) may be transmitted, by the processor, on the first and second transmit chains respectively, and may be received on a first and second receive chain respectively at 1+L, wherein L=4. That is received symbols $y_1[5]$ and $y_2[5]$ may correspond to transmitted symbols $x_1[1]$ and $x_2[1]$.

After the at least one first and second symbol sequences are received twice on the first and second receive chains, the processor may determine a first impulse response of a first power amplifier on the first transmit chain and a second impulse response of a second power amplifier on the second transmit chain (block 406). The first impulse response may be based at least in part on the at least one first symbol sequence. The second impulse response may be based at least in part on the at least one second symbol sequence. As explained above, the impulse response of a power amplifier may be an analytical impulse response that may be approximated using at least two basis functions. The first and second impulse responses may be determined by the expression $f_m^{PA}(x_m[n]) \cong \Sigma_{k=1}^{K} a_k \varphi_k(x_m[n]) = \Sigma_{k=1}^{K} a_k x_{m,k}[n]$. The variable m may correspond to a natural number associated with the transmit chain (e.g., m=1 may correspond to the first transmit chain, and m=2 may correspond to the second transmit chain and therefore correspond to the first and second impulse responses respectively). And the variables k and K may correspond to the index associated with a basis function, and the number of basis functions respectively. Therefore, and as explained above, $f_1^{PA}(x_1[n])$ may correspond to the first impulse response and $f_2^{PA}(x_2[n])$ may correspond to the second impulse response.

At block 408, the processor may determine a first aggregate impulse response associated with one or more first devices on the first transmit chain and the first receive chain. The one or more first devices on the first transmit chain may include a first circulator. The one or more devices on the first receive chain may include the first circulator, a first analog SIC filter, and a first LNA. After, during, or before the processor completes block 408, the processor may determine a second aggregate impulse response associated with one or more second devices on the second transmit chain and the second receive chain in block 410. The one or more second devices on the second transmit chain may include a second circulator. The one or more devices on the second receive chain may include a second circulator, a second analog SIC filter, and a second LNA. In general the first and second aggregate impulse responses may be analytical impulse responses characterized by the expression $h_{i,m}[n]$, wherein i and m may be indices corresponding to natural numbers associated with the first and second transceivers. For example, if a wireless device (e.g., the AP 102) comprises m=2 transceivers, the processor may determine four analytical impulse responses (e.g., $h_{1,1}[n]$, $h_{1,2}[n]$, $h_{2,1}[n]$, $h_{2,2}[n]$) as explained below. The index i may correspond to the transceiver on which a signal and/or symbol is being received, and the index m may correspond to all transceivers including the one on which a signal and/or symbol is being received. The analytical impulse response $h_{1,1}[n]$ and $h_{2,2}[n]$ may correspond to an impulse response of a first and second circulator in the first and second transmit chains, a first and second analog (SIC) filter in the first and second receive chains, and a first and second low noise amplifier (LNA) in the first and second receive chains. The analytical impulse responses $h_{1,2}[n]$ and $h_{2,1}[n]$ may correspond to an impulse response from the first antenna coupled to the first transceiver to the second antenna coupled to the second transceiver and the impulse response from the second antenna to the first antenna respectively.

After the processor determines the first and second impulse responses, the processor may determine a third impulse response based at least in part on the first and second impulse response and the first and second aggregate impulse response (block 412). The third impulse response may be equivalent to a product of the second impulse response and the second aggregate impulse response and the product of the first impulse response and the first aggregate impulse response summed over the number of transceivers (e.g., M). In the exemplary method 400 M=2. In particular, the third impulse response may also be an analytical impulse response that the processor may determine using the expression $y_i[n] = \Sigma_{m=1}^{M} h_{i,m}[n](\Sigma_{l=1}^{L} \Sigma_{k=1}^{K} a_k x_{m,k}[n-l]) = \Sigma_{m=1}^{M} \Sigma_{l=1}^{L} \Sigma_{k=1}^{K} w_{i,m,k}[l] x_{m,k}[n-l+1]$. As explained above the analytical impulse response of the first impulse response may be $f_m^{PA}(x_m[n]) \cong \Sigma_{k=1}^{K} a_k x_{m,k}[n]$, thus by convolving $h_{i,m}[n]$ (the aggregate impulse response) and $f_m^{PA}(x_m[n])$ (the impulse response) over m (e.g., $\Sigma_{m=1}^{M} h_{i,m}[n] * a_k x_{m,k}[n]$) a product $w_{i,m,k}[l] = h_{i,m}[n] \times a_k$ may be determined, wherein the product may be the analytical impulse response corresponding to the third impulse response. The processor may determine a simplified expression for determining the analytical impulse response of the third impulse response. The simplified expression may be $\widetilde{y_1[n]} = \Sigma_{m=1}^{M} \Sigma_{k=1}^{K} (x^{m,k}[n])^T w_{i,m,k}$. The term $(x^{m,k}[n])^T$ may be a vector comprising a product of symbols for all n=1, 2, ..., N. For example, the processor may use symbols $x_1[n]$ 202 and $x_2[n]$ 208 in two vectors $(x^{1,k}[n])^T$ and $(x^{2,k}[n])^T$ to determine the analytical impulse response corresponding to the third impulse response. The two vectors $(x^{1,k}[n])^T$ and $(x^{2,k}[n])^T$ may be equal to $$\begin{matrix} x^{1,k}[1] \\ \vdots \\ x^{1,k}[L] \end{matrix} \quad \text{and} \quad \begin{matrix} x^{2,k}[1] \\ \vdots \\ x^{2,k}[L] \end{matrix}$$

respectively wherein $x^{1,k}[i] = x_1[i]|x_1[i]|^{k-1} = x_1[n-l+1]|x_1[n-l+1]|^{k-1}$ and $x^{2,k}[i] x_2[i] |x_2[i]|^{k-1} = x_2[n-l+1]|x_2[n-l+1]|^{k-1}$. That is, each entry in the two vectors is equal to a product of a discrete time shifted version of each symbol $x_1[n]$ 202 and $x_2[n]$ 208 at discrete time unit n by the variable l plus the number 1 and the absolute value of the discrete time shifted version of each symbol $x_1[n]$ 202 and $x_2[n]$ 208 at discrete time unit n by the variable l plus the number 1 raised to the $k-1^{th}$ power.

After the processor determines the third impulse response, the processor may determine an estimate of the third impulse response based at least in part on the at least one first or second symbol sequence in block 414. The processor may determine a first and second system of equations based on the at least one first and second symbol sequence and the at least one third and fourth symbol sequence. The first and second system of equations respectively that the processor may determine may be $$\begin{bmatrix} y[13] \\ y[14] \\ y[15] \\ y[16] \end{bmatrix} = \begin{bmatrix} x_1[5] & x_1[8] & x_1[7] & x_1[6] \\ x_1[6] & x_1[5] & x_1[8] & x_1[7] \\ x_1[7] & x_1[6] & x_1[5] & x_1[8] \\ x_1[8] & x_1[7] & x_1[6] & x_1[5] \end{bmatrix}$$

$$\begin{bmatrix} w_{1,1,1}[1] \\ w_{1,1,1}[2] \\ w_{1,1,1}[3] \\ w_{1,1,1}[4] \end{bmatrix} + \begin{bmatrix} x_2[5] & x_2[8] & x_2[7] & x_2[6] \\ x_2[6] & x_2[5] & x_2[8] & x_2[7] \\ x_2[7] & x_2[6] & x_2[5] & x_2[8] \\ x_2[8] & x_2[7] & x_2[6] & x_2[5] \end{bmatrix} \begin{bmatrix} w_{1,2,1}[1] \\ w_{1,2,1}[2] \\ w_{1,2,1}[3] \\ w_{1,2,1}[4] \end{bmatrix}$$

and $$\begin{bmatrix} y[5] \\ y[6] \\ y[7] \\ y[8] \end{bmatrix} = \begin{bmatrix} x_1[1] & x_1[4] & x_1[3] & x_1[2] \\ x_1[2] & x_1[1] & x_1[4] & x_1[3] \\ x_1[3] & x_1[2] & x_1[1] & x_1[4] \\ x_1[4] & x_1[3] & x_1[2] & x_1[1] \end{bmatrix}$$

$$\begin{bmatrix} w_{1,1,1}[1] \\ w_{1,1,1}[2] \\ w_{1,1,1}[3] \\ w_{1,1,1}[4] \end{bmatrix} + \begin{bmatrix} x_2[1] & x_2[4] & x_2[3] & x_2[2] \\ x_2[2] & x_2[1] & x_2[4] & x_2[3] \\ x_2[3] & x_2[2] & x_2[1] & x_2[4] \\ x_2[4] & x_2[3] & x_2[2] & x_2[1] \end{bmatrix} \begin{bmatrix} w_{1,2,1}[1] \\ w_{1,2,1}[2] \\ w_{1,2,1}[3] \\ w_{1,2,1}[4] \end{bmatrix}$$

The processor may determine that the first system of equations, in matrix form, may be written as $y_1^1 = X_{1,1,1}^1 w_{1,1,1} + X_{1,2,1}^1 w_{1,2,1}$ and the second system of equations may be equal to $y_1^2 = X_{1,1,1}^2 w_{1,1,1} + X_{1,2,1}^2 w_{1,2,1}$. The first system of equations may determine a relationship between the third symbol sequence (e.g., $y_1^1$) and a product (e.g., matrix product) of the at least one first symbol sequence and the at least one second symbol sequence (e.g., $X_{1,1,1}^1$ and $X_{1,2,1}^1$) with the estimate of the third impulse response (e.g., $w_{1,1,1}$ and $w_{1,2,1}$). The second system of equations may determine a relationship between a fourth symbol sequence (e.g., $y_1^2$) and a product (e.g., matrix product) of the at least one first symbol sequence and the at least one second symbol sequence (e.g., $X_{1,1,1}^2$ and $X_{1,2,1}^2$) and the estimate of the third impulse response (e.g., $w_{1,1,1}$ and $w_{1,2,1}$). The third symbol sequence (e.g., $y_1^1$) and the fourth symbol sequence (e.g., $y_1^2$) may be vectors. The at least one first symbol sequence and the at least one second symbol sequence may be diagonalized by the processor by applying a FFT to the at least one first symbol sequence and the at least one second symbol sequence. Thus, the processor may determine that the system of equations may be $y_1^1 = \Lambda_{1,1,1}^1 \hat{w}_{1,1,1} + \Lambda_{1,2,1}^1 \hat{w}_{1,2,1}$ and $y_1^2 = \Lambda_{1,1,1}^2 \hat{w}_{1,1,1} + \Lambda_{1,2,1}^2 \hat{w}_{1,2,1}$ wherein $\hat{w}_{1,1,1}$ and $\hat{w}_{1,2,1}$ may be vectors and may represent the estimate of the impulse response in the frequency domain, and $\Lambda_{1,1,1}^1, \Lambda_{1,2,1}^1, \Lambda_{1,1,1}^2$, and $\Lambda_{1,2,1}^2$ are diagonal matrices that the processor may determine by applying the FFT to $X_{1,1,1}^1, X_{1,2,1}^1, X_{1,1,1}^2$, and $X_{1,2,1}^2$. The diagonal matrices may be the at least third symbol sequence corresponding to the FFT of the twice received at least one second symbol sequence. Because the diagonal entries in the diagonal matrices (e.g., $\Lambda_{1,1,1}^1, \Lambda_{1,2,1}^1, \Lambda_{1,1,1}^2$, and $\Lambda_{1,2,1}^2$) are non-zero entries, only the entries in the vectors $y_1^1$ and $y_1^2$ corresponding to the non-zero entries in the diagonal matrices may be used by the processor to determine the estimate of the third impulse response. As a result, the number of computations that the processor may need to perform to determine the estimate of the third impulse response may be less than it would need to determine the estimate of the third impulse response using all of the entries in the matrices $X_{1,1,1}^1, X_{1,2,1}^1, X_{1,1,1}^2$, and $X_{1,2,1}^2$. Consequently the analytical impulse response of the estimate of the third impulse response may be $$\begin{bmatrix} \hat{w}_{1,1,1}[l] \\ \hat{w}_{1,2,1}[l] \end{bmatrix} = \begin{bmatrix} \Lambda_{1,1,1}^1[l,l] & \Lambda_{1,2,1}^1[l,l] \\ \Lambda_{1,1,1}^2[l,l] & \Lambda_{1,2,1}^2[l,l] \end{bmatrix}^{-1} \begin{bmatrix} y_1^1[l] \\ y_1^2[l] \end{bmatrix},$$

wherein l may represent the index of the vectors $\hat{w}_{1,1,1}$ and $\hat{w}_{1,2,1}$ and $y_1^1$ and $y_1^2$ and l,l may represent a diagonal entry of diagonal matrices $\Lambda_{1,1,1}^1, \Lambda_{1,2,1}^1, \Lambda_{1,1,1}^2$, and $\Lambda_{1,2,1}^2$. The processor may determine a matrix product between the at least one first and second symbol sequences and the estimate of the third impulse response to generate an estimate of the at least one third and fourth symbol sequences. The estimate corresponding to the at least one third symbol sequence may be an at least one fifth symbol sequence and the estimate corresponding to the at least one fourth symbol sequence may correspond to an at least one sixth symbol sequence. The processor may then determine that a difference between the at least one third symbol sequence and the at least one fifth symbol sequence and a difference between the at least one fourth symbol sequence and the at least one sixth symbol sequence are less than a predetermined real number. The processor may then determine that the at least one fifth symbol sequence is an accurate estimate of the at least one third symbol sequence and that the at least one sixth symbol sequence is an accurate estimate of the at least one fourth symbol sequence. In some embodiments the processor may determine the difference by determining a least mean square (LMS) and/or recursive least squares (RLS) filter.

In some exemplary embodiments, the at least one first and second symbol sequences, the first impulse response, the aggregate first and second impulse response, the third impulse response, and the estimate of the third impulse response may comprise real or complex symbols. A complex symbol may comprise a real and imaginary number corresponding to a bit string. For example, a q-QAM modulation symbol may comprise $2^q$ unique symbols wherein each unique symbol may correspond in-phase (e.g., real) and quadrature (e.g., imaginary) analog signal that may be modulated to transmit the unique symbol.

Figure 5:
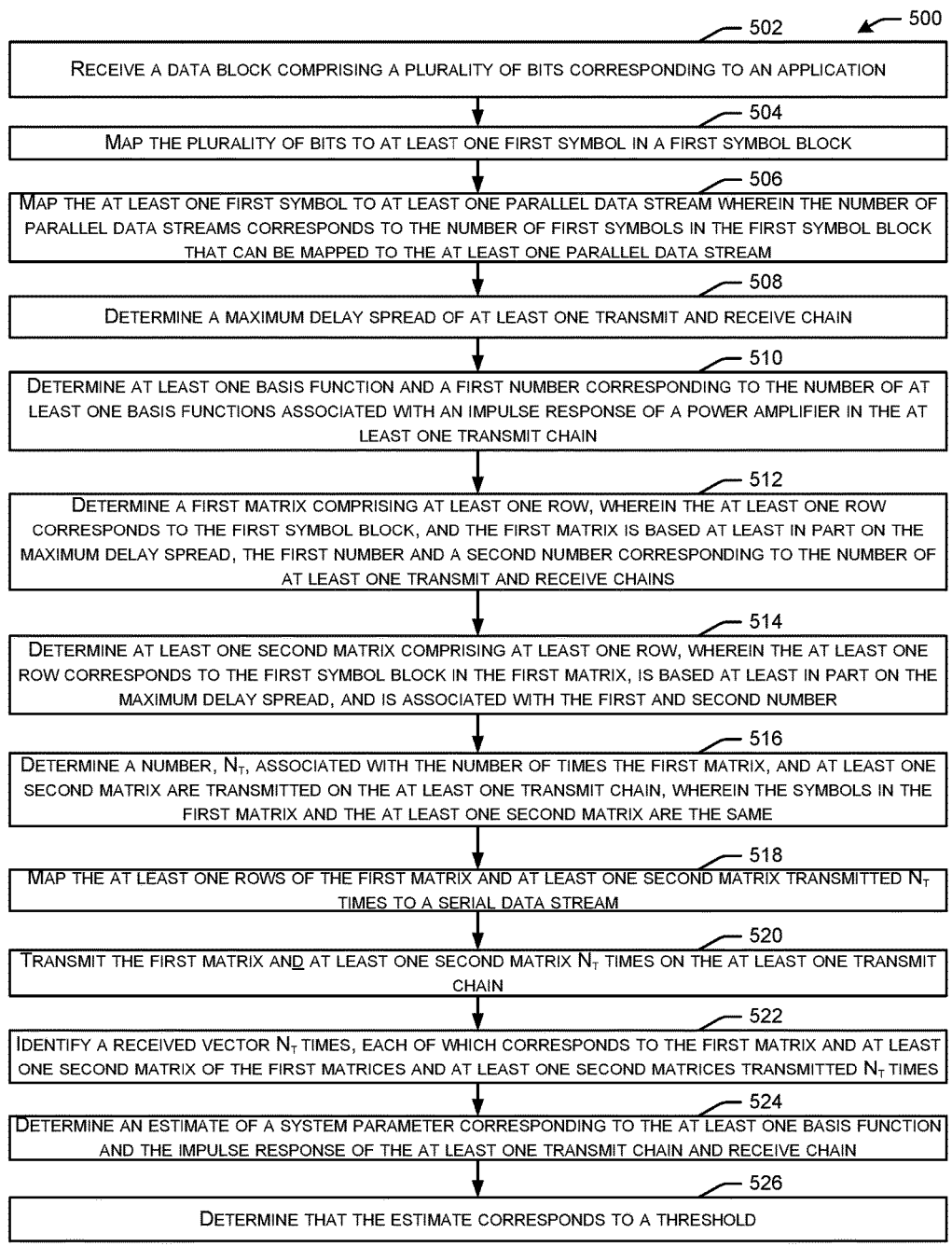
FIG. 5 depicts an exemplary flow diagram of an illustrative method for implementing self-interference cancellation, according to one or more example embodiments of the disclosure.
Figure 6:
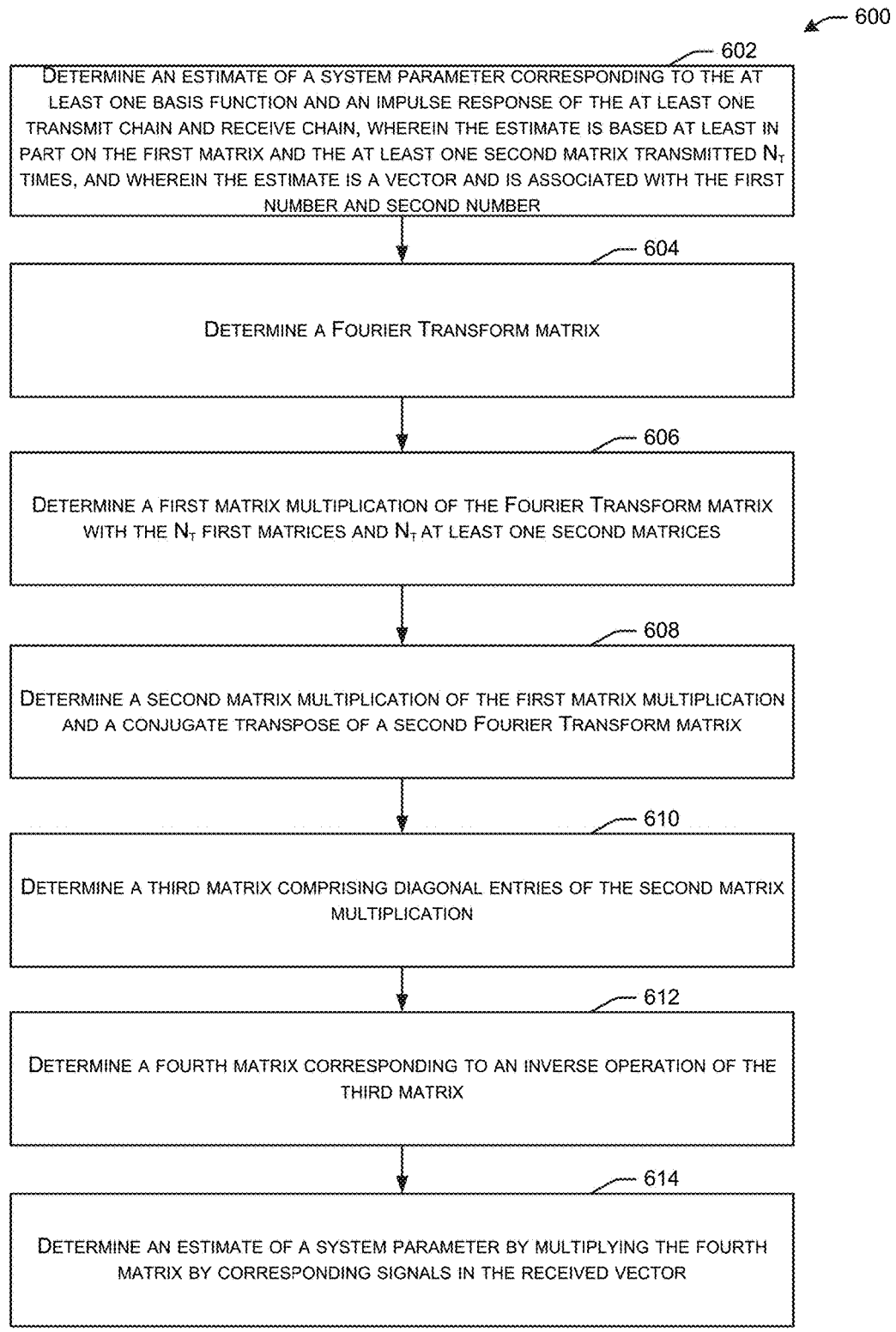
FIG. 6 depicts an exemplary flow diagram of an illustrative method for implementing self-interference cancellation, according to one or more example embodiments of the disclosure.
Figure 7:
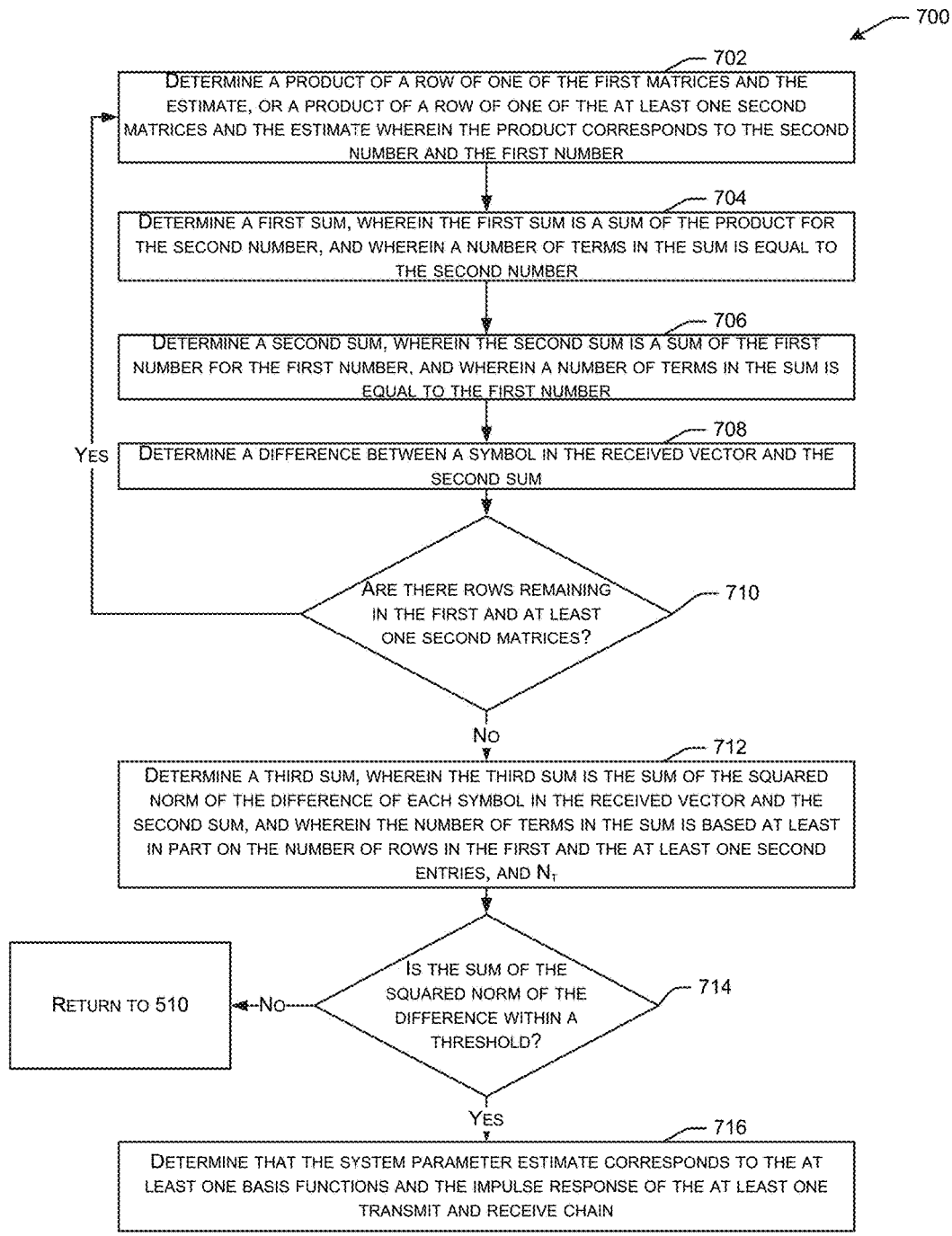
FIG. 7 depicts an exemplary flow diagram of an illustrative method for implementing self-interference cancellation, according to one or more example embodiments of the disclosure.

A generalization of exemplary flowchart FIG. 4 to any number of transceivers, transmit chains, receive chains, antennas, number of times the at least one first and second symbol sequences are transmitted, length of the total impulse response (e.g., maximum delay spread), number of basis functions, and number of symbols in the first and second symbol sequences may be described in the exemplary flow diagrams of FIGS. 5-7.

FIG. 5 depicts an exemplary flow diagram of an illustrative method for implementing self-interference cancellation, according to one or more example embodiments of the disclosure. In block 502, a processor in an access point (AP) 102 may receive a source coded data block comprising a plurality of bits corresponding to an application associated with computer-executable instructions, stored in a computer-readable memory, being executed by the processor in the AP 102. In some embodiments the application may be, for example, a Voice Over Internet Protocol (VOIP) application (e.g., Skype). In other embodiments, the application may be a web browser application (e.g., Safari, Internet Explorer, Opera, Mozilla etc.). The applications may be instantiated by an Operating System running on the AP 102 and may be responsible for sending and receiving source coded data blocks corresponding to an application to one or more devices wirelessly connected to the AP 102. For example, the user device 124 may send and receive a first set of source coded data blocks corresponding to a VOIP application to and from the AP 102, respectively, in a first set of packets (not shown). The user device 128 may send a second set of source coded data blocks corresponding to a web browser application to and from the AP 102, respectively, in a second set of packets (not shown). The processor on the AP 102 may execute one or more computer-readable instructions to send and receive packets to the applications executing computer-readable instructions on user devices 124 and 128.

In block 504, the processor may map the plurality of bits to at least one first symbol in a first symbol block. The plurality of bits may be interleaved, using an interleaver, into codewords (e.g., Low Density Parity Check (LDPC) codewords) and the codewords may be mapped to the at least one symbol. For example, a subset of the bits in each of the codewords may be mapped to the at least one symbol in the first symbol block. The processor may then map the at least one first symbol to at least one parallel data stream wherein the number of parallel data streams corresponds to a number of at least one first symbols in the first symbol block that the processor can map to the at least one parallel data stream and/or an ASIC can map to the least one parallel data stream (block 506). For example, the processor and/or an ASIC may be capable of mapping a total of 112 symbols each to a corresponding parallel data stream. That is, the processor and/or the ASIC may support up to 112 parallel data streams, and the processor and/or the ASIC may map 112 symbols from the codewords to parallel data streams. As an example, there may be 112 symbols in each of 4 codewords, and the processor and/or the ASIC may map each symbol in each of the 4 codewords to one of the 112 parallel data streams. The processor may determine a maximum delay spread between at least one transmit and receive chain at block 508. The at least one processor may determine the maximum delay spread between the at least one transmit and receive chain by transmitting at least one pilot signal on the at least one transmit chain and determining the amount of time elapsed between a first signal corresponding to a reflected and/or refracted signal that arrives at the receive chain above a certain decibel (dB) level and within the shortest amount of time after the at least one pilot signal is transmitted on the at least one transmit chain, and a second signal corresponding to a reflected and/or refracted signal that arrives at the receive chain above a certain decibel (dB) level and within the greatest amount of time allowed for a signal to be received after the at least one pilot signal is transmitted on the at least one transmit chain. After the processor determines the maximum delay spread, the processor may determine at least one basis function and a first number corresponding to the number of at least one basis functions associated with an impulse response of a power amplifier in the at least one transmit chain (block 510). The number of basis functions may be determined based at least in part on the linearity or non-linearity of the impulse response of the power amplifier. The basis functions may be an approximation of the linearity and/or non-linearity of the impulse response of the power amplifier. The basis functions may comprise K kernel basis functions which may approximate an impulse response of the power amplifier which may be a polynomial in some embodiments and may be some other non-polynomial non-linear function in other embodiments. For example, the non-polynomial non-linear function may be a logarithmic function, and the processor may determine the number of basis functions necessary to approximate the logarithmic function.

After the processor determines the number of basis functions in block 510, at block 512, the processor may determine a first matrix comprising at least one row, wherein the at least one row corresponds to the first symbol block, and the first matrix is based at least in part on the maximum delay spread, the first number and the second number corresponding to the number of at least one transmit and receive chains. In some embodiments, the first matrix may be a square matrix comprising the same number of rows and columns. And the number of rows and columns may be determined based at least in part on the maximum delay spread. The maximum delay spread may be represented by a positive natural number L. For example if the maximum delay spread is equal to 4, as in the example in FIG. 4 above, the number of rows and columns may be equal to 4 and the first matrix may comprise 16 entries. In some embodiments, the first matrix may comprise the first symbol block in the first row of the first matrix. In other embodiments, one of the L rows may comprise the first symbol block. The rows that do not comprise the first symbol block may comprise a time shifted version of the first symbol block. That is each row above and below the first symbol block may be shifted by one discrete time unit. For example, the first matrix may be equal to exemplary first matrix $$\begin{bmatrix} x_1[1] & x_1[L] & \dots & x_1[2] \\ x_1[2] & x_1[1] & \dots & x_1[3] \\ \vdots & \vdots & \ddots & \vdots \\ x_1[L] & x_1[L-1] & \dots & x_1[1] \end{bmatrix},$$

and the second row of the exemplary first matrix may be equal to a discrete time shifted version of the first row of the exemplary first matrix. That is the entry in the second row and second column of the exemplary first matrix (i.e., $x_1[1]$) may be equal to the first row and first column of the exemplary first matrix (i.e., $x_1[1]$). The number of rows may correspond to a number of times the first symbol block is transmitted at discrete time shifted intervals. Thus the maximum delay spread may determine the number of times the first symbol block is transmitted at different discrete time shifted intervals. The first number of the exemplary first matrix may be equal to 1. That is, the first number corresponding to the number of at least one basis functions may be equal to 1 which means that there may only be one first matrix. In other embodiments however, there may be K first matrices based on the number of at least one basis functions, and the entries of each of the K matrices may be equal to $x_{m,k}[n]=x_m[n]|x_m[n]|^{k-1}$, where k may be equal to 1 ... K and K may be any positive natural number. The index m may be denote the transceivers that the matrices are being transmitted on, and may be equal to 1 ... M where M may be any positive natural number indicating the number of transceivers in a full-duplex device. The index m may correspond to the second number, and in this example may be equal to 1 which may correspond to the first transceiver of m transceivers. Thus there may be K first matrices equal to $$\begin{bmatrix} x_1[1] & x_1[L] & \dots & x_1[2] \\ x_1[2] & x_1[1] & \dots & x_1[3] \\ \vdots & \vdots & \ddots & \vdots \\ x_1[L] & x_1[L-1] & \dots & x_1[1] \end{bmatrix} \dots$$

$$\begin{bmatrix} x_1[1]|x_1[1]|^{K-1} & x_1[L]|x_1[L]|^{K-1} & \dots & x_1[2]|x_1[2]|^{K-1} \\ x_1[2]|x_1[2]|^{K-1} & x_1[1]|x_1[1]|^{K-1} & \dots & x_1[3]|x_1[3]|^{K-1} \\ \vdots & \vdots & \ddots & \vdots \\ x_1[L]|x_1[L]|^{K-1} & x_1[L-1]|x_1[L-1]|^{K-1} & \dots & x_1[1]|x_1[1]|^{K-1} \end{bmatrix}$$

if K is not equal to 1. If K is equal to 1, then there may only be 1 matrix equal to the exemplary first matrix above.

At block 514, the processor may determine at least one second matrix comprising at least one row, wherein the at least one row corresponds to the first symbol block in the first matrix, is based at least in part on the maximum delay spread, and is associated with the first and second number. The at least one second matrix may be equal to the first matrix in some embodiments. In other embodiments it may be different. Similar in structure to the first matrix, but may comprise different entries. In some embodiments, the entries may comprise different symbols. After the processor has determined the at least one second matrix at block 514, at block 516, the processor may determine a number, $N_t$, associated with the number of times the first matrix, and at least one second matrix may be transmitted on the at least one transmit chain. In some embodiments, this may be determined based at least in part on foreknowledge of circuit components in a transceiver (e.g., power amplifier, circulator, analog SIC filter, and/or LNA). Thus the processor may know in advanced that these components are included in the transceivers of a full-duplex radio and may determine the number of times $N_t$ the first matrix and at least one second matrix should be transmitted in order to determine a total impulse response of the circuit components in the transceiver. In other embodiments, the processor may not have foreknowledge of the total impulse response and may send the first matrix and at least one second matrix a first number of times and may proceed through blocks 518-526 and determine in block 526 whether or not an estimate of the total impulse response is above or below a certain threshold. Based on the processors comparison, the processor may determine to increase and/or decrease the number of times $N_t$ it may transmit the first matrix and the at least one second matrix. In some embodiments, there may be M transceivers as mentioned above, and as a result the number of at least one second matrices may be determined by M. For example, if there are M=4 transceivers, then there may be 1 first matrix and 3 at least one second matrices. In some embodiments the symbols in the first matrix and the at least one second matrix may be the same.

After the processor completes block 516, the processor may then map the at least one rows of the first matrix and at least one second matrix transmitted $N_t$ times to a serial data stream in block 518. In some embodiments there may be an ASIC that maps the at least one rows of symbol blocks of the first matrix and the at least one second matrix to the serial data stream. As an example, the P/S & DAC 383 and 397 may map the rows of symbol blocks of the first matrix and the at least one second matrix to the serial data stream and perform a digital to analog conversion of the symbols in the symbol block to analog signals that may then be transmitted $N_t$ times on the at least one transmit chain in block 520. At block 522 the processor may identify a received vector $N_t$ times, each of which may correspond to the first matrix and the at least one second matrix of the first matrices and at least one second matrices transmitted $N_t$ times. Each of the received $N_t$ vectors may comprise L rows and 1 column. For example, the $N_t$ received vectors may be equal to $$\begin{bmatrix} y_i^1[L+1] \\ y_i^1[L+2] \\ \vdots \\ y_i^1[2L] \end{bmatrix} \dots \begin{bmatrix} y_i^{N_t}[L+u+1] \\ y_i^{N_t}[L+u+2] \\ \vdots \\ y_i^{N_t}[2L+u] \end{bmatrix}.$$

The subscript i may indicate the transceiver on which the received vector is received. For example, the first matrix may be transmitted by a first transceiver and received by the first transceiver, and the at least one second matrix may be transmitted by a second transceiver and received on the first transceiver. In general if there are M transceivers the $i^{th}$ transceiver may receive a received vector corresponding to the first matrix, which may be transmitted on the $i^{th}$ transceiver, and the at least one second matrix, which may be transmitted on the other M−1 transceivers. In this example, the at least one second matrix may be equal to M−1 matrices, because the first matrix is transmitted on the $i^{th}$ matrix and each remaining transceiver must also transmit a matrix which in total would be equal to M at least one second matrices. Each transceiver may comprise a transmit chain, and thus may be transmitted on the transmit chain. Because the M transceivers may transmit the matrices $N_t$ times, the $i^{th}$ receiver may receive $N_t$ received vectors. The times at which the $i^{th}$ receiver may receive $N_t$ received vectors may be different. The earliest time at which the $i^{th}$ receiver may receive a received vector is one discrete time unit greater than the maximum delay spread (e.g., L+1). The other received vectors may be received at some later discrete time unit (e.g., u). The later discrete time unit u may be determined based on the total impulse response of the full-duplex radio. After the processor identifies the received vector, the processor may then determine an estimate of a system parameter corresponding to the at least one basis functions and an impulse response of the at least one transmit chain and receive chain in block 524. The system parameter corresponding to the at least one basis function and impulse response of the at least one transmit chain may correspond to the total impulse response of a full-duplex radio. The processor may determine the estimate in accordance with the blocks in FIG. 6. At block 526 the processor may determine that the estimate corresponds to a threshold. The processor may determine that the estimate corresponds to a threshold in the blocks in FIG. 7.

FIG. 6 depicts an exemplary flow diagram of an illustrative method for implementing self-interference cancellation, according to one or more example embodiments of the disclosure. At block 602 a processor in an access point (AP) 102 may determine an estimate of a system parameter corresponding to the at least one basis functions and an impulse response of the at least one transmit chain and receive, wherein the estimate is based at least in part on the first matrices and the at least one second matrices, and wherein the estimate is a vector and is associated with the first number and the second number. At block 604 the processor may determine a Fourier Transform matrix, and determine a first matrix multiplication of the Fourier Transform matrix with the first matrices and the at least one second matrices at block 606. At block 608 the processor may determine a second matrix multiplication of the first matrix multiplication and a conjugate transpose of a second Fourier Transform matrix. The processor may then determine a third matrix comprising diagonal entries of the second matrix multiplication at block 610. At block 612 the processor may determine a fourth matrix corresponding to an inverse operation of the third matrix, and determine an estimate of a system parameter by multiplying the fourth matrix by corresponding signals in the received vector at block 614.

FIG. 7 depicts an exemplary flow diagram of an illustrative method for implementing self-interference cancellation, according to one or more example embodiments of the disclosure. At block 702 the processor may determine a product of a row of one of the first matrices and the estimate, or a product of a row of one of the at least one second matrices and the estimate wherein the product corresponds to the second number and the first number. The processor may then determine a first sum, wherein the first sum is a sum of the product for the second number, and wherein a number of terms in the sum is equal to the first number (block 704). At block 706 the processor may determine a second sum, wherein the second sum is a sum of the first number for the first number, and wherein a number of terms in the sum is equal to the first number. After block 706 the processor may determine a difference between a symbol in the received vector and the second sum (block 708). At decision block 710 the processor may determine if there are rows remaining in the first and at least one second matrices. If there are additional rows remaining in the first and at least one second matrices, the processor may return to block 702. The processor may continue to return to block 702 until there are no rows left, or an instruction set is executed that may instruct the processor to advance to block 712. At block 712 the processor may determine a third sum, wherein the third sum is the sum of the squared norm of the difference of each symbol in the received vector and the second sum, and wherein the number of terms in the sum is based at least in part on the number of rows in the first and the at least one second entries, and $N_f$. After determining the third sum, the processor may determine if the sum of the squared norm of the difference is within a threshold (decision block 714). If the processor determines that the sum of the squared norm of the difference is within the threshold it may return to block 510. If the processor determines that the squared norm of the difference is within a threshold, then the processor may determine that the system parameter estimate corresponds to the at least one basis functions and the impulse response of the at least one transmit and receive chain (block 716).

Figure 8:
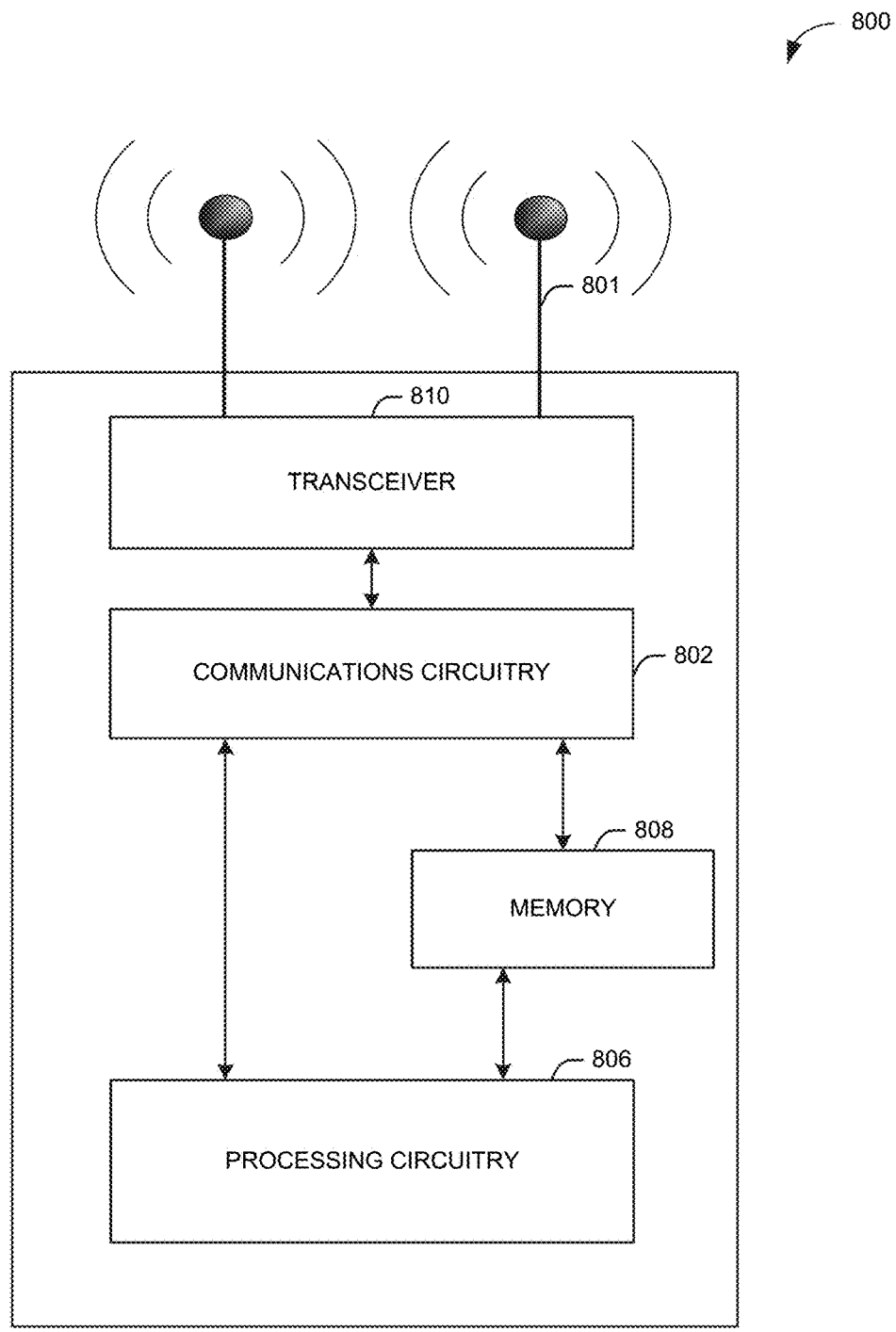
FIG. 8 depicts a functional diagram of an example communication device that may be suitable for use as a device, according to one or more example embodiments of the disclosure.

FIG. 8 depicts an example computing device, according to one or more example embodiments of the disclosure. In one embodiment, FIG. 8 illustrates a functional block diagram of a communication station that may be suitable for use as an AP 102 (FIG. 1) or a user device 120 (FIG. 1) in accordance with some embodiments. The communication station 800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer (PHY) communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 1-7.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device.

Figure 9:
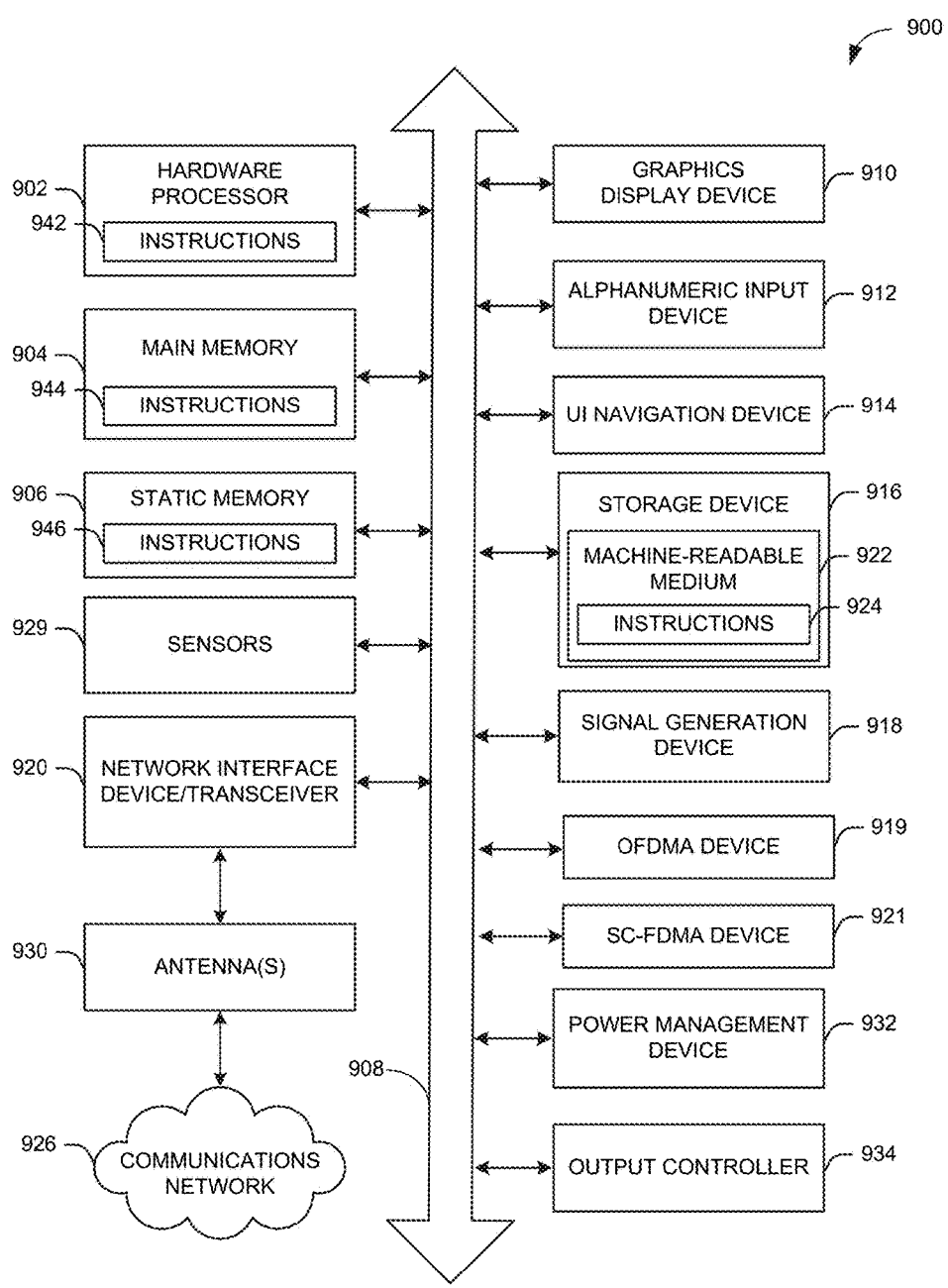
FIG. 9 depicts a block diagram of an example machine upon which any of one or more techniques (e.g., methods) may be performed, according to one or more example embodiments of the disclosure.

FIG. 9 depicts an example computing device, according to one or more example embodiments of the disclosure. FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), an OFDMA device 919, a network interface device/transceiver 920 coupled to antenna(s) 930, and one or more sensors 929, such as a global positioning system (GPS) sensor, compass, accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.). The main memory 904 may include configurable execution units (e.g., transistors, circuits, etc.) and a computer readable medium containing instructions (e.g., the instructions 944) where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions (e.g., a first subset of the instructions 944) to implement a first module at one point in time and reconfigured by a second set of instructions (e.g., a second subset of the instructions 944) to implement a second module at a second point in time. The static memory 906 may also comprise executable instructions 946.

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media. The hardware processor 902 may include configurable execution units (e.g., transistors, circuits, etc.) and a computer readable medium containing instructions (e.g., the instructions 942) where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions (e.g., a first subset of the instructions 942) to implement a first module at one point in time and reconfigured by a second set of instructions (e.g., a second subset of instructions 942) to implement a second module at a second point in time. The device may comprise at least one instruction which when executed may cause the device to perform the operations described above in FIGS. 1-7.

The orthogonal frequency division multiple access (OFDMA) device 919 may carry out or perform any of the operations and processes described and shown above. For example, the OFDMA device 919 may be configured to generate pilot and data packets corresponding to a signal sent between a transmitting device and a receiving device, wherein the pilot packets comprise the at least one field corresponding to at least one time period. The at least one fields in the pilot packets may comprise fields repeated at least two times that may be used by the receiving device to train at least one receiver in the receiving device to detect a signal from a transmitting device, adjust an automatic gain control (AGC), determine and/or adjust diversity selection, determine and/or adjust coarse frequency offset estimation and timing synchronization, determine and/or adjust channel and fine frequency offset estimation. The data packets may comprise data requested by the receiving device from the transmitting device. For example, a two-phase uplink multiuser transmission, a resource allocation phase and a data transmission phase may be transmitted in a data packet. In some embodiments the transmitting device may be the AP 102 and the receiving device may be the user device(s) 120. The single carrier frequency division multiple access (SC-FDMA) device 921 may carry out or perform any of the operations and processes described and shown above. The device may comprise at least one instruction which when executed may cause the device to perform the operations described above in FIG. 8.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

In example embodiments of the disclosure, there may be a device comprising: at least one memory storing computer-executable instructions; and at least one processor configured to access the at least one memory, wherein the at least one processor is configured to execute the computer-executable instructions to: cause to send at least one first symbol sequence at least twice on a first transmit chain and at least one second symbol sequence twice on a second transmit chain; determine at least one third symbol sequence at least twice on a first receive chain and at least one fourth symbol sequence at least twice on a second receive chain; determine a first impulse response of a first power amplifier on the first transmit chain and a second power amplifier on the second transmit chain; determine a first aggregate impulse response associated with one or more first devices on the first transmit chain and the first receive chain; determine a second aggregate impulse response associated with one or more second devices on the second transmit chain and the second receive chain; determine a third impulse response based at least in part on the first and second impulse response; and determine an estimate of the third impulse response based at least in part on the at least one first symbol sequence or the at least one second symbol sequence.

Implementations may include one or more of the following features. The device may further comprise a first transceiver and a second transceiver configured to transmit and receive wireless signals. The device may also comprise at least one first antenna coupled to the first transceiver, and at least one second antenna couple to the second transceiver, wherein the at least one first and second antennas are configured to dissipate and detect electromagnetic energy associated with transmitting and receiving the wireless signals respectively. The first transceiver may comprise the first transmit chain and the first receive chain. The second transceiver comprises the second transmit chain and the second receive chain. The at least one processor may be further configured to determine the first impulse response based at least in part on the at least one first symbol sequence. The at least one first echo channel path may comprise an echo channel path from the first antenna to the second antenna, and the at least one second echo channel path may comprise an echo channel path from the second antenna to the first antenna. The first aggregate impulse response may comprise a first circulator impulse response, a first self-interference cancellation filter impulse response, and a first low noise amplifier impulse response, and the second aggregate impulse response comprises a second circulator impulse response, a second self-interference cancellation filter impulse response, and a second low noise amplifier impulse response. The at least one processor may be further configured to determine the estimate of the third impulse response based at least in part on a first Fast Fourier Transform of the at least one first symbol sequence or the at least one second symbol sequence. The at least one processor may be further configured to determine the estimate of the third response based at least in part on applying a second Fast Fourier Transform to the at least one third symbol sequence or the at least one fourth symbol sequence. The at least one processor may be further configured to determine a first estimate of a received signal on the first receive chain or the second receive chain based on the third estimate and the at least one second symbol sequence and the at least one second symbol sequence. The at least one processor may be further configured to determine a difference between the estimate of the received signal and the at least one third or at least one fourth symbol sequence.

In some embodiments, there may be a non-transitory computer-readable medium including instructions stored thereon, which when executed by one or more processors of a device, cause the one or more processors to perform operations comprising: causing to send at least one first symbol sequence at least twice on a first transmit chain and at least one second symbol sequence twice on a second transmit chain; determining at least one third symbol sequence at least twice on a first receive chain and at least one fourth symbol sequence at least twice on a second receive chain; determining a first impulse response of a first power amplifier on the first transmit chain and a second power amplifier on the second transmit chain; determining a first aggregate impulse response associated with one or more first devices on the first transmit chain and the first receive chain; determining a second aggregate impulse response associated with one or more second devices on the second transmit chain and the second receive chain; determining a third impulse response based at least in part on the first and second impulse response; and determining an estimate of the third impulse response based at least in part on the at least one first symbol sequence or the at least one second symbol sequence.

Implementations may include one or more of the following features. The non-transitory computer-readable medium may further comprise instructions stored thereon, which when executed by one or more processors of a device, cause the one or more processors to perform operations comprising: determining the first impulse response based at least in part on the at least one first symbol sequence or at least in part on the at least one second symbol sequence. The non-transitory computer-readable medium may further comprise instructions stored thereon, which when executed by one or more processors of a device, cause the one or more processors to perform operations comprising: determining the estimate of the third impulse response based at least in part on a first Fast Fourier Transform of the at least one first symbol sequence or at least in part on the at least one second symbol sequence. The non-transitory computer-readable medium may further comprise instructions stored thereon, which when executed by one or more processors of a device, cause the one or more processors to perform operations comprising: determining the estimate of the third response based at least in part on applying a second Fast Fourier Transform to the at least one third symbol sequence or the at least one fourth symbol sequence.

In example embodiments of the disclosure there may be a method comprising: causing to transmit at least one first symbol sequence at least twice on a first transmit chain and at least one second symbol sequence twice on a second transmit chain; determining at least one third symbol sequence at least twice on a first receive chain and at least one fourth symbol sequence at least twice on a second receive chain; determining a first impulse response of a first power amplifier on the first transmit chain and a second power amplifier on the second transmit chain; determining a first aggregate impulse response associated with one or more first devices on the first transmit chain and the first receive chain; determining a second aggregate impulse response associated with one or more second devices on the second transmit chain and the second receive chain; determining a third impulse response based at least in part on the first and second impulse response; and determining an estimate of the third impulse response based at least in part on the at least one first symbol sequence or the at least one second symbol sequence.

The method may comprise determining the estimate of the third impulse response based at least in part on a first Fast Fourier Transform of the at least one first symbol sequence or the at least one second symbol sequence. The method may also comprise determining the estimate of the third impulse response based at least in part on applying a second Fast Fourier Transform of the at least one third symbol sequence or the at least one fourth symbol sequence. The first Fast Fourier Transform may comprise an at least one fifth symbol sequence, comprising at least one symbol. The method may further comprise removing at least one symbol from the at least one fifth symbol sequence.

In example embodiments of the disclosure, there may be a device comprising: a first power amplifier and a second power amplifier; a first circulator and a second circulator; a first low noise amplifier and a second low noise amplifier; a first analog self-interference cancellation filter and a second analog self-interference cancellation filter; and a modem, wherein the modem may transmit at least one first symbol sequence at least twice on a first transmit chain comprising the first power amplifier and the first circulator; may transmit at least one second symbol sequence at least twice on the second transmit chain comprising the second power amplifier and the second circulator; may determine at least one third symbol sequence at least twice on a first receive chain comprising the first low noise amplifier, the first circulator, and the first analog self-interference cancellation filter; may determine at least one fourth symbol sequence at least twice on a second receive chain comprising the second low noise amplifier, the second circulator, and the second analog self-interference cancellation filter; may determine a first impulse response of the first power amplifier; may determine a second impulse response of the second power amplifier; may determine a first aggregate impulse response of the first receive chain; may determine a second aggregate impulse response of the second receive chain; may determine a third impulse response based at least in part on the first impulse response of the first power amplifier and second impulse response of the second power amplifier, and the first and second aggregate impulse responses; and may determine an estimate of the third impulse response based at least in part on the at least one first symbol sequence or the at least one second symbol sequence.

Implementations may include one or more of the following features. The first aggregate impulse response may comprise a first circulator impulse response of the first circulator, a first self-interference cancellation filter impulse response of the first self-interference cancellation filter, and a first low noise amplifier impulse response of the first low noise amplifier, and the second aggregate impulse response may comprise a second circulator impulse response of the second circular impulse response, a second self-interference cancellation filter impulse response of the second self-interference cancellation filter, and a second low noise amplifier impulse response of the second low noise amplifier.

The first power amplifier may comprise one or more first non-linear circuit elements that amplify a first signal from a first power level to a second power level, and the first power amplifier may comprise one or more second non-linear circuit elements that amplify a second signal from a third power level to a fourth power level.

The first impulse response of the first power amplifier may be a non-linear impulse response of the one or more first non-linear circuit elements, and the second impulse response of the second power amplifier may be a non-linear impulse response of the one or more second non-linear circuit elements.

The first circulator may detect at least one first signal corresponding to the at least one third symbol sequence and a first amplified signal from the first power amplifier, and the second circulator may receive at least one third signal corresponding to the at least one fourth symbol sequence and a second amplified signal from the second power amplifier.

The first analog self-interference cancellation filter may comprise at least one first analog circuit that may convert the first amplified signal into a first cancellation signal, and may subtract the first cancellation signal from the at least one first signal to detect a first signal from a first device; and the second analog self-interference cancellation filter may comprise at least one second analog circuit that may: convert the second amplified signal into a second cancellation signal, and may subtract the second cancellation signal from the at least one third signal to detect a second signal from a second device.

The first cancellation signal may correspond to a first linear impulse response of the first analog self-interference cancellation filter, and the second cancellation signal may correspond to a second linear impulse response of the second analog self-interference cancellation filter.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device comprising:
   at least one memory storing computer-executable instructions; and
   at least one processor configured to access the at least one memory, wherein the at least one processor is configured to execute the computer-executable instructions to:
   cause to send at least one first symbol sequence at least twice on a first transmit chain and at least one second symbol sequence twice on a second transmit chain;
   determine at least one third symbol sequence at least twice on a first receive chain and at least one fourth symbol sequence at least twice on a second receive chain;
   determine a first impulse response of a first power amplifier on the first transmit chain and a second impulse response of a second power amplifier on the second transmit chain;
   cause a first circulator to detect at least one first signal corresponding to the at least one third symbol sequence, and a first amplified signal from the first power amplifier;
   cause a second circulator to detect at least one second signal corresponding to the at least one fourth symbol sequence, and a second amplified signal from the second power amplifier;
   determine a first aggregate impulse response associated with one or more first devices on the first transmit chain and the first receive chain;

determine a second aggregate impulse response associated with one or more second devices on the second transmit chain and the second receive chain;
determine a third impulse response based at least in part on the first and second impulse response, and the first and second aggregate impulse response; and
determine an estimate of the third impulse response based at least in part on the at least one first symbol sequence or the at least one second symbol sequence.

2. The device of claim 1, further comprising a first transceiver and a second transceiver configured to transmit and receive wireless signals.

3. The device of claim 2, further comprising at least one first antenna coupled to the first transceiver, and at least one second antenna coupled to the second transceiver, wherein the at least one first and second antennas are configured to dissipate and detect electromagnetic energy associated with transmitting and receiving the wireless signals respectively.

4. The device of claim 2, wherein the first transceiver comprises the first transmit chain and the first receive chain.

5. The device of claim 2, wherein the second transceiver comprises the second transmit chain and the second receive chain.

6. The device of claim 1, wherein the at least one processor is further configured to determine the first impulse response based at least in part on the at least one first symbol sequence.

7. The device of claim 3, wherein the at least one first echo channel path comprises an echo channel path from the first antenna to the second antenna, and the at least one second echo channel path comprises an echo channel path from the second antenna to the first antenna.

8. The device of claim 7, wherein:
the first aggregate impulse response comprises a first circulator impulse response, a first self-interference cancellation filter impulse response, and a first low noise amplifier impulse response, and
the second aggregate impulse response comprises a second circulator impulse response, a second self-interference cancellation filter impulse response, and a second low noise amplifier impulse response.

9. The device of claim 1, wherein the at least one processor is further configured to determine the estimate of the third impulse response based at least in part on a first Fast Fourier Transform of the at least one first symbol sequence or the at least one second symbol sequence.

10. The device of claim 9, wherein the at least one processor is further configured to determine the estimate of the third impulse response based at least in part on applying a second Fast Fourier Transform to the at least one third symbol sequence or the at least one fourth symbol sequence.

11. The device of claim 1, wherein the at least one processor is further configured to determine an estimate of a received signal on the first receive chain or the second receive chain based at least in part on the estimate of the third impulse response and the at least one second symbol sequence and the at least one second symbol sequence.

12. The device of claim 11, wherein the at least one processor is further configured to determine a difference between the estimate of the received signal and the at least one third or at least one fourth symbol sequence.

13. A non-transitory computer-readable medium including instructions stored thereon, which when executed by one or more processors of a device, cause the one or more processors to perform operations comprising:

causing to send at least one first symbol sequence at least twice on a first transmit chain and at least one second symbol sequence twice on a second transmit chain;
determining at least one third symbol sequence at least twice on a first receive chain and at least one fourth symbol sequence at least twice on a second receive chain;
determining a first impulse response of a first power amplifier on the first transmit chain and a second impulse response of a second power amplifier on the second transmit chain;
causing a first circulator to detect at least one first signal corresponding to the at least one third symbol sequence, and a first amplified signal from the first power amplifier;
causing a second circulator to detect at least one second signal corresponding to the at least one fourth symbol sequence, and a second amplified signal from the second power amplifier;
determining a first aggregate impulse response associated with one or more first devices on the first transmit chain and the first receive chain;
determining a second aggregate impulse response associated with one or more second devices on the second transmit chain and the second receive chain;
determining a third impulse response based at least in part on the first and second impulse response, and the first and second aggregate impulse response; and
determining an estimate of the third impulse response based at least in part on the at least one first symbol sequence or the at least one second symbol sequence.

14. The non-transitory computer-readable medium of claim 13, further comprising instructions stored thereon, which when executed by one or more processors of a device, cause the one or more processors to perform operations comprising:
determining the first impulse response based at least in part on the at least one first symbol sequence or at least in part on the at least one second symbol sequence.

15. The non-transitory computer-readable medium of claim 13, further comprising instructions stored thereon, which when executed by one or more processors of a device, cause the one or more processors to perform operations comprising:
determining the estimate of the third impulse response based at least in part on a first Fast Fourier Transform of the at least one first symbol sequence or at least in part on the at least one second symbol sequence.

16. The non-transitory computer-readable medium of claim 13, further comprising instructions stored thereon, which when executed by one or more processors of a device, cause the one or more processors to perform operations comprising:
determining the estimate of the third response based at least in part on applying a second Fast Fourier Transform to the at least one third symbol sequence or the at least one fourth symbol sequence.

17. A method comprising:
causing to send at least one first symbol sequence at least twice on a first transmit chain and at least one second symbol sequence twice on a second transmit chain;
determining at least one third symbol sequence at least twice on a first receive chain and at least one fourth symbol sequence at least twice on a second receive chain;

determining a first impulse response of a first power amplifier on the first transmit chain and a second impulse response of a second power amplifier on the second transmit chain;

causing a first circulator to detect at least one first signal corresponding to the at least one third symbol sequence, and a first amplified signal from the first power amplifier;

causing a second circulator to detect at least one second signal corresponding to the at least one fourth symbol sequence, and a second amplified signal from the second power amplifier;

determining a first aggregate impulse response associated with one or more first devices on the first transmit chain and the first receive chain;

determining a second aggregate impulse response associated with one or more second devices on the second transmit chain and the second receive chain;

determining a third impulse response based at least in part on the first and second impulse response, and the first and second aggregate impulse response; and determining an estimate of the third impulse response based at least in part on the at least one first symbol sequence or the at least one second symbol sequence.

18. The method of claim 17, further comprising:
determining the estimate of the third impulse response based at least in part on a first Fast Fourier Transform of the at least one first symbol sequence or the at least one second symbol sequence.

19. The method of claim 17, further comprising:
determining the estimate of the third impulse response based at least in part on applying a second Fast Fourier Transform of the at least one third symbol sequence or the at least one fourth symbol sequence.

20. The method of claim 18, wherein the first Fast Fourier Transform comprises an at least one fifth symbol sequence, comprising at least one symbol.

21. The method of claim 20, further comprising:
removing at least one symbol from the at least one fifth symbol sequence.

22. A device comprising:
a first power amplifier and a second power amplifier;
a first circulator and a second circulator;
a first low noise amplifier and a second low noise amplifier;
a first analog self-interference cancellation filter and a second analog self-interference cancellation filter; and
a modem, wherein the modem:
transmits at least one first symbol sequence at least twice on a first transmit chain comprising the first power amplifier and the first circulator;
transmits at least one second symbol sequence at least twice on the second transmit chain comprising the second power amplifier and the second circulator;
determines at least one third symbol sequence at least twice on a first receive chain comprising the first low noise amplifier, the first circulator, and the first analog self-interference cancellation filter, wherein the first circulator detects at least one first signal corresponding to the at least one third symbol sequence and a first amplified signal from the first power amplifier;
determines at least one fourth symbol sequence at least twice on a second receive chain comprising the second low noise amplifier, the second circulator, and the second analog self-interference cancellation filter, wherein the second circulator receives at least one third signal corresponding to the at least one fourth symbol sequence and a second amplified signal from the second power amplifier;
determines a first impulse response of the first power amplifier;
determines a second impulse response of the second power amplifier;
determines a first aggregate impulse response of the first receive chain;
determines a second aggregate impulse response of the second receive chain;
determines a third impulse response based at least in part on the first impulse response of the first power amplifier and second impulse response of the second power amplifier, and the first and second aggregate impulse responses; and
determines an estimate of the third impulse response based at least in part on the at least one first symbol sequence or the at least one second symbol sequence.

23. The device of claim 22, wherein the first aggregate impulse response comprises a first circulator impulse response of the first circulator, a first self-interference cancellation filter impulse response of the first self-interference cancellation filter, and a first low noise amplifier impulse response of the first low noise amplifier, and
the second aggregate impulse response comprises a second circulator impulse response of the second circular impulse response, a second self-interference cancellation filter impulse response of the second self-interference cancellation filter, and a second low noise amplifier impulse response of the second low noise amplifier.

24. The device of claim 22, wherein the first power amplifier comprises one or more first non-linear circuit elements that amplify a first signal from a first power level to a second power level, and
the first power amplifier comprises one or more second non-linear circuit elements that amplify a second signal from a third power level to a fourth power level.

25. The device of claim 24, wherein the first impulse response of the first power amplifier is a non-linear impulse response of the one or more first non-linear circuit elements, and
the second impulse response of the second power amplifier is a non-linear impulse response of the one or more second non-linear circuit elements.

26. The device of claim 22, wherein the first analog self-interference cancellation filter comprises at least one first analog circuit that:
converts the first amplified signal into a first cancellation signal, and
subtracts the first cancellation signal from the at least one first signal to detect a first signal from a first device; and
wherein the second analog self-interference cancellation filter comprises at least one second analog circuit that:
converts the second amplified signal into a second cancellation signal, and
subtracts the second cancellation signal from the at least one third signal to detect a second signal from a second device.

27. The device of claim 26, wherein the first cancellation signal corresponds to a first linear impulse response of the first analog self-interference cancellation filter, and the second cancellation signal corresponds to a second linear impulse response of the second analog self-interference cancellation filter.

* * * * *